(12) United States Patent
Radelet et al.

(10) Patent No.: US 12,529,859 B2
(45) Date of Patent: Jan. 20, 2026

(54) ANISOTROPIC CABLE SEALING GELS; AND METHODS FOR FABRICATING CABLE SEALING GELS

(71) Applicants: CommScope Technologies LLC, Hickory, NC (US); CommScope Connectivity Belgium BVBA, Kessel-Lo (BE)

(72) Inventors: Christiaan Radelet, Aarschot (BE); Thierry Mike Declerck, Kumtich (BE); Gary William Adams, Holly Springs, NC (US); Matthew Peter Galla, Holly Springs, NC (US); Roel Modest Willy Bryon, Aarschot (BE); Dirk Kempeneers, Aarschot (BE); Robert Vanhentenrijk, Winksele (BE); Danny Willy August Verheyden, Gelrode (BE); David Thomas Brown, Bury St Edmunds (GB); Michael Maris, Paal (BE); Julian S. Mullaney, Raleigh, NC (US); Valja Everaert, Wetteren (BE); Hans Bols, Geel (BE)

(73) Assignee: CommScope Technologies LLC, Claremont, NC (US)

( * ) Notice: Subject to any disclaimer, the term of this patent is extended or adjusted under 35 U.S.C. 154(b) by 0 days.

(21) Appl. No.: 18/364,560

(22) Filed: Aug. 3, 2023

(65) Prior Publication Data
US 2024/0176090 A1 May 30, 2024

Related U.S. Application Data

(63) Continuation of application No. 17/745,005, filed on May 16, 2022, now abandoned, which is a
(Continued)

(51) Int. Cl.
*G02B 6/44* (2006.01)
*H01B 7/02* (2006.01)
*H02G 15/06* (2006.01)

(52) U.S. Cl.
CPC .......... *G02B 6/4444* (2013.01); *G02B 6/445* (2013.01); *H01B 7/02* (2013.01); *H02G 15/06* (2013.01)

(58) Field of Classification Search
CPC .............................. G02B 6/4444; G02B 6/445
See application file for complete search history.

(56) References Cited

U.S. PATENT DOCUMENTS 5,611,017 A * 3/1997 Lee ....................... G02B 6/4403
385/53
6,005,041 A * 12/1999 Cook ...................... A63B 21/06
524/439
(Continued)

*Primary Examiner* — Uyen Chau N Le
*Assistant Examiner* — Hoang Q Tran
(74) *Attorney, Agent, or Firm* — Merchant & Gould P.C.

(57) ABSTRACT

Aspects and techniques of the present disclosure relate to a cable sealing structure comprising a cable sealing body including a gel and methods of making anisotropic behavior in cable sealing structures made with a dry silicone gel. In one aspect, various three-dimensional printing techniques are used to make a cable sealing structure that includes a gel. The cable sealing body has a construction that elastically deforms to apply an elastic spring load to the gel. The cable sealing body has a construction with anisotropic deformation characteristics that allows the cable sealing body to be less deformable in one direction than in others. The cable sealing structure can be utilized to seal fiber optic cables more uniformly while limiting the potential of leakage.

19 Claims, 30 Drawing Sheets

Related U.S. Application Data continuation of application No. 16/331,424, filed as application No. PCT/US2017/050291 on Sep. 6, 2017, now Pat. No. 11,333,839.

(60) Provisional application No. 62/492,713, filed on May 1, 2017, provisional application No. 62/492,724, filed on May 1, 2017, provisional application No. 62/492,697, filed on May 1, 2017, provisional application No. 62/492,740, filed on May 1, 2017, provisional application No. 62/468,635, filed on Mar. 8, 2017, provisional application No. 62/468,607, filed on Mar. 8, 2017, provisional application No. 62/384,328, filed on Sep. 7, 2016, provisional application No. 62/384,306, filed on Sep. 7, 2016.

(56) References Cited

U.S. PATENT DOCUMENTS

| | | | |
|---|---|---|---|
| 6,854,996 B2 * | 2/2005 | Yaworski | H01R 13/5216 174/88 B |
| 2005/0129347 A1 * | 6/2005 | Saito | G02B 6/3608 385/14 |
| 2009/0058018 A1 * | 3/2009 | Mullaney | H02G 15/113 277/625 |

* cited by examiner

ANISOTROPIC CABLE SEALING GELS; AND METHODS FOR FABRICATING CABLE SEALING GELS

CROSS-REFERENCE TO RELATED APPLICATIONS

This application is a Continuation of U.S. patent application Ser. No. 17/745,005, filed on May 16, 2022, which is a Continuation of U.S. patent application Ser. No. 16/331,424, filed on Mar. 7, 2019, now U.S. Pat. No. 11,333,839, which is a National Stage Application of PCT/US2017/050291, filed on Sep. 6, 2017, which claims the benefit of U.S. Patent Application Ser. No. 62/384,306, filed on Sep. 7, 2016, and claims the benefit of U.S. Patent Application Ser. No. 62/384,328, filed on Sep. 7, 2016, and claims the benefit of U.S. Patent Application Ser. No. 62/468,635, filed on Mar. 8, 2017, and claims the benefit of U.S. Patent Application Ser. No. 62/468,607, filed on Mar. 8, 2017, and claims the benefit of U.S. Patent Application Ser. No. 62/492,713, filed on May 1, 2017, and claims the benefit of U.S. Patent Application Ser. No. 62/492,724, filed on May 1, 2017, and claims the benefit of U.S. Patent Application Ser. No. 62/492,740, filed on May 1, 2017, and claims the benefit of U.S. Patent Application Ser. No. 62/492,697, filed on May 1, 2017, the disclosures of which are incorporated herein by reference in their entireties. To the extent appropriate, a claim of priority is made to each of the above disclosed applications.

TECHNICAL FIELD

The present disclosure relates generally to cable sealing gels used for sealing telecommunications cables and to methods for producing the cable sealing gels.

BACKGROUND

Telecommunications networks often use enclosures for containing and protecting telecommunications equipment (e.g., splice locations, optical splitters, multi-plexers, connection panels, etc.). Enclosures used in outside environments are desirably sealed to prevent moisture intrusion. Example gel sealed enclosures are disclosed by U.S. Pat. No. 7,603,018, International Publication Nos. WO-99/41531, and WO-2014/128137 A2.

Pressurized gel-type seals have been used to effectively seal the locations where telecommunications cables enter and exit telecommunications enclosures. Example pressurized gel-type seals are disclosed by EP 0442941B1; EP 0587616B1; U.S. Pat. Nos. 5,455,391; 6,046,406 and WO 2014/005916.

While gel seals have been effective at sealing cable entry locations, there is a need for constructing gel seals in a way that can address multiple structural issues and can meet the structural, mechanical, and geometrical capabilities necessary for obtaining a proper seal. Improvements are needed in the area of composite gel constructions and methods of manufacturing such constructions.

FIG. 1 illustrates example pre-shaped gel blocks A and B surrounding a cable to create a seal thereabout. As depicted, the gel blocks A and B form a seal partially circumferentially around the cable while portions of the cable are not sealed. Such a problem can be described as an "eye effect" where a portion of the cable is not properly sealed. The eye effect problem can be a potential point of leakage. The points of potential leakage can be referred to as triple points because they are located where three surfaces meet (e.g., the cable surface and the two gel surfaces).

Gel seals are often pressurized under spring load to encourage the gel to deform or flow into void areas to provide effective sealing. Typically to get a good seal a softer gel is preferred to allow good flow around the cable to fill potential leakage points (e.g., triple points) once pressure is applied. However, a softer gel may be too fluid such that the gel may creep out, which can lead to a loss of pressure. This problem is illustrated in FIG. 2 and can be referred to as a "tent effect". "Tent effect" can occur when the gel blocks A and B begin to creep outwardly sideways upon application of pressure due to the gel blocks A and B being softer. The tent effect is generally a result of the gel blocks A and B losing containment and stored energy associated with a spring load or other source of stored energy.

Thus, although a softer gel may be desirable to create a better seal about the cable to rid the eye effect, the softer gel may create the tent effect. Improvements in cable sealing structures are desirable that balance these competing interests.

SUMMARY

Aspects of the present disclosure relate to structures, designs, and methods that allow gels to be used to address the eye effect problem without having to deal with the tent effect.

Features of the present disclosure relate to sealing structures that provide a seal useful for sealing optical fiber cables. The sealing structures can also provide a seal useful for electrical cables (e.g., with copper conductors), fiber optic cables, power cables, co-axial cables, twisted pair cables, drop cables, round cables, flat cables, distribution cables, multi-fiber cables, single fiber cables, ribbon cables, or other cables. The sealing structures can also be used for sealing enclosures such as telecommunications enclosures. The sealing structures can be of a gel-type structure including a reinforcing structure embedded therein. The reinforcing structure can have spring like characteristics to apply a spring load to the gel.

Another aspect of the present disclosure relates to anisotropic sealing structures that provide a seal useful for sealing optical fiber cables, electrical cables (e.g., with copper conductors), fiber optic cables, power cables, co-axial cables, twisted pair cables, drop cables, round cables, flat cables, distribution cables, multi-fiber cables, single fiber cables, ribbon cables, or other cables. The anisotropic sealing structures can also be used for sealing enclosures such as telecommunications enclosures. The anisotropic sealing structures provide anisotropic deformation characteristics. The anisotropic sealing structures can be of a gel-type structure. Sealing structures with anisotropic deformation characteristics are defined as cable sealing structures that have a preferred direction of deformation in which deformation is greater in one direction than in others. As a result, the anisotropic sealing structures can have different properties in different orientations. Seals in accordance with the principles of the present disclosure can also be used for sealing applications such as for sealing interfaces between mating pieces of an enclosure.

The sealing structure comprises a cable sealing body including a gel. The cable sealing body can include an x-dimension that extends a long an x-axis, a y-dimension that extends along a y-axis, and a z-dimension that extends along a z-axis. The anisotropic deformation characteristics of the sealing structure allows it to deform less in a cable pass-through direction along the z-axis as compared to at least one of the x and y axes in order to help prevent any "eye effect" or "tent effect" in the seal about the optical fiber cable.

Another aspect of the present disclosure relates to structures, designs, and methods that allow gels to be used to produce anisotropic composite sealing structures for telecommunications enclosures. The method can include a step of forming a spacer member that is adapted to define a porous structure of the anisotropic composite seal. The method can include the steps of cutting the spacer member into multiple strips and impregnating the spacer member with a gel or soft sealant material to form a composite sealing structure. The method can also include a deformation of the spacer member, prior to impregnation with a gel or soft sealant. The method can further include a step of slicing the gel impregnated spacer to form sealing inserts. Each one of the sealing inserts can have a construction with anisotropic deformation characteristics.

A further aspect of the present disclosure relates to a method that allows gels to be three dimensionally (3D) printed to provide the sealing structures useful for sealing cables (e.g., optical fiber cables, electrical cables (e.g., with copper conductors) fiber optic cables, copper cables, power cables, co-axial cables, twisted pair cables, drop cables, round cables, flat cables, distribution cables, multi-fiber cables, single fiber cables, ribbon cables, etc.) and for sealing enclosures such as telecommunications enclosures. The sealing structure can comprise a cable sealing body including a gel and a reinforcing material embedded in the gel. The reinforcing material can be synthetic or natural, in the form of fibers, textiles (knitted, woven or non-woven), foils and foams in strips or volumes, 3D structures, etc. 3D printing the hybrid gel reinforcing material to make the sealing structure allows for geometric capabilities above standard molding processes. The combination of 3D printing a gel with simultaneous co-dispensing such reinforcing material allows for more complex shapes and/or anisotropic behavior of the gel.

The method can include a 3D printing process including co-dispensing of the gel and the reinforcing material in a layer-by-layer manner along a printing axis by two or more separate printing nozzles. The method can include a 3D printing process including co-dispensing of the gel and the reinforcing material in a layer-by-layer manner along a printing axis by one shared printing nozzle. The method can also include a 3D printing process including co-dispensing both gel and a textile strip through a single nozzle in a layer-by-layer manner along a printing axis. It will be appreciated that 3D printing of the gel and the reinforcing material may be achieved in various other ways.

These and other features and advantages will be apparent from a reading of the following detailed description and a review of the associated drawings. A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

Figure 1:
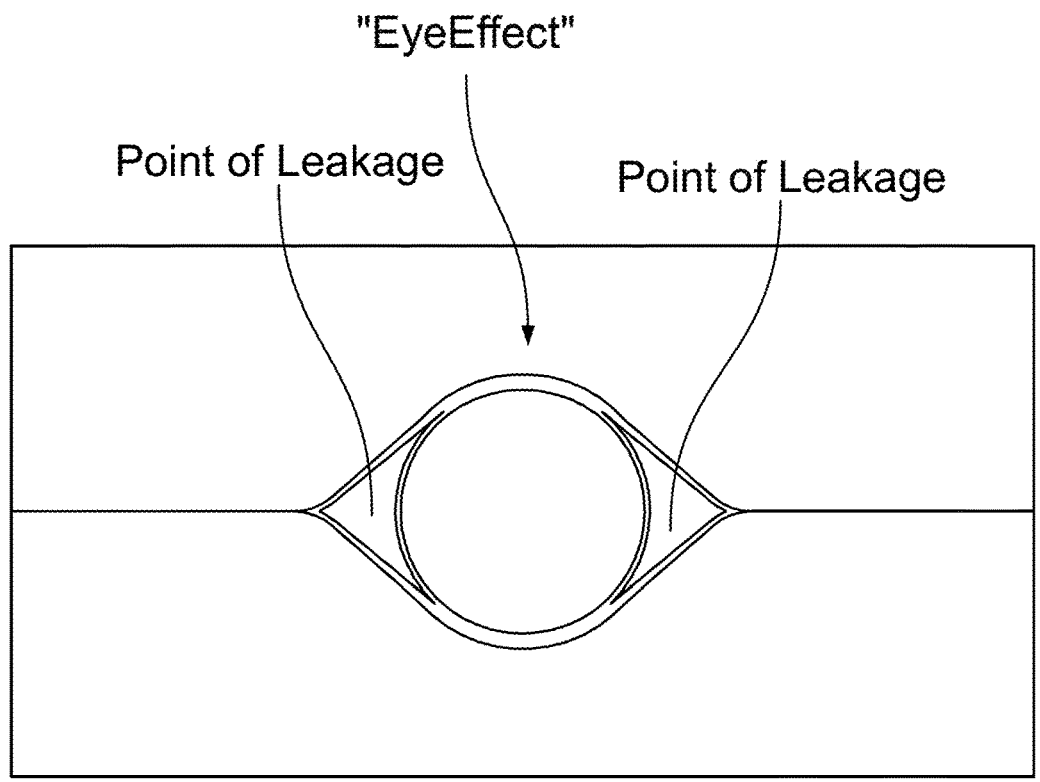
FIG. 1 is a schematic diagram of example prior art sealing gel blocks depicting a potential point of leakage.
Figure 2:
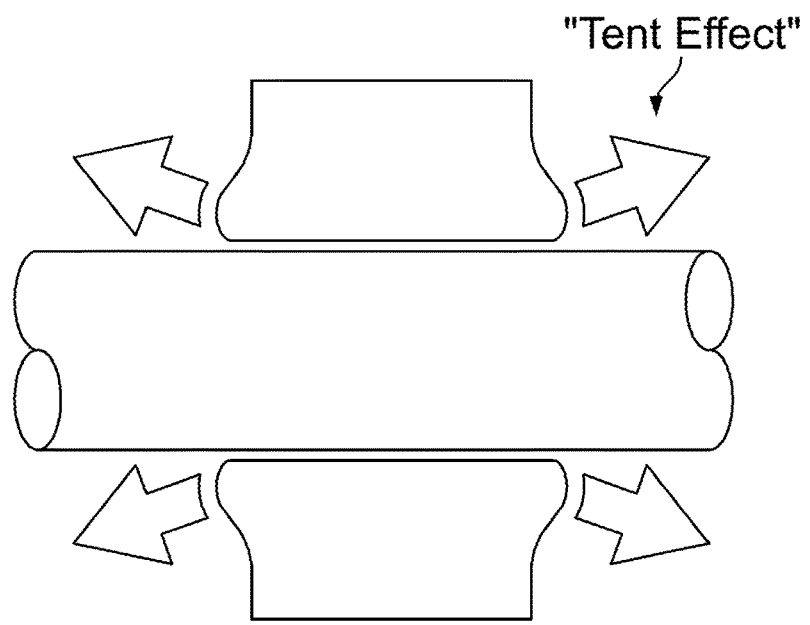
FIG. 2 is a schematic diagram of the prior art sealing gel blocks shown in FIG. 1 depicting a loss of energy or containment.

Reference will now be made in detail to the exemplary aspects of the present disclosure that are illustrated in the accompanying drawings. Wherever possible, the same reference numbers will be used throughout the drawings to refer to the same or like structure.

The present disclosure generally relates to a cable sealing structures or other sealing structures. An example cable sealing body includes a cable sealing structure 10 (e.g., a composite sealing structure)(see FIGS. 3 and 4) and a cable sealing body 12 (see FIG. 4). The cable sealing body 12 can include a gel. The cable sealing body 12 can have a construction with spring like characteristics such that as the cable sealing body 12 deforms, an elastic load is applied the cable sealing body 12. As a result, the spring like characteristics cable of the cable sealing body 12 allows the cable sealing structure 10 to effectively seal fiber optic cables more uniformly while limiting the potential of leakage. The cable sealing structure 10 or cable sealing body 12 can also have a construction with anisotropic deformation characteristics that allow the cable sealing body 12 to be less deformable in one direction than in others. The cable sealing structure 10 can be utilized to seal fiber optic cables more uniformly while limiting the potential of leakage (e.g., triple points).

As used herein, the term, "anisotropic," is defined as having physical properties that are different in measurement along different axes or directions. Therefore, cable sealing structures can have a construction that exhibit an anisotropic behavior such that the cable sealing structures deform more easily or in one direction more than in another. Thus, the cable sealing structure can have a construction in which deformation is preferred in one or more orientations as compared to one or more other orientations.

In one example, cable sealing structures may comprise gel and/or gel combined with another material such as an elastomer, although alternatives are possible. For example, the gel may comprise silicone gel, urea gel, urethane gel, thermoplastic gel, or any suitable gel or geloid sealing material.

Gels are normally substantially incompressible (e.g., like a liquid) when placed under a compressive force and normally flow and conform to their surroundings thereby forming sealed contact with other surfaces. Example gels include oil-extended polymers. The polymer may, for example, comprise an elastomer, or a block copolymer having relatively hard blocks and relatively elastomeric blocks. Example copolymers include styrene-butadiene or styrene-isoprene di-block or tri-block copolymers.

In other examples, the polymer of the gel may include one or more styrene-ethylene-propylene-styrene block copolymers. Example extender oils used in example gels may, for example, be hydrocarbon oils (e.g., paraffinic or naphthenic oils or polypropene oils, or mixtures thereof). The cable sealing structures can also include additives such as moisture scavengers, antioxidants, tackifiers, pigments and/or fungicides.

Suitable gels also include those comprising silicone, e.g. a polyorganosiloxane system, polyurethane, polyurea, styrene-butadiene copolymers, styrene-isoprene copolymers, styrene-(ethylene/propylene)-styrene (SEPS) block copolymers (available under the tradename Septon™ by Kuraray), styrene-(ethylene-propylene/ethylene-butylene)-styrene block copolymers (available under the tradename Septon.™ by Kuraray), and/or styrene-(ethylene/butylene)-styrene (SEBS) block copolymers (available under the tradename Kraton™ by Shell Oil Co.). Suitable extender fluids include mineral oil, vegetable oil, paraffinic oil, silicone oil, plasticizer such as trimellitate, or a mixture of these, generally in an amount of 30 to 90% by volume of the total weight of the gel.

In certain examples, the gel may be a thermosetting gel, e.g. silicone gel, in which the crosslinks are formed through the use of multifunctional crosslinking agents, or a thermoplastic gel, in which microphase separation of domains serves as junction points. Thermoplastic elastomers, unlike thermoset elastomers, can be processed using melt processing techniques.

Thermosetting gels are typically based on silicone chemistry, e.g. a polyorganosiloxane system, and result in a chemically cross linked gel. For example, divinyl polydimethyl siloxane compounds of up to 80,000 cSt viscosity may be used with tetra or tri hydride cross linking agents (such as tetrakis dimethyl siloxy silane, SIT 7278 from Gelest for example), and cross link the divinyl using a platinum catalyst. The cross link density is kept low by extending the system with non-reactive polydimethyl siloxane (silicone fluid). Typical formulations contain 60-70% silicone fluid, 30-40% divinyl siloxane (80,000 cSt viscosity), 1-2% cross linking agent and 5-100 ppm catalyst.

Thermoplastic gels are typically based on mixing some type of extender (usually hydrogenated, refined, paraffin oil −70% paraffin, with a fairly high molecular weight) with block copolymers. The block copolymers are usually based on styrene and a rubber midblock such as Kraton G1651 (hydrogenated ethylene butylene midblock) or Septon 2006 (ethylene propylene midblock). The block copolymers can be styrene-ethylene butylene-styrene SEBS (tri block) for example or styrene-ethylene butylene SEB (diblock) for example. Typical diblock copolymers include Kraton G1701H, G1702H, Septon S1001. Typical triblock copolymers include Kraton G1651H, G1652M, G1654H, Septon S8004 and S2006. The hardness may be adjusted by varying the ratio of diblock to triblock and the amount of extender added. Thermoplastic gel formulations may range from 6% rubber to 20% rubber and 80% diblock (of the total rubber amount) to no diblock. Optionally other additives may be included in the formulations including UV stabilizers, corrosion inhibitors, fungicide, antioxidants, pigment, etc.

The term "thermoplastic elastomer" refers to an elastomer comprising a thermoreversible network. (Definitions of terms relating to the structure and processing pf sols, gels, networks, and inorganic-organic hybrid materials-IUPAC Recommendations 2007-Pure Appl. Chem., Vol. 79, No. 10, pp. 1801-1829, 2007, p. 1811). Thermoplastic elastomers (TPE), sometimes referred to as thermoplastic rubbers, are a class of copolymers or a physical mix of polymers (usually a plastic and a rubber) which consist of materials with both thermoplastic and elastomeric properties.

The term "thermoplastic" refers to a polymer that softens when exposed to heat and returns to a more rigid condition when cooled. These polymers can typically go through repeated melting and freezing cycles, and can be reshaped upon reheating.

Thermoplastic polymers typically are high-molecular weight polymers, have a chain length capable of forming entanglements, or are longer than a persistence length (i.e., the length in which correlations in the direction of the tangent are lost). In certain embodiments, the thermoplastic polymer has a molecular weight greater than approximately 30,000 g/mol. These polymers may be amorphous or semi-crystalline in structure in their solid state. Examples of thermoplastic polymers include, but are not limited to compounds having a backbone containing: polyethylene, polypropylene, acrylonitrile butadiene styrene, acrylic, celluloid, cellulose acetate, cycloolefin copolymer, ethylene vinyl acetate, ethylene vinyl alcohol, fluorinated ethylene propylene, fluoroplastics, perfluoroalkoxy copolymer, polyacetal, polyacrylates, polyacryonitrile, polyamine, polyamide-imide, polyaryletherketone, polybutadiene, polybutylene, polybutylene terephthalate, polycaprolactone, polychlorotrifluoroethylene, polyethylene terephthalate, polycyclohexylene dimethylene terephthalate, polycarbonate, polyhydroxyalkanoates, polyketone, polyester, polyetheretherketone, polyetherketoneketone, polyetherimide, polyethersulfone, polyethylenechlorinates, polyethylene tetrafluoroethylene, polyimide, polylactic acid, polymethylpentene, polyphenylene oxide, polyphenylene sulfide, polyphthalamide, polystyrene, polysulfone, polytrimethylene terephthalate, polyurethane, polyvinyl acetate, polyvinyl chloride, polyvinylidene chloride, styrene-acrylonitrile, and combinations or copolymers thereof. In one embodiment, the thermoplastic polymer has a polyethylene backbone. In another embodiment, the thermoplastic polymer has an acrylic backbone. In still another embodiment, the thermoplastic polymer has a polymethyl methacrylate backbone. In yet another embodiment, the thermoplastic polymer has a butadiene backbone.

The gel can have measurable properties. For example, in some examples, the gel has a hardness in the range of 24 to 53 Shore 000 Hardness, or 80 to 300 g, as measured according to methods known in the art. In certain examples, the shore hardness gauge is measured according to ISO868, ISO 7619-1, or ASTM D2240. In other examples, hardness can be measured on a texture analyzer. For example, a LFRA Texture Analyzer-Brookfield may include a probe assembly fixed to a motor driven, bi-directional load cell. In such a system, the probe is driven vertically into the sample at a pre-set speed and to a pre-set depth. The hardness is the amount of force needed to push the probe into the test sample. In other examples, the gel has a hardness in the range of 37 to 45 Shore 000, or 160 to 220 g. In yet other examples, the gel has a hardness in the range of 38 to 42 Shore 000, or 170 to 200 g. In other examples, the gel has a hardness within 10 to 30 on the Shore-000 scale, within 30 to 60 on the Shore-000 scale, or within 10 to 25 on the Shore-000 scale.

In some examples, the gel has a durometer of less than 30 on the Shore-000 scale. In certain examples, the gel has a durometer in the range of 5 to 50 on the Shore-A scale. The measurement of the durometer does not include the reinforcing material, but relates only to the gel material.

In certain examples of the method, the dry silicone gel comprises one or more of the following properties: (1) a hardness between 100 grams ("g") and 300 g as measured on a TA-XT2 texture analyzer from Texture Technologies, (or between 26-53 Shore 000 Hardness), (2) a stress relaxation between 40% and 60% when the gel is subjected to a deformation of 50% of its original size, (3) a compression set between 4% and 20% after 50% strain has applied to the gel for 1000 hours at 70 degrees C., and (4) less than 10% oil bleed out after being under compression of 1.2 atm for 60 days at 60 degrees C. It will be appreciated that there are lots of other test methods that may be used and properties that may be measurable.

In certain examples, cable sealing structures in accordance with the principles of the present disclosure have ultimate elongations greater than 100 percent with substantially elastic deformation to an elongation of at least 100 percent. In other examples, cable sealing structures in accordance with the principles of the present disclosure have ultimate elongations of at least 200 percent, or at least 500 percent, or at least 1000 percent. Ultimate elongation can be determined by the testing protocol set forth at ASTM D412.

Figure 3:
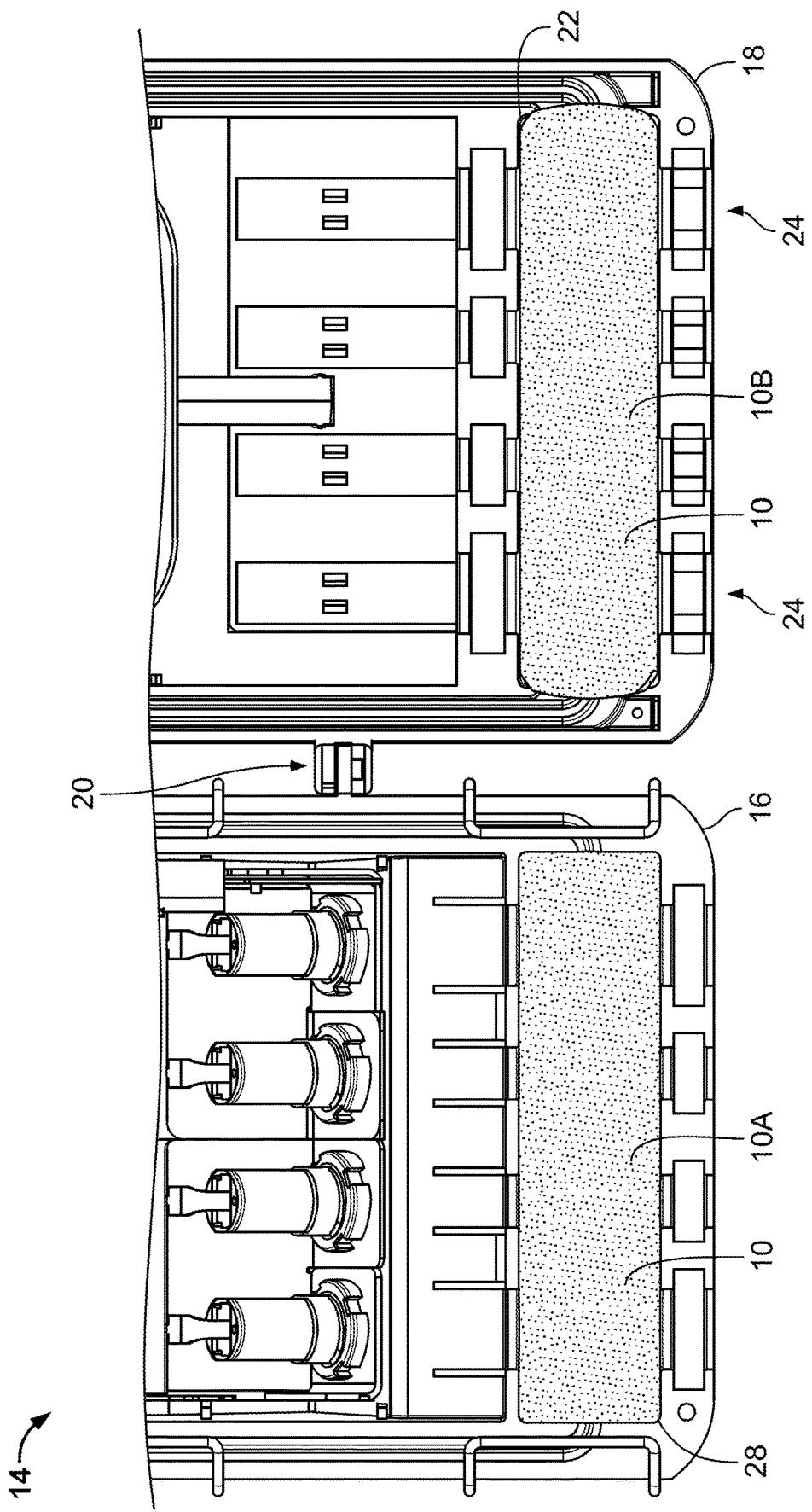
FIG. 3 is a top view of an example enclosure showing a cable sealing structure positioned therein.

As described herein, the techniques of this disclosure may be implemented in many ways. For example, the techniques of this disclosure may be implemented in an optical termination enclosure (OTE) 14 as shown in FIG. 3, although alternative enclosures are possible. In one example, aspects of the present disclosure can be used to seal a housing (e.g., an enclosure, a cabinet, closure, box, pedestal, etc.). In certain examples, the housing can have a IP40+ sealing performance or better.

Turning to FIG. 3, the enclosure 14 may include a lid member 16 and a base member 18. The enclosure 14 is preferably re-enterable and environmentally sealed. The lid member 16 and the base member 18 may be constructed of a variety of different types of materials including plastic, metal, and/or other types of materials. Hinges 20 can pivotally attach the lid member 16 to the base member 18. A set of latches (not shown) may be attached to one of the base member 18 or the lid member 16 to secure the parts together or provide latching therebetween, although alternatives are possible. For example, mechanical fasteners, such as, screws, bolts, clamps, or other mechanical fastening arrangements can be used.

The base member 18 can define a base sealing receptacle 22 and cable entry ports 24 through which a telecommunications cable 26 (see FIG. 5) passes. The lid member 16 may also define a lid sealing receptacle 28 that mates or cooperates with the base sealing receptacle 22 when the lid member 16 and the base member 18 are in a closed position. The cable sealing structure 10 (e.g., composite sealing structure) may be arranged and configured in the base and lid sealing receptacles 22, 28 of the enclosure 14. In certain examples, each entry port can be defined in part by the base member 18 and in part by the lid member 16, and cables can be sealed between the composite sealing structure 10 of the base member 18 and the lid member 16. Because the cable sealing structure 10 is relativity soft and deformable, the telecommunications cable 26 deforms (e.g., pressurizes) the cable sealing structure 10 when the cable sealing structure 10 is pressurized as the enclosure 14 is moved toward the closed position.

It will be appreciated that the cable sealing structure 10 positioned within the base sealing receptacle 22 and the lid sealing receptacle 28 may be different or identical. For example, the lid sealing receptacle 28 may include a cable sealing structure 10A that is different in material and geometry compared to the cable sealing structure 10B positioned in the base sealing receptacle 22, although alternatives are possible. In other examples, the cable sealing structures 10A and 10B may both be identical with respect to their material compositions and geometries.

Unlike most typical gel-blocks that rely on telecommunications enclosures to apply an external spring load thereon to exert a sealing pressure causing the gel to deform about the telecommunications cable 26, the cable sealing structure 10 of the present disclosure optionally has internal spring load characteristics. The cable sealing structure 10 can include a reinforcing structure embedded in the cable sealing body 12 to optionally deliver the desired spring load capacity and enhance containment as well as sealing about the telecommunications cable 26. Some examples of the reinforcing structures can have inherent elastic/spring-like characteristics that can provide internal spring loading within the gel block during sealing. Other reinforcing structures may not have elastic characteristics and can mainly provide reinforcement to the gel block. The reinforcing structure can include a variety of materials, such as, but not limited to, a braided textiles, woven, or non-woven textiles, fibers, yarns, fine metal wires, plastics, glass fibers, foils, foams, mesh, continuous reinforcing elements, discontinuous reinforcing elements, etc. The reinforcing structure can also be arranged and configured such that the cable sealing structure 10 can have any geometry. A suitable shape may be any desired shape, such as a geometric shape, e.g., a circle, square, rectangle, triangle, or combinations thereof. In certain examples, the reinforcing structure may be a preform three-dimensional structure.

As a result, in some examples, it is not necessary that the telecommunications enclosures apply a spring load to the cable sealing structure 10 by using an actuator that may typically include a spring and a clamp or threaded actuator for compressing the spring to pressurize the gel. For example, it will be appreciated that the cable sealing structure 10 may be utilized in telecommunications enclosures that do apply an external spring load to the cable sealing structure 10 via some type of biasing member. The cable sealing structure 10 can include gel-blocks that mount within telecommunications enclosures and rely on the telecommunications enclosures to provide relatively rigid containment and pressurization of the gel-blocks as the gel-blocks include a spring load for maintaining the gel in compression.

In other examples, an external biasing member (not shown) may be mounted on the enclosure 14 for pressurizing the gel. According to some examples, the biasing member may be a spring member. The spring may be formed of any suitable material. For example, the spring can be formed of a metal such as steel, stainless steel or bronze. In some examples, other types of biasing members may be used. For example, the biasing member may include a coil spring, a Belleville washer, and elastomeric spring member, or a deformable/elastic containment structure (e.g., a bladder) filled with a compressible fluid.

The biasing member may be used to apply a compressive spring load to the cable sealing structure 10. As a result, the biasing member may exert a sealing pressure around the telecommunications cable 26. The pressure applied to the telecommunications cable 26 can be selectively set so that an effective seal is provided fully about the telecommunications cable 26. The telecommunications cable 26 is not overloaded or overcompressed by the pressurized sealant. Such overloading may damage the telecommunications cable 26, particularly in the case of optical fibers.

In certain examples, the cable sealing structure 10 optionally does not have pre-formed notches or openings for receiving the telecommunications cable 26. In other examples, pre-formed notches, depressions, or openings can be provided in the gel.

Figure 4:
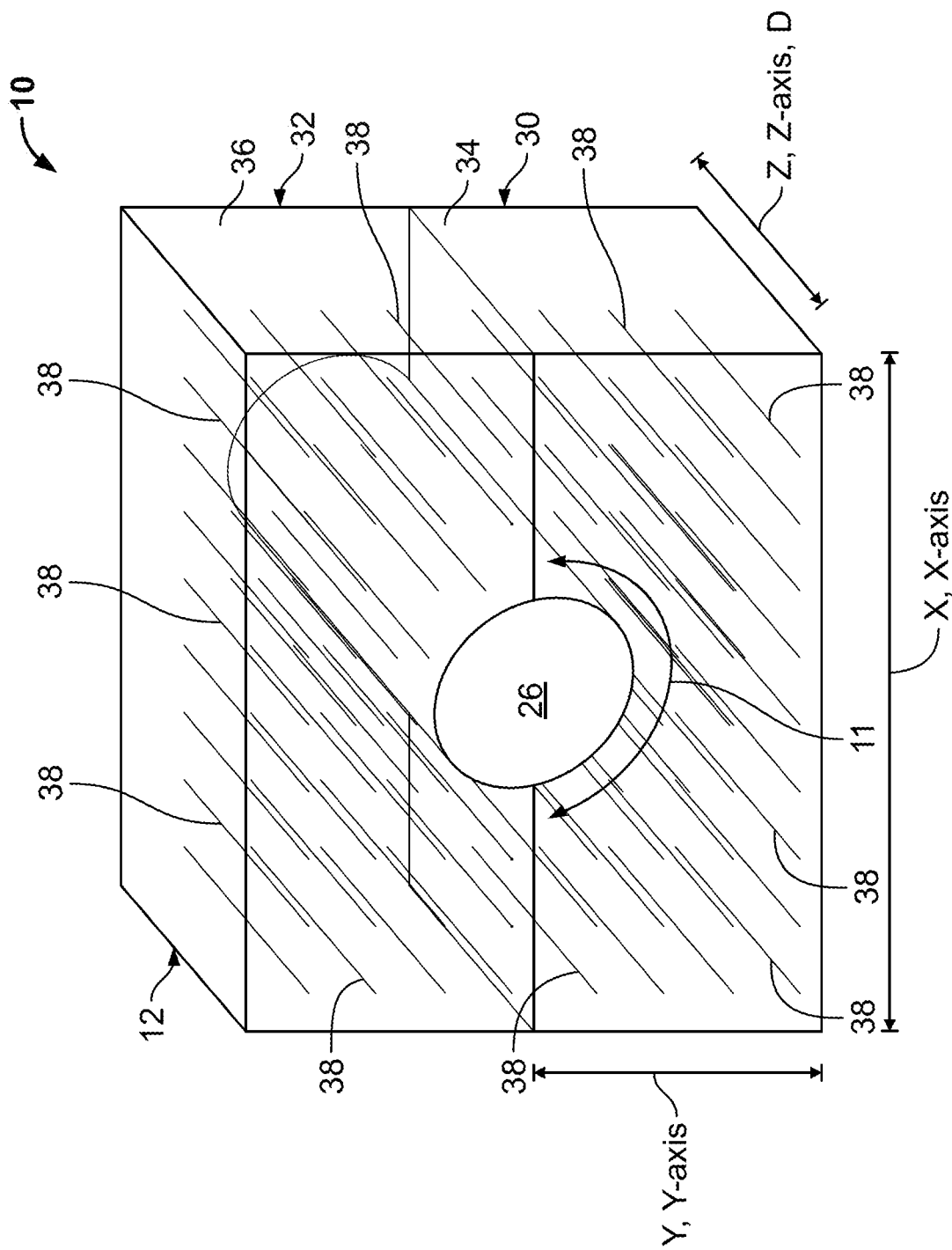
FIG. 4 is a schematic diagram of an example cable sealing structure in accordance with principles of the present disclosure.
Figure 4A:
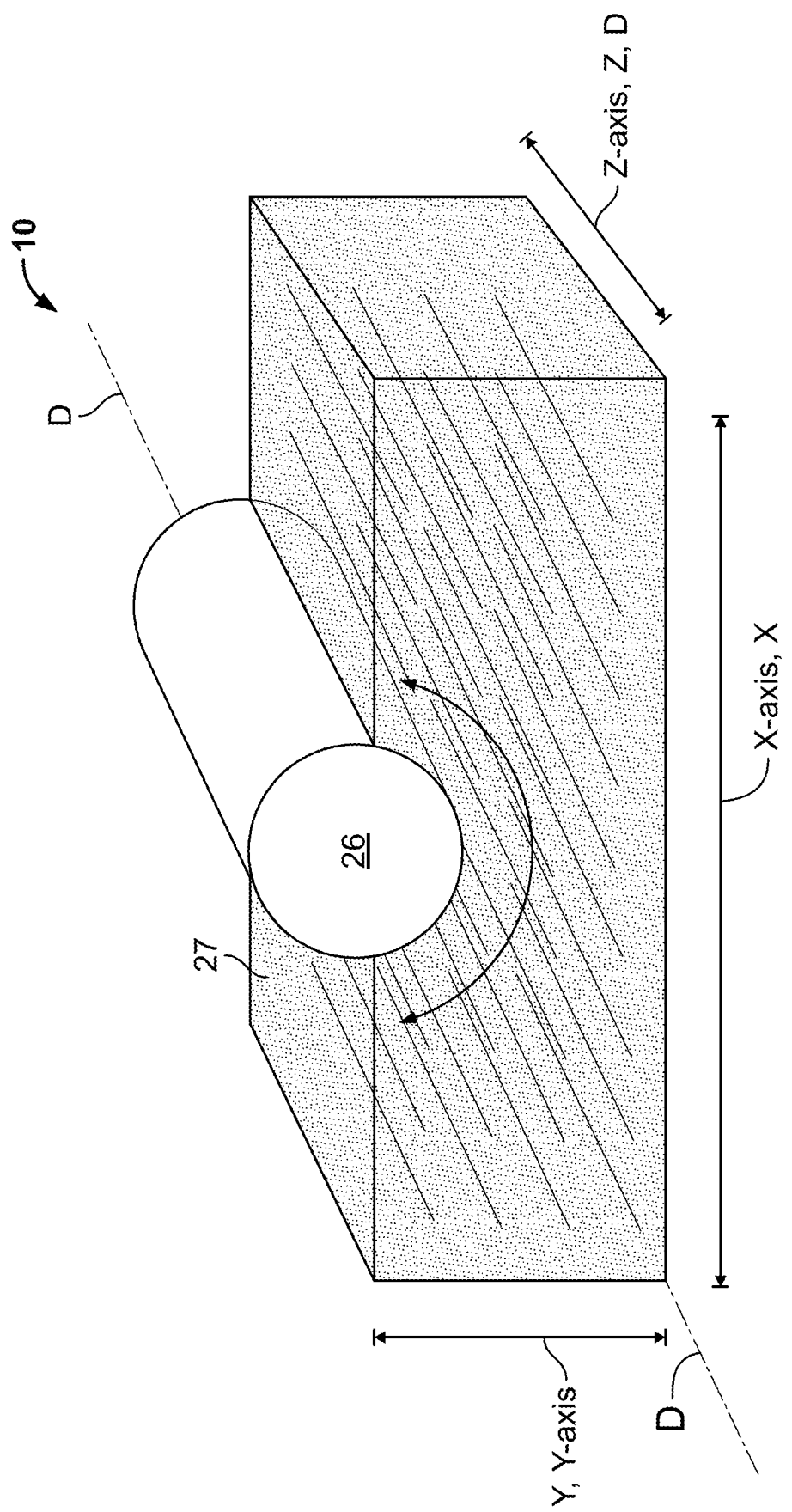
FIG. 4A is a schematic diagram of an example cable sealing structure showing one gel block sealing about a portion of a telecommunications cable.
Figure 5:
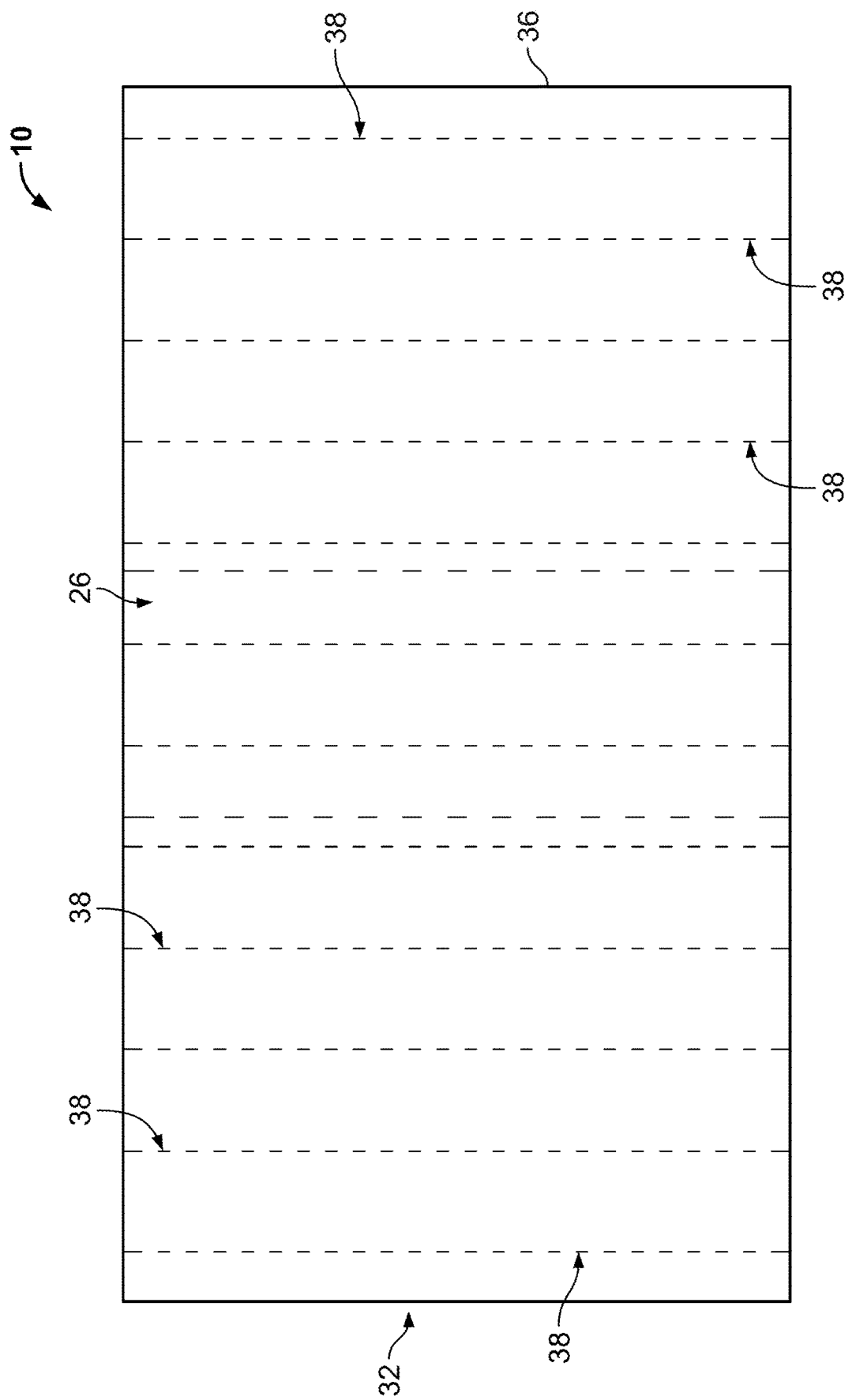
FIG. 5 is a top view of the cable sealing structure shown in FIG. 4.

Turning now to FIGS. 4 and 5, the example cable sealing structure 10 can include a first gel block 30 (e.g., gel insert) and a second gel block 32 (e.g., gel insert). In the depicted example, the first and second gel blocks 30, 32 are positioned one on top of the other such that the first and second gel blocks 30, 32 can be used as a pair, although alternatives are possible. FIG. 4A shows one gel block. The gel block would typically cooperate with another gel block as shown in FIG. 4 to provide full sealing about a cable. In certain examples, the gel block can be applied in enclosures that may have axial and/or transversal compression designs. As such, in certain examples, axially and transversally compressible design assemblies may include reinforced gel blocks positioned between two support structures or in a clampshell. The gel blocks can meet at a sealing interface 27 or sealed seam. It will be appreciated that the first and second gel blocks 30, 32 may have identical material compositions and geometries, although alternatives are possible. For example, the first and second gel blocks 30, 32 may each have different material compositions and the first and second gel blocks 30, 32 may each have different geometries. It will be appreciated that the first and second gel blocks 30, 32 may be used with other cable sealing structures 10.

Although rectangular gel blocks are depicted, it will be appreciated that the cable sealing structure 10 may be arranged and configured as a strip, or other type of arrangement such as a cylindrical block, a truncated triangular block, a wedge-shaped block, a portion of a cylinder, a portion of an annulus, or other shapes. The first and second gel blocks 30, 32 can be arranged and configured to mate or cooperate together in an enclosure to form a seal about a telecommunications cable. The first and second gel blocks 30, 32 each include a cable sealing body 34, 36 including a gel. In the illustrated example, the first gel block 30 is identical to the second gel block 32; as such, only the first gel block 30 will be described herein. Those of skill in this art will appreciate that the discussion of the first gel block 30 applies equally to the second gel block 32. Also, in some examples the first and second gel blocks 30, 32 may not be identical.

The cable sealing body 34 of the first gel block 30 can include an x-dimension X that extends along an x-axis, a y-dimension Y that extends along a y-axis, and a z-dimension Z that extends along a z-axis. In one example, the x-axis defines a length axis of the cable sealing body, the y-axis defines a height axis of the cable sealing body, and the z-axis defines a depth axis of the cable sealing body. In this example, the z-axis corresponds to a cable pass-through direction D.

The anisotropic behavior of the cable sealing body 34 of the cable sealing structure 10 allows the cable sealing body 34 to move less along the z-axis or the cable pass-through direction D as compared to at least one of the x and y axes. Thus, deformation is preferred along the x and y axes as compared to the z-axis. For example, the cable sealing body 34 can be more flexible and/or flowable along the x and y axes while being more stiff and/or non-flowable, restricted along the z-axis. Because the cable sealing body 34 can have anisotropic deformation characteristics which resist deformation along the z-axis, a softer gel can be used without experiencing tenting during pressurization of the sealing structure. A softer gel can readily flow in the x and y dimensions when load pressure is applied to the cable sealing body 34. The pressure forces the gel to deform and move effectively around the telecommunications cable 26 through deformation in the x and y orientations due to the softness of the gel while the reinforcement (e.g., reinforcing structure) limits movement in the cable pass-through direction D to reduce tenting and to provide effective gel containment. As a result, the stretching and/or telescoping effect of the cable sealing body 34 of the cable sealing structure 10 can be reduced to thereby help limit the eye and tent effects (see FIG. 4). Because the cable sealing body 34 can be more contained more effectively within a telecommunications cable enclosure, it is not necessary that the telecommunications cable enclosure match closely with a cable diameter. As such, the telecommunications cable enclosure can be arranged and configured to receive increased cable dimeter ranges without having a need for closure entry adaptions or cable size matching inserts.

In some examples, pre-formed notches, openings, or passages can be formed in the composite sealing structure 10 for receiving cables. In other examples, no pre-formed notches or openings are provided such that space for the cables through the gel block is provided entirely by deformation of the sealing structures. In some examples, relatively small pre-formed passages can accommodate a wide range of cable sizes. Pre-formed cable passages may or may not be provided at the sealing interface between two composite cable sealing structures 10.

In one example, the cable sealing body 34 of the cable sealing structure can include at least one reinforcing structure 38. In the examples depicted in FIGS. 4 and 5, the cable sealing body 34 includes a plurality of separately discrete reinforcing structures 38. The plurality of separately discrete reinforcing structures 38 are generally aligned along the z-axis of the cable sealing body 34, although alternatives are possible. In certain examples, the plurality of separately discrete reinforcing structures 38 may not be exclusively aligned along the z-axis. The plurality of separately discrete reinforcing structures 38 are generally aligned along the axis of reduced deformation which provides the anisotropic behavior. The reinforcing structures 38 help to restrict the movement of the cable sealing body 34 along the z-axis that corresponds to the cable pass-through direction D. As a result, the cable sealing body 34 is less deformable along the z-axis as compared to both the x and y axes to achieve anisotropic behavior. Such a configuration helps to limit the eye and tent effect that can typically result form using a softer gel.

In certain examples, the cable sealing body 34 is less deformable along the z-axis as compared to at least one of the x and y axes. Thus, deformation is preferred along the x and y axes as compared to the z-axis. That is, the cable sealing body 34 can be more flexible and/or flowable along the x and y axes while being more stiff and/or non-flowable, restricted along the z-axis. Because the able sealing body 34 can have anisotropic deformation characteristics which resist deformation along the z-axis, a softer gel can be used without experiencing tenting during pressurization of the cable sealing structure 10. A softer gel can readily flow into x and y dimensions when load pressure is applied to the cable sealing body 34. The pressure forces the gel to move effectively around the telecommunications cable 26 through deformation into x and y orientations while the reinforcement (e.g., reinforcing structure) limits movement in the cable pass-through direction D to reduce tenting and to provide effective gel containment.

The reinforcing structure 38 can have spring like characteristics with flexibility along the y-axis such that the reinforcing structure 38 is configured to take an radial load of the telecommunications cable 26 being applied. The reinforcing structure 38 can compress or buckle under the load of the telecommunications cable 26 being applied. As a result, the spring effect of the reinforcing structure 38 can cause the gel of the cable sealing body 34 to be pushed upwardly to wrap the telecommunications cable 26 circumference better and help to limit the eye and tent effect. For example, the cable sealing body 34 can apply opposing biasing force or a spring effect along the z-axis while allowing movement along the y-axis, which helps to close the eye-effect. As a result, a complete seal can be formed about the telecommunications cable 26 as indicated by arrow 11 (see FIG. 4) while restricting movement in other areas or orientations. Spring biasing can be provided in the x-dimension and/or the y-dimension and/or the z-dimension to spring bias the gel in a manner that helps prevent an "eye" effect at the seal around the telecommunications cable 26 to provide effective triple point sealing. Thus, the reinforcing structure 38 can be configured to intentionally spring bias the gel into the triple point regions during sealing under pressure. In certain examples, the reinforcing structure 38 can cause the gel of the cable sealing body 34 to migrate in various directions about the telecommunications cable 26 to create a complete seal while restricting movement in other areas or orientations.

In certain examples, the reinforcing structure 38 can have a rebound effect such that the reinforcing structure 38 is arranged and configured to return back to its pre-deformed shape. The reinforcing structure 38 can be embedded into the cable sealing body 34 to limit stretching along the z-axis by having a desired stiffness or flexibility in the Z dimension, to allow stretching along the z-axis, and to be compressible along the y-axis but having a spring/rebound effect. The reinforcing structure 38 can compress under axial load of the cable 26 to provide a spring effect pushing the gel upwards such that gel of the cable sealing body 34 can better seal around the cable 26 and limit the eye effect. The reinforcing structure 38 can rebound to its pre-deformed shape to provide an up and down spring elastic load to the gel of the cable sealing body 34.

In some examples, the cable sealing body 34 of the cable sealing structure 10 is less deformable along the z-axis as compared to at least one of the x and y axes. In other examples, the at least one reinforcing structure 38 can be oriented and positioned in the cable sealing body 34 of the cable sealing structure 10 such that the cable sealing body 34 is more deformable along the x-axis as compared to at least one of the y and z axes. In certain examples, the at least one reinforcing structure 38 can be oriented and positioned in the gel of the cable sealing body 34 such that the cable sealing body 34 is more deformable along the x-axis as compared to both the y and z axes.

In certain examples, the reinforcing structure 38 may include a spring mesh, screen, or netting, braided textiles, woven, or non-woven textiles, fibers, yarns, fine metal wires, plastics, glass fibers, foils, foams, etc., although alternatives are possible. In some examples, the reinforcing structure 38 may include a metal, extensible fabric, a 3D textile or spacer fabric, an anisotropic 3D textile or knitted fabric, a biasing member, such as a spring, strength members, elastics, a preform three-dimensional structure, although alternatives are possible. The reinforcing structure 38 can include a continuous bead, thread, or other shape of uninterrupted, interconnected material or can be formed by a plurality of separate non-continuous pieces. In other examples, both of the cable sealing bodies 34, 36 can have a construction with anisotropic deformation characteristics. The anisotropic behavior of the cable sealing body 34 of the cable sealing structure 10 allows the cable sealing body 34 to move less along the z-axis or the cable pass-through direction D as compared to at least one of the x and y axes. For example, the cable sealing body 34 can be more flexible and/or flowable along the x and y axes while being stiff and/or non-flowable, restricted along the z-axis.

The cable sealing body 34 can have anisotropic deformation characteristics that include a softer gel which can readily flow into x and y dimensions, when load pressure is applied to the cable sealing body 34 the pressure forces the gel to deform and move effectively around the telecommunications cable 26 through deformation in the x and y orientations due to the softness of the gel while the reinforcement (e.g., reinforcing structure) limits movement in the cable pass-through direction D to reduce tenting and to provide effective gel containment. As a result, the stretching and/or telescoping effect of the cable sealing body 34 of the cable sealing structure 10 can be reduced to thereby limit the eye and tent effects.

The cable sealing body 34 can also be more contained more effectively within a telecommunications cable enclosure such that it is not necessary that the telecommunications cable enclosure match closely with a cable diameter. As such, the telecommunications cable enclosure can be arranged and configured to receive increased cable dimeter ranges without having a need for closure entry adaptions or cable size matching inserts. In some examples, pre-formed notches or passages can be formed in the cable sealing structure 10 for receiving cables. In other examples, no pre-formed notches or openings are provided such that space for the cables through the gel block is provided entirely by deformation of the cable sealing structures 10. In some examples, relatively small pre-formed passages can accommodate a wide range of cable sizes. Pre-formed cable passages may or may not be provided at the sealing interface between two composite sealing structures.

Thus, an advantage of the cable sealing structure 10 is that a wider variety of cable sizes and shapes can be sealed with a single sealing structure and closure geometry. The cable sealing structure 10 can provide for fewer variants in cable entry designs at the cable entry portion of an enclosure, which can make for a much simpler and more versatile seal that can be more cost effective and design insensitive. Also, less force can be required to make the gel accommodate to the cable, which can make installation easier and require less structure strength for the enclosure.

Figure 6:
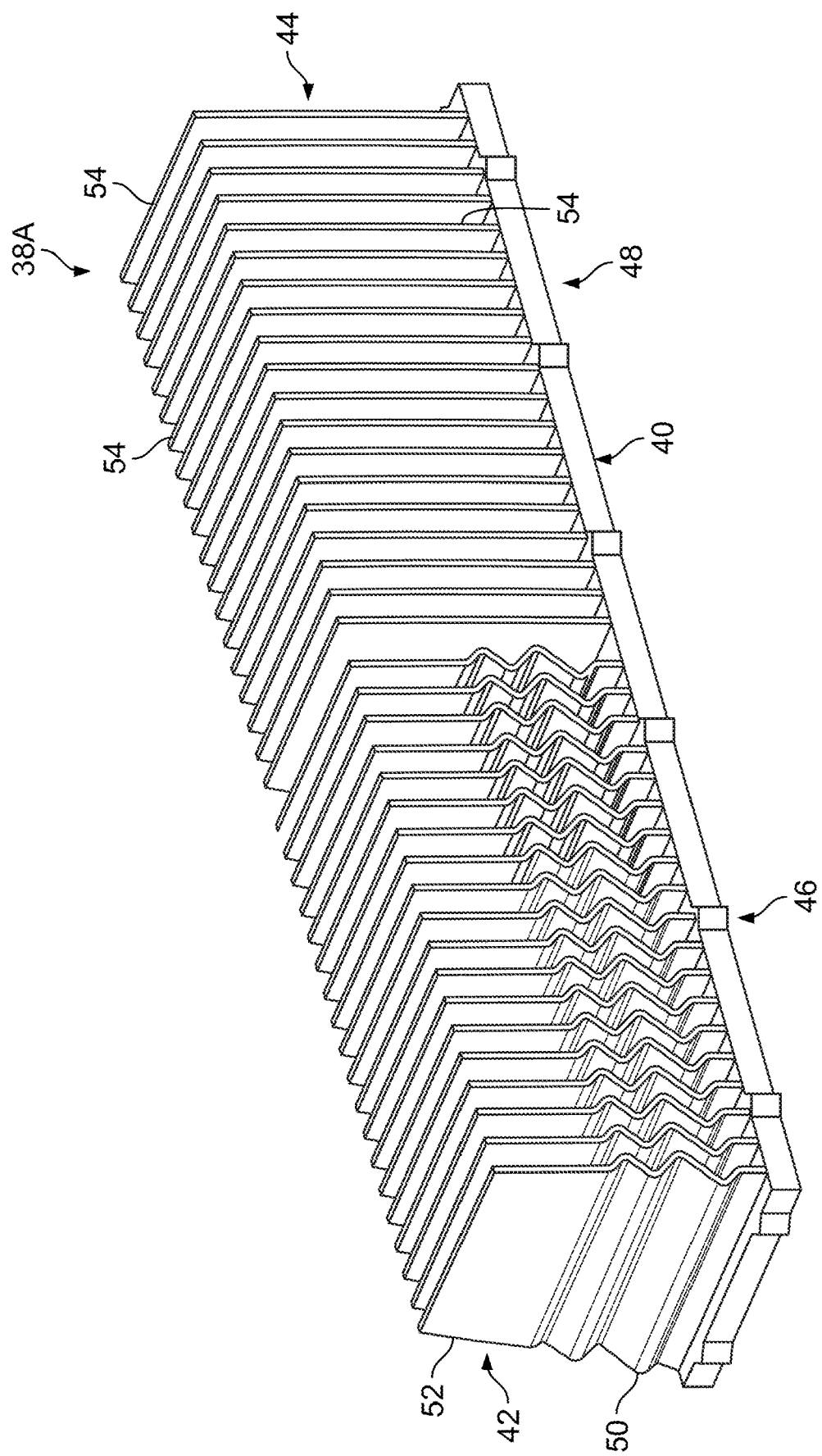
FIG. 6 is a schematic diagram of a reinforcing structure depicting two different example patterns in accordance with principles of the present disclosure.

Turning now to FIG. 6, another example reinforcing structure 38A is depicted. The reinforcing structure 38A can be arranged and configured to be embedded into the cable sealing body 12.

The reinforcing structure 38A includes spring like characteristics that provide a spring and rebound effect. The rebound effect adds additional features and advantages to the anisotropic behavior of the cable sealing structure 10. The reinforcing structure 38A can include a base member 40 having a first end and an opposite second end; a plurality of deformable projecting rib members 42 extending from the base at the first end; and/or a plurality of non-deformable projecting rib members 44 extending from the base at the second end. As depicted, the plurality of deformable projecting rib members 42 are positioned in a first portion 46 of the reinforcing structure 38A and the plurality of non-deformable projecting rib members 44 are positioned in a second portion 48 of the reinforcing structure 38A, although alternatives are possible. In certain examples, the plurality of deformable projecting rib members 42 and the plurality of non-deformable projecting rib members 44 may be intertwined or alternately positioned relative to one another. The plurality of deformable projecting rib members 42 and the plurality of non-deformable projecting rib members 44 may be combined together in a single reinforcing structure.

In other examples, the plurality of deformable projecting rib members 42 and the plurality of non-deformable projecting rib members 44 may be configured as separate reinforcing structures respectively positioned in their respective cable sealing bodies 12. In still other examples, the plurality of deformable projecting rib members 42 and the plurality of non-deformable projecting rib members 44 may be respectively combined with a different reinforcing structure. The example reinforcing structure 38A can provide a structure that is deformable along the y-axis and is non-deformable or have limited deformability along the z-axis.

The configuration of the reinforcing structure 38A provides the cable sealing body 12 with optimal sealing performance. The reinforcing structure 38A can have reduced stiffness along the y-axis to provide the desired spring and rebound effect in the first portion 46 as compared to the second portion 48 where the stiffness may not be as low. It will be appreciated that other variations of reinforcing structures, shapes and/or patterns are possible.

The plurality of deformable projecting rib members 42 are arranged and configured to provide spring like characteristics, although alternatives are possible. In one example, the plurality of deformable projecting rib members 42 can each have two segments, an elastic segment 50 and an inelastic segment 52. The elastic segment 50 can be configured with spring like, elastic characteristics. For example, the elastic segment 50 can be arranged and configured to apply a biasing force or spring effect while under a radial load of the telecommunications cable 26. This spring effect will cause the gel of the cable sealing body 12 to move upward to create a better seal around the cable circumference. Thereafter, the elastic segment 50 can rebound to its pre-deformed shape. This biasing force or spring effect provides an "up and down" spring elastic load to the gel. The inelastic segment 52 can be a non-flexible or stiff structure.

Figure 6A:
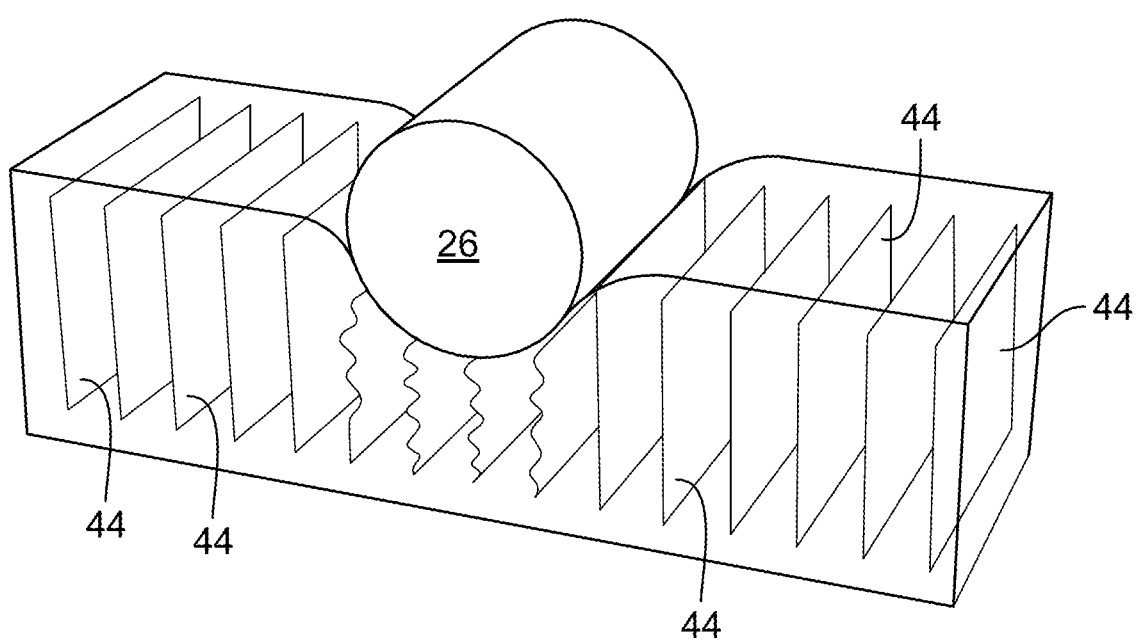
FIG. 6A is a schematic diagram of one pattern of the reinforcing structure shown in FIG. 6 embedded in a gel block with a telecommunications cable inserted thereon.

FIG. 6A shows the reinforcing structure 38A including the plurality of non-deformable projecting rib members 44 embedded in a gel block. The plurality of non-deformable projecting rib members 44 can be arranged and configured to limit flexibility, although alternatives are possible. The plurality of non-deformable projecting rib members 44 are arranged and configured adjacent to the telecommunications cable 26. The plurality of non-deformable projecting rib members 44 that are shown positioned generally under the telecommunications cable 26 can be arranged and configured to collapse under pressure.

The plurality of non-deformable projecting rib members 44 can include panels 54 that are generally inelastic compared with the plurality of deformable projecting rib members 42. The panels 54 of the reinforcing structure 38A can be configured to allow the cable sealing body 12 to move less along the z-axis or the cable pass-through direction D as compared to at least one of the x and y axes. For example, the cable sealing body 12 can be more flexible and/or flowable along the x and y axes while being more stiff and/or non-flowable, restricted along the z-axis.

Figure 6B:
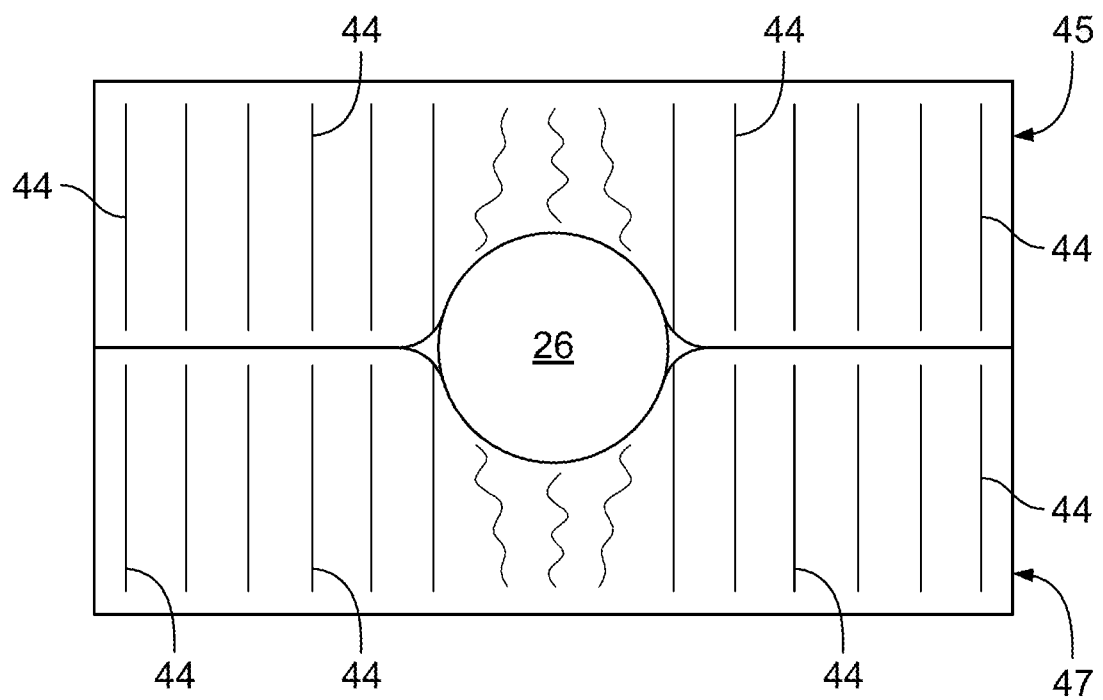
FIG. 6B is a schematic diagram depicting an end view of two gel blocks positioned one on top of the other after the telecommunications cable has been sealed in accordance with the principles of the present disclosure.

FIG. 6B shows two gel blocks, one on top of the other, each one including the plurality of non-deformable projecting rib members 44 embedded therein. Although gel blocks are depicted, it will be appreciated that any other type of arrangement may be used. In this example, the plurality of non-deformable projecting rib members 44 is generally surrounding the telecommunications cable 26 to form a complete seal. While the plurality of non-deformable projecting rib members 44 positioned generally under the telecommunications cable 26 collapse under pressure, the surrounding non-deformable projecting rib members 44 can be arranged and configured to rebound and force the gel into corners or areas (e.g., triple points) surrounding the telecommunications cable 26. It will be appreciated that other portions of the reinforcing structure 38A surrounding the telecommunications cable 26 can be strategically positioned or oriented to control movement of the gel within the cable sealing body 12 to allow the gel to fill in spaces (e.g., voids, openings, etc.) around the telecommunications cable 26.

In the depicted example, the non-deformable projecting rib members 44 embedded in a top gel block 45 (e.g., first gel block) can be generally rigid such that under pressure, the non-deformable projecting rib members 44 can press the gel in a downwards direction such that the gel moves about the telecommunications cable 26. The non-deformable projecting rib members 44 embedded in a bottom gel block 47 (e.g., second gel block) can be generally rigid such that while under pressure, the non-deformable projecting rib members 44 can press the gel in an upwards direction around the telecommunications cable 26. As such, the gel fills those areas around the telecommunications cable 26 which can help to reduce the "eye effect".

Figure 6C:
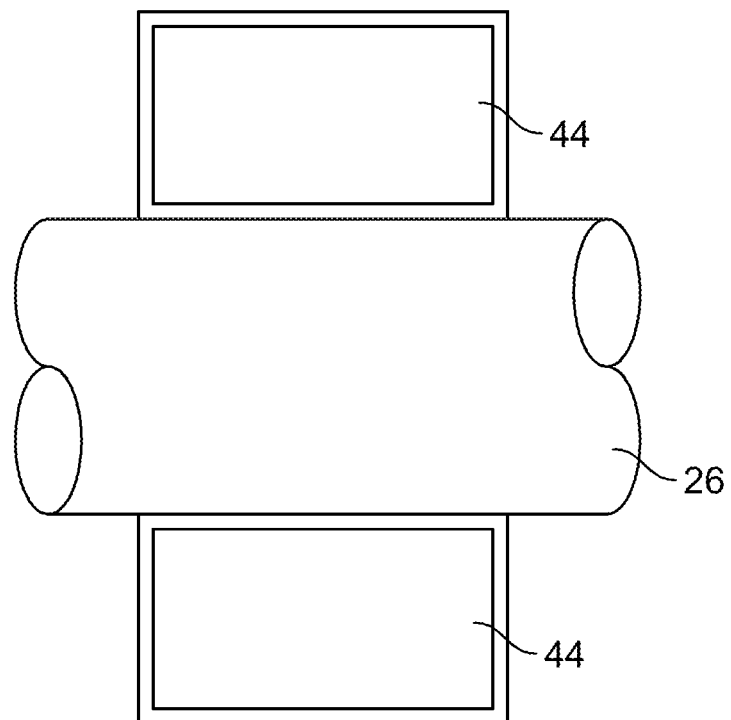
FIG. 6C is a schematic diagram of the gel block shown in FIG. 6A showing a reduction in bulging of gel while under pressure of the telecommunications cable 26 in accordance with the principles of the present disclosure.

FIG. 6C shows a reduction in bulging of the gel while under pressure of the telecommunications cable 26. The plurality of non-deformable projecting rib members 44 can help to keep the gel in place such that less bulging of the gel occurs under pressure. As such, the "tent effect" can be reduced.

Figure 7:
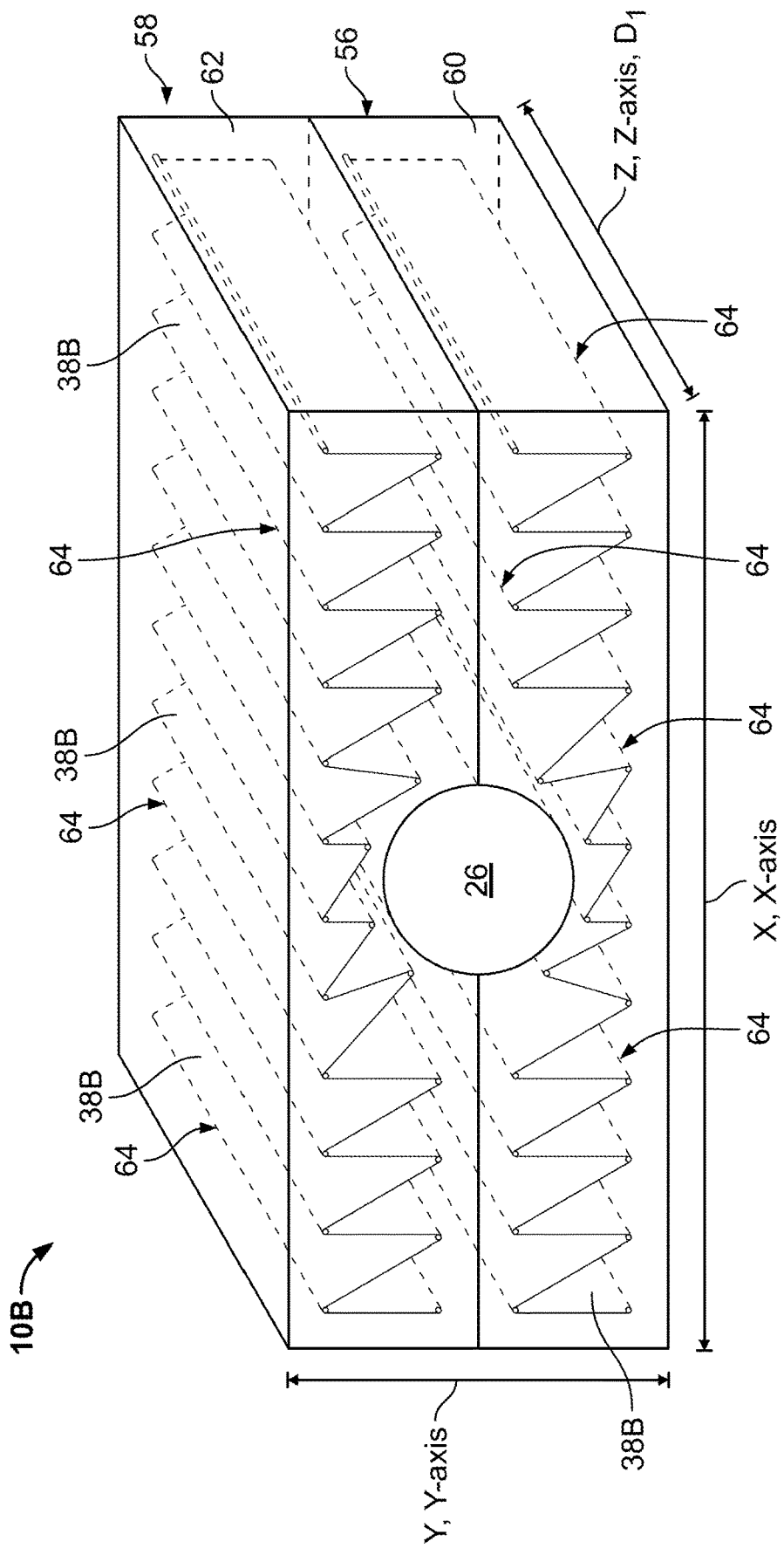
FIG. 7 is a schematic diagram of two cable sealing structures positioned one on top of the other in accordance with the principles of the present disclosure.

Turning to FIG. 7, another example cable sealing structure 10B including gel blocks 56, 58 is shown. In the depicted example, the gel blocks 56, 58 are positioned one on top of the other such that the two gel blocks 56, 58 can be used as a pair. It will be appreciated that the gel blocks 56, 58 may be identical in material composition and geometry, although alternatives are possible. For example, the two gel blocks 56, 58 may each have different compositions and may each have different geometries. It will be appreciated that the gel blocks 56, 58 may be used with other cable sealing structures 10.

Although rectangular gel blocks are depicted, it will be appreciated that the cable sealing structure 10B may be arranged and configured as a strip, or other type of arrangement such as a cylindrical block, a truncated triangular block, a wedge-shaped block, a portion of a cylinder, a portion of an annulus, or other shapes. The gel blocks 56, 58 can be arranged and configured to mate or cooperate together in an enclosure to form a seal about the telecommunications cable 26. The gel blocks 56, 58 each include a cable sealing body 60, 62 including a gel. Both of the cable sealing bodies 60, 62 has a construction with spring like characteristics and/or anisotropic deformation characteristics. In the illustrated example, the gel block 56 is identical to the gel block 58; as such, only the gel block 56 will be described herein. Those of skill in this art will appreciate that the discussion of the gel block 56 applies equally to the other gel block 58. Also, in some examples the gel blocks 56, 58 may not be identical.

The cable sealing body 60 of the gel block 56 can include an x-dimension X that extends along an x-axis, a y-dimension Y that extends along a y-axis and a z-dimension Z that extends along a z-axis. In this example, the z-axis corresponds to a cable pass-through direction $D_1$. The spring like characterization or anisotropic behavior of the cable sealing structure 10B can be configured to allow the cable sealing body 60 to deform less easily along the z-axis or the cable pass-through direction $D_1$ as compared to at least one of the x and y axes. For example, the cable sealing body 60 can be more flexible and/or flowable along the x and y axes while being more stiff and/or non-flowable, restricted along the z-axis.

The example cable sealing body 60 of the cable sealing structure 10B can include a reinforcing structure 38B. The reinforcing structure 38B can have elastic characteristics. The reinforcing structure 38B depicted includes an extensible fabric or elastic textile, although alternatives are possible. The textile may be any appropriate knitted, woven or non-woven material, preferably the fabric is woven. The reinforcing structure 38B can include an extensible article that becomes increasingly separated as the article is stretched along the x-axis and/or as the cable sealing body 60 of the cable sealing structure 10B is extended or deformed along the x-axis. In certain examples, one or more articles may be embedded in the cable sealing body 60. Suitably the extensible or elastic textile can comprise elastic fibers. The term fiber when used herein includes threads, filaments and yarns.

Figure 8:
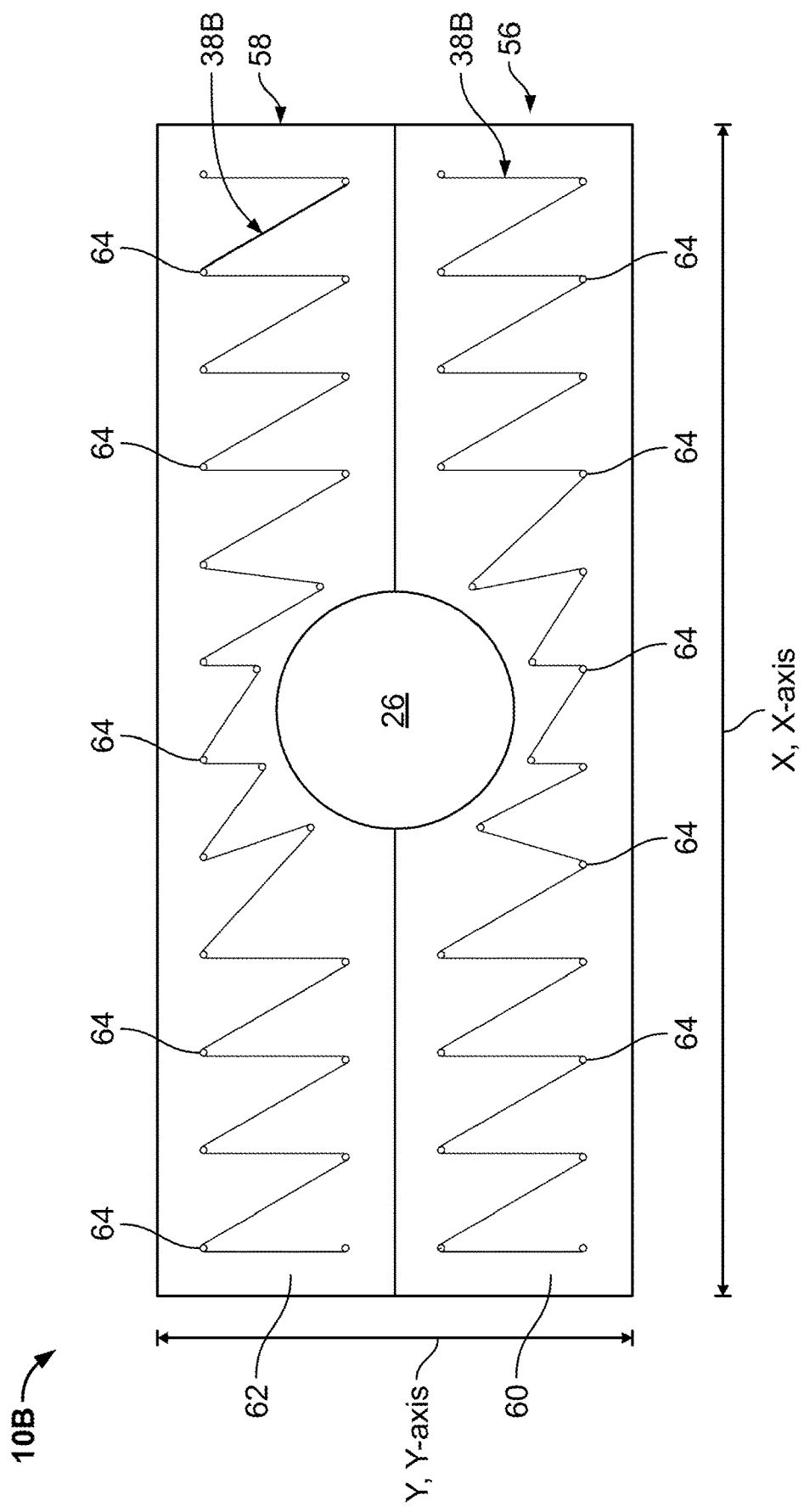
FIG. 8 is a schematic diagram depicting an end view of the two cable sealing structures shown in FIG. 7 depicting a complete circumferential seal about a cable in accordance with the principles of the present disclosure.

In one example, the reinforcing structure 38B can be folded or shaped such that a plurality of ribs 64 are formed that adopt a linear configuration generally aligned along the z-axis of the cable sealing body 60 of the cable sealing structure 10B. The configuration can help to restrict movement or deformation along the z-axis that corresponds to the cable pass-through direction $D_1$. As a result, the cable sealing body 60 is less deformable along the z-axis as compared to both the x and y axes. Similar to the cable sealing body 34 of the cable sealing structure 10 described, the stretching and/or telescoping effect of the cable sealing body 60 of the cable sealing structure 10B can be reduced to thereby limit the eye and tent effects. (see FIG. 8).

The spring like behavior of the reinforcing structure 38B can compress under radial load caused by the telecommunications cable 26 being pressed into the sealing structure 10 and can be configured to push the gel within the cable sealing body 60 upwards towards the triple points and around the circumference of the telecommunications cable 26. This spring characteristic allows movement along the y-axis while applying opposing biasing spring force toward the non-deflected shape (e.g., along the z-axis) to better close the eye effect and create an improved seal. In certain examples, the reinforcing structure 38B may have a rebound effect in the gel of the cable sealing body 60 such that it returns to its pre-deformed shape. The reinforcing structure 38B can rebound to its pre-deformed shape to provide an up and down spring elastic load to the gel of the cable sealing body 34.

In one example, the reinforcing structure 38B can be arranged and configured in a desired arrangement (e.g. in a zig-zag), although alternatives are possible. The zig zag configuration can be arranged from top to bottom in the cable sealing body 60 of the cable sealing structure 10B. As a result, the plurality of ribs 64 can be formed on the top and bottom of the cable sealing body 60. It will be appreciated that the shape or configuration of the reinforcing structure 38B may vary with other examples.

In certain examples, the reinforcing structure 38B can have a width no greater than a width of the cable sealing body 60 of the cable sealing structure 10B. In certain examples, the cable sealing body 60 may be slightly longer in width than the reinforcing structure 38B to help reduce any wicking. The reinforcing structure 38B can stretch (e.g., flex in and out) lengthwise along the x-axis while maintaining a constant width. The reinforcing structure 38B can have a softness that allows it to conform and deform in a desired direction.

Figure 9:
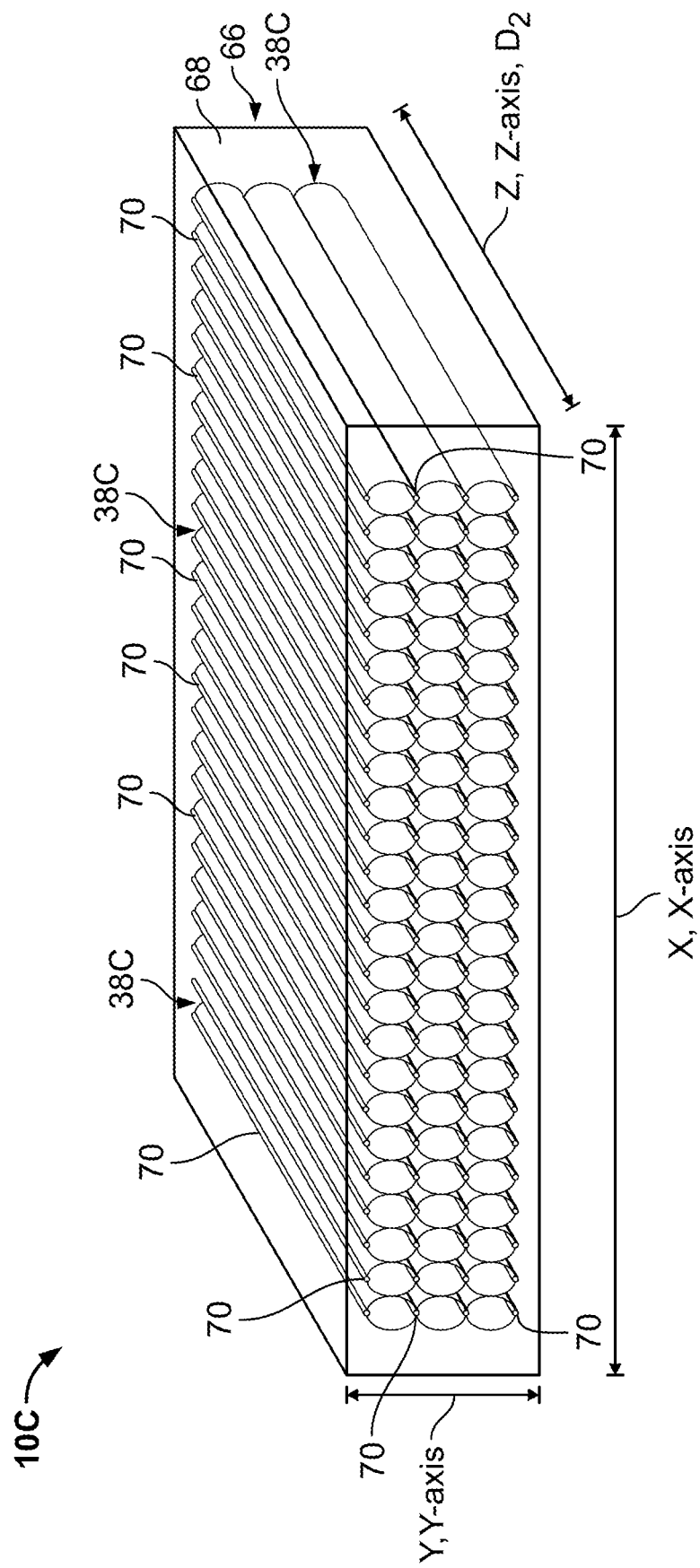
FIG. 9 is a schematic diagram depicting another example cable sealing structure in accordance with the principles of the present disclosure.

Turning to FIG. 9, another example cable sealing structure 10C including a gel block 66 is shown. Although rectangular gel blocks are depicted, it will be appreciated that the cable sealing structure 10C may be arranged and configured as a strip, or other type of arrangement such as a cylindrical block, a truncated triangular block, a wedge-shaped block, a portion of a cylinder, a portion of an annulus, or other shapes. The gel block 66 includes features of the gel blocks 30, 32, 56, 58 previously described with reference to FIGS. 4 and 7. The gel block 66 can include a cable sealing body 68 including a gel. The cable sealing body 68 can have a spring like or elastic construction and/or a construction with anisotropic deformation characteristics.

The cable sealing body 68 of the gel block 66 can include an x-dimension X that extends along an x-axis, a y-dimension Y that extends along a y-axis, and a z-dimension Z that extends along a z-axis. In this example, the z-axis corresponds to a cable pass-through direction $D_2$. The spring like behavior of the cable sealing structure 10C can be configured to allow the cable sealing body 68 to deform less easily along the z-axis or the cable pass-through direction $D_2$ as compared to at least one of the x and y axes. For example, the cable sealing body 68 can be more flexible and/or flowable along the x and y axes while being more stiff and/or non-flowable, restricted along the z-axis. The example cable sealing body 68 of the cable sealing structure 10C can include a reinforcing structure 38C. The example reinforcing structure 38C depicted includes a three dimensional structure. The reinforcing structure 38C can be, for example, a textile, although alternatives are possible. The textile may be any appropriate knitted, woven or non-woven material. Suitably the fabric can comprise elastic fibers. The term fiber when used herein includes threads, filaments and yarns. In other examples, the reinforcing structure 38C may include a spring mesh, screen, or netting, a metal, strength members, elastics, a preform three-dimensional structure, although alternatives are possible.

The reinforcing structure 38C can have a pre-defined shape that can be held together within the cable sealing structure 10C. As a result, the reinforcing structure 38C has a self-supporting shape, although alternatives are possible. In certain examples, the reinforcing structure 38C may have a rebound effect in the gel of the cable sealing body 68 such that it returns to its pre-defined shape.

The example reinforcing structure 38C is configured as a three dimensional (3-D) block matrix including a plurality of loops or a pattern of circles, although alternatives are possible. It will be appreciated that a variety of matrix materials and patterns are possible. The reinforcing structure 38C can have a construction with elastic characteristics, which allows movement along the y-direction while applying an opposing biasing spring force along the z-axis to help limit the eye effect. The 3-D configuration of the reinforcing structure 38C provides for a uniform spring within the cable sealing body 68. The reinforcing structure 38C can compress under radial load caused by the telecommunications cable 26 being pressed into the sealing structure 10C and can be configured to push the gel of the cable sealing body 68 upwards toward the triple points to provide a better seal around the cable 26. The reinforcing structure 38C can also rebound to its pre-deformed shape providing an up and down spring elastic load to the gel. In certain examples, the reinforcing structure 38C can also have anisotropic deformation characteristics that allow extension in one direction while limiting or restricting deformation in other directions.

The cable sealing body 68 (e.g., reinforcements) can include lengthwise strut members 70 that provide longitudinal support. The strut members 70 can help to prevent the cable sealing body 68 from stretching in a direction parallel with the strut members 70 along the z-axis, thereby limiting any depth movement. For example, the depicted configuration can help to restrict movement or deformation along the z-axis that corresponds to a cable pass-through direction or the direction of the lengthwise strut members 70. As a result, the cable sealing body 68 is less deformable along the z-axis as compared to both the x and y axes. The cable sealing body 68 can stretch in a direction along the y-axis and vary the height as the circled matrix can squeeze together. The cable sealing body 68 can stretch in a direction along the x-axis because the circled matrix can be extended thereby varying the length. Similar to the cable sealing body 34 of the cable sealing structure 10 described, the stretching and/or telescoping effect of the cable sealing body 68 of the cable sealing structure 10C can be reduced to thereby limit the eye and tent effects.

The reinforcing structure 38C can form a bond with the gel of the cable sealing body 68 to help limit movement of the gel in a specific direction. In one example, the gel can be molded over the reinforcing structure 38C, although alternatives are possible. For example, the gel can be injection molded and cured over the reinforcing structure 38C. In other examples, the gel can be extruded around any of the reinforcing structures described herein. Details of the fabrication of the cables sealing structures will be described later.

Figure 10:
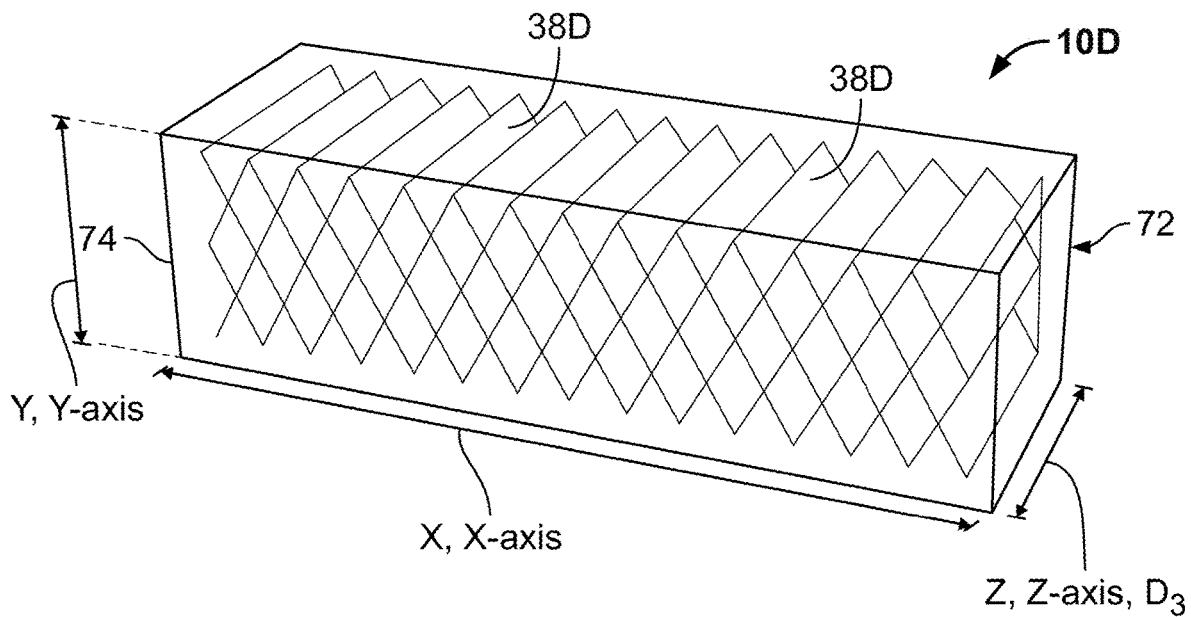
FIG. 10 is a schematic diagram depicting another example cable sealing structure in accordance with the principles of the present disclosure.

Turning to FIG. 10, another example cable sealing structure 10D including a gel block 72 is shown. Although gel a block is depicted, it will be appreciated that the cable sealing structure 10D may be arranged and configured as a strip, or other type of arrangement such as a cylindrical block, a truncated triangular block, a wedge-shaped block, a portion of a cylinder, a portion of an annulus, or other shapes. The gel block 72 includes features of the other gel blocks 30, 32, 56, 58 previously described with reference to FIGS. 4 and 7. The gel block 72 can include a cable sealing body 74 including a gel.

The cable sealing body 74 of the gel block 72 can include an x-dimension X that extends along an x-axis, a y-dimension Y that extends along a y-axis, and a z-dimension Z that extends along a z-axis. In this example, the z-axis corresponds to a cable pass-through direction $D_3$. The spring like behavior of the cable sealing structure 10C can be configured to allow the cable sealing body 74 to deform less easily along the z-axis or the cable pass-through direction $D_3$ as compared to at least one of the x and y axes. For example, the cable sealing body 74 can be more flexible and/or flowable along the x and y axes while being more stiff and/or non-flowable, restricted along the z-axis. The example cable sealing body 74 of the cable sealing structure 10D can include a reinforcing structure 38D. In certain examples, the reinforcing structure 38D can include a spacer fabric that can include rigid structures (e.g., knitted yarns, fibers, strands, knitted structures, rigid non-deformable projecting rib members, etc.). The reinforcing structure 38D may include or be composed of knitted fabrics, a spring mesh, screen, or netting, fibers, yarns, metal, strength members, elastics, a preform three-dimensional structure, although alternatives are possible.

In certain examples, the reinforcing structure 38D may have a rebound effect in the gel of the cable sealing body 74 such that it returns to its pre-deformed shape. The reinforcing structure 38D can have a pre-defined shape that is impregnated with a gel to form the cable sealing structure 10D and can be held together within the cable sealing structure 10D. As a result, the reinforcing structure 38D can have a self-supporting shape, although alternatives are possible.

The example reinforcing structure 38D is configured as a three dimensional (3-D) block matrix including a plurality of knitted structures that may be made of strands that provide tensile strength along their length and are generally rigid or non-stretchable in tension, although alternatives are possible. It will be appreciated that a variety of matrix materials and patterns are possible. The plurality of knitted structures can be arranged and configured to deform under pressure or in response to a lateral load while still providing enough stiffness to control movement of the gel within the cable sealing body 74 to specific areas therein in order to form a complete cable seal while restricting movement in other areas or orientations. The reinforcing structure 38D can have a construction with elastic characteristics, which allows movement along the y-direction while applying an opposing biasing spring force along the z-axis to help limit the "eye effect." Spring biasing can be provided in the x-dimension and/or the y-dimension and/or the z-dimension to spring bias the gel in a manner that helps prevent an "eye effect" at the seal around the cable to provide effective triple point sealing. Thus, the reinforcing structure 38C can be configured to intentionally spring bias the gel into the triple point regions during sealing under pressure.

Figure 11:
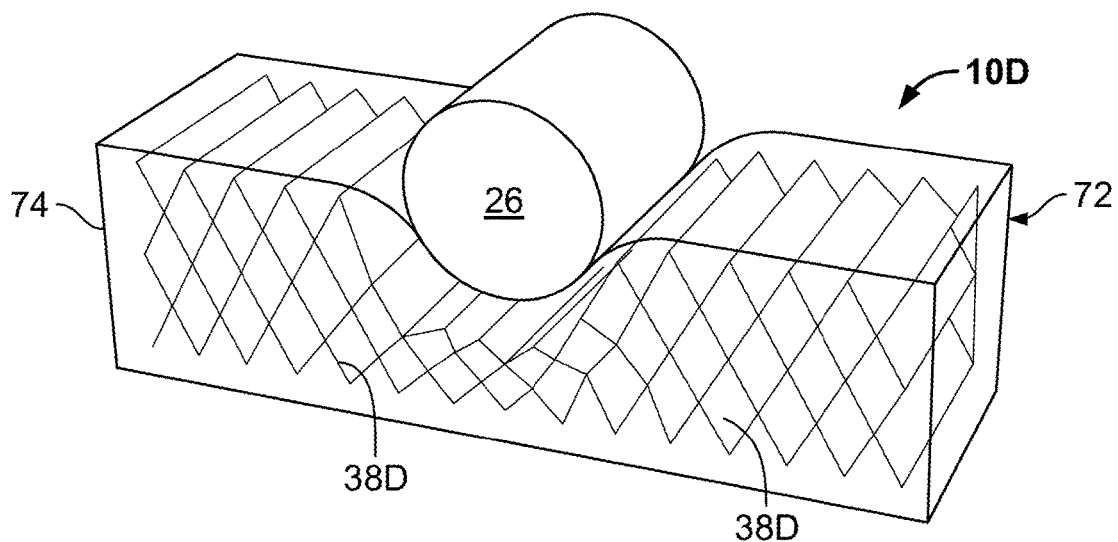
FIG. 11 is a schematic diagram of the cable sealing structure shown in FIG. 10 with the telecommunications cable positioned thereon.

Turning to FIG. 11, the reinforcing structure 38D can compress under radial load caused by the telecommunications cable 26 being pressed into the cable sealing structure 10D and can be configured to push gel within the cable sealing body 74 upwards toward the triple point to provide a better seal around the telecommunications cable 26. The 3-D configuration of the reinforcing structure 38D provides for a uniform spring within the cable sealing body 74.

Figure 12:
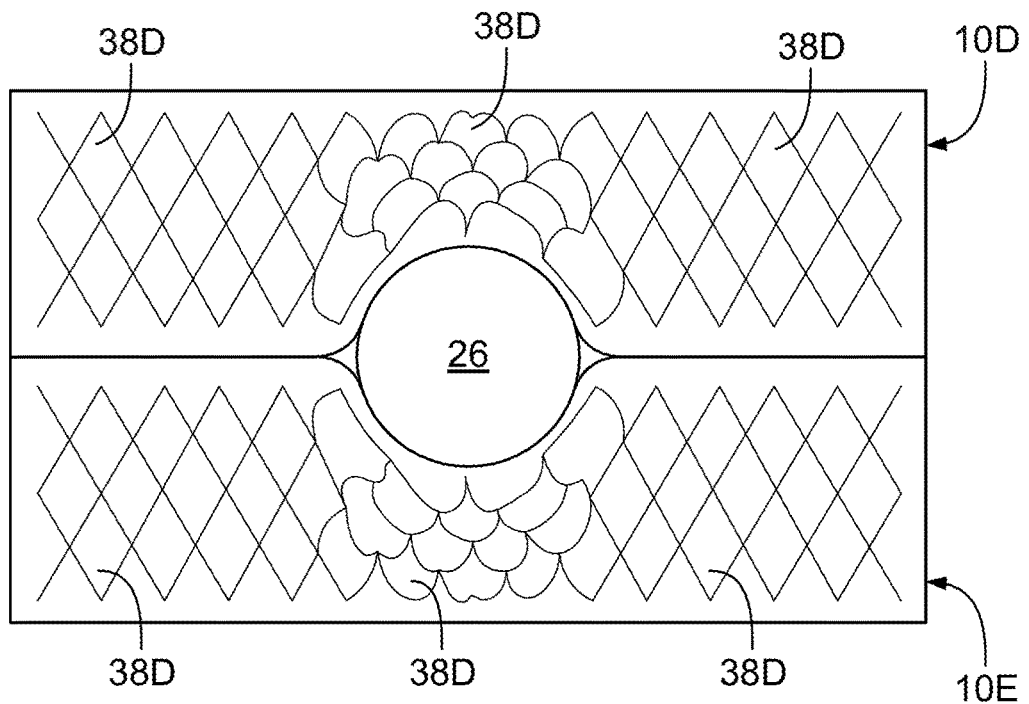
FIG. 12 is a schematic diagram depicting an end view of two cable sealing structures one on top of the other after the telecommunications cable has been sealed in accordance with principles of the present disclosure.

Turning to FIG. 12, the cable sealing structure 10D is positioned on top of another cable sealing structure 10E (e.g., sealed position) to create a complete seal about the telecommunications cable 26. The cable sealing structures 10D and 10E can be identical or different in composition and geometry. In the example shown, the cable sealing structures 10D, 10E each have the same reinforcing structure 38D and gel composition, although alternatives are possible. While under pressure caused by pressurizing the cable sealing structures 10D, 10E about the telecommunications cable 26, portions of the reinforcing structure 38D positioned generally under the telecommunications cable 26 can collapse. It will be appreciated that other portions of the reinforcing structure 38D surrounding the telecommunications cable 26 can be strategically positioned or oriented to move the gel within the cable sealing body 74 to allow the gel to fill in spaces (e.g., voids, openings, etc.) around the telecommunications cable 26. For example, while in the sealed position and while being pressurized about the telecommunications cable 26, the reinforcing structure 38D can be strategically positioned or oriented to move the gel within the cable sealing body 74 or force the gel into corners or areas (e.g., triple points) surrounding the telecommunications cable 26 to help reduce the "eye effect". As such, a rebound effect for combating the "eye effect" can be provided. The gel material fills those areas about the telecommunications cable 26 to provide for a complete seal without leakage.

The reinforcing structure 38D can also rebound to its pre-deformed shape providing an up and down spring elastic load to the gel. In certain examples, the reinforcing structure 38D can also have anisotropic deformation characteristics that allow extension in one direction while limiting or restricting deformation in other directions.

Figure 13:
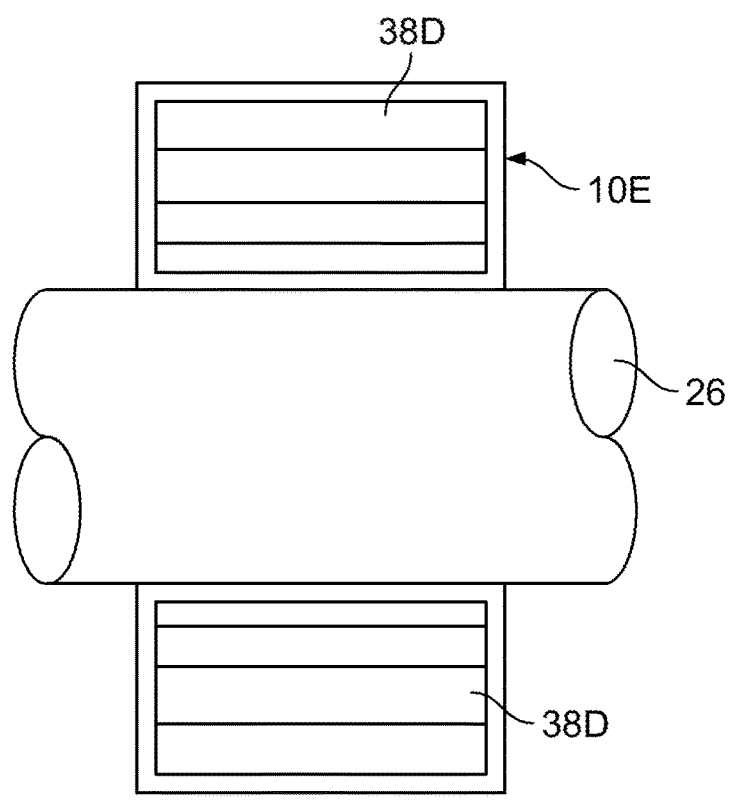
FIG. 13 is a schematic diagram of the cable sealing structure shown in FIG. 11 showing a reduction in bulging of gel while under pressure of the telecommunications cable 26 in accordance with the principles of the present disclosure.

FIG. 13 shows a reduction in bulging of the gel while under pressure of the telecommunications cable 26. The fibers or non-deformable projecting rib members of the reinforcing structure 38D can help to keep the gel in place such that less bulging of the gel occurs under pressure. As such, the "tent effect" can be reduced.

Figure 14:
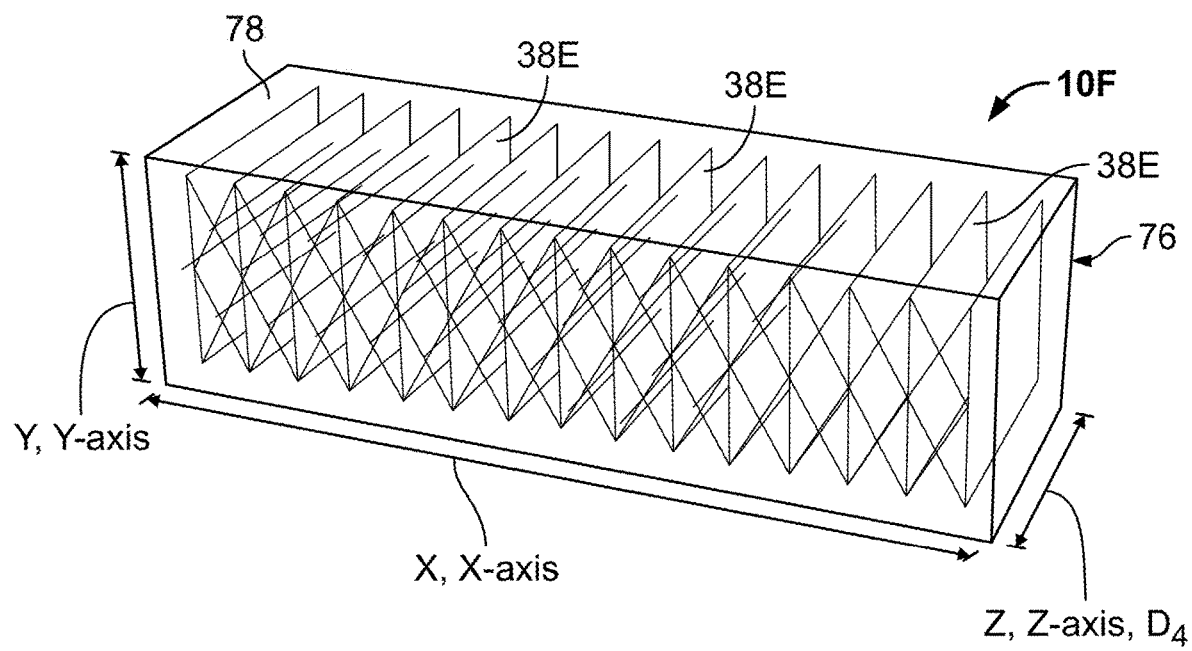
FIG. 14 is a schematic diagram depicting yet another example cable sealing structure in accordance with the principles of the present disclosure.

Turning to FIG. 14, another example cable sealing structure 10F including a gel block 76 is shown. Although a rectangular gel block is depicted, it will be appreciated that the cable sealing structure 10F may be arranged and configured as a strip, or other type of arrangement such as a cylindrical block, a truncated triangular block, a wedge-shaped block, a portion of a cylinder, a portion of an annulus, or other shapes. The gel block 76 includes features of the other gel blocks 30, 32, 56, 58, 72 previously described with reference to FIGS. 4, 7, and 10. The gel block 76 can include a cable sealing body 78 including a gel.

The cable sealing body 78 of the gel block 76 can include an x-dimension X that extends along an x-axis, a y-dimension Y that extends along a y-axis, and a z-dimension Z that extends along a z-axis. In this example, the z-axis corresponds to a cable pass-through direction $D_4$. The spring like behavior of the cable sealing structure 10F can be configured to allow the cable sealing body 78 to deform less easily along the z-axis or the cable pass-through direction $D_4$ as compared to at least one of the x and y axes. For example, the cable sealing body 78 can be more flexible and/or flowable along the x and y axes while being more stiff and/or non-flowable, restricted along the z-axis. The example cable sealing body 78 of the cable sealing structure 10F can include a reinforcing structure 38E. In one example, the reinforcing structure 38E can include a spacer fabric that can include rigid structures with a combination of knitted structures, yarns/fibers (e.g., knitted rigid yarns, knitted fabrics, filaments, threads, rigid non-deformable projecting rib members, etc.) that can be generally rigid or non-stretchable in tension but deformable in compression in response to a lateral load. In other examples, the reinforcing structure 38E may include or be composed of a spring mesh, screen, or netting, a metal, strength members, elastics, a preform three-dimensional structure, although alternatives are possible.

In certain examples, the reinforcing structure 38E may have a rebound effect in the gel of the cable sealing body 78 such that it returns to its pre-deformed shape. The reinforcing structure 38E can have a pre-defined shape that is impregnated with a gel material to form the cable sealing structure 10F. That is, the reinforcing structure 38E can have a pre-defined shape that can be held together within the cable sealing structure 10F. As a result, the reinforcing structure 38E can have a self-supporting shape, although alternatives are possible.

The example reinforcing structure 38E is configured as a (three dimensional block (3-D) matrix including a plurality of knitted structures, although alternatives are possible. It will be appreciated that a variety of matrix materials and patterns are possible. The plurality of knitted structures can be arranged and configured to deform under pressure or in response to a lateral load while still providing enough stiffness to move the gel within the cable sealing body 78 to specific areas therein in order to form a complete cable seal. The reinforcing structure 38E can have a construction with elastic characteristics, which allows movement along the y-direction while applying an opposing biasing spring force along the z-axis to help limit the "eye effect." The 3-D configuration of the reinforcing structure 38E can provide for a uniform spring within the cable sealing body 78.

Figure 15:
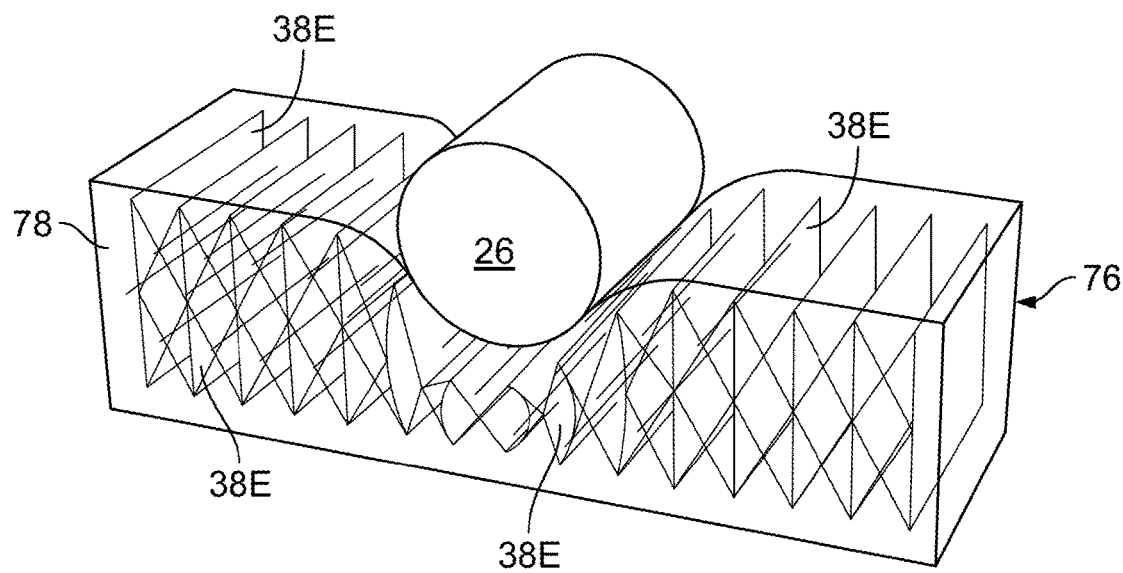
FIG. 15 is a schematic diagram of the cable sealing structure shown in FIG. 14 with the telecommunications cable positioned thereon.

Turning to FIG. 15, the reinforcing structure 38E can compress under radial load caused by the telecommunications cable 26 being pressed into the cable sealing structures 10F, 10G (e.g., the cable sealing structures 10F, 10G are pressurized about the telecommunications cable 26) and can be configured to push gel within the cable sealing body 78 upwards towards the triple point to provide a better seal around the telecommunications cable 26.

Figure 16:
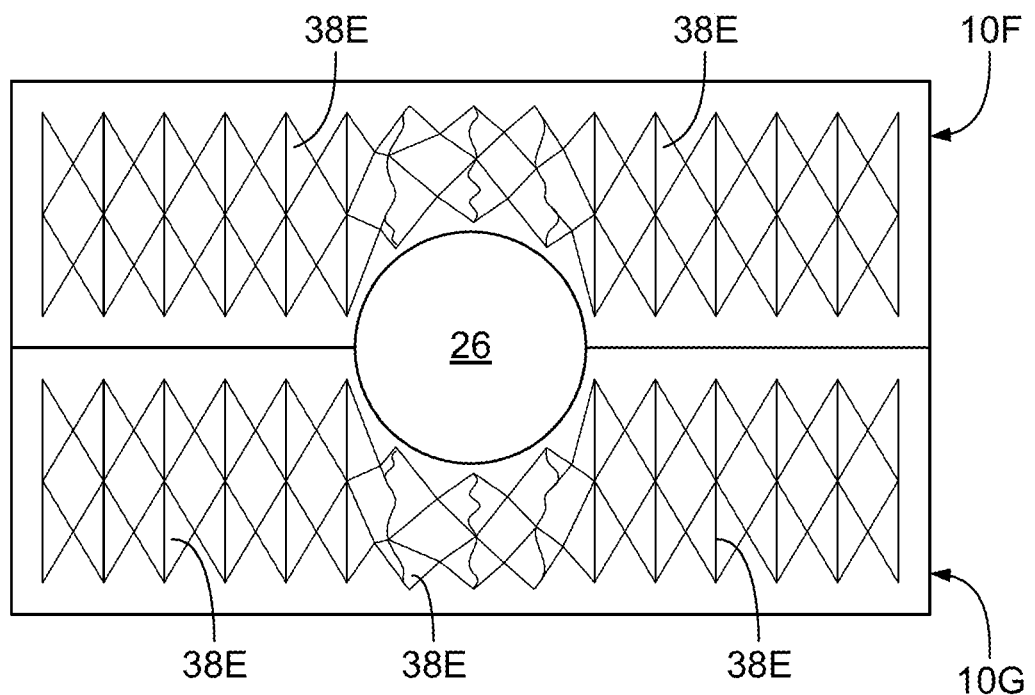
FIG. 16 is a schematic diagram depicting an end view of two cable sealing structures one on top of the other after the telecommunications cable has been sealed in accordance with the principles of the present disclosure.

Turning to FIG. 16, the cable sealing structure 10F is positioned on top of another cable sealing structure 10G to create a complete seal about the telecommunications cable 26. The cable sealing structures 10F and 10G can be identical or different. In the example shown, the cable sealing structures 10F, 10G each have the same reinforcing structure 38E and gel composition, although alternatives are possible.

While under pressure caused by pressurizing the cable sealing structures 10F, 10G about the telecommunications cable 26, portions of the reinforcing structure 38E positioned generally under the telecommunications cable 26 can collapse. Other portions of the reinforcing structure 38E surrounding the telecommunications cable 26 can be strategically positioned or oriented to move the gel within the cable sealing body 78 to allow the gel to fill in spaces (e.g., voids, openings, the eye-shape area, triple points) surrounding the telecommunications cable 26. That is, while in the sealed position and under pressure, portions of the reinforcing structure 38E can be arranged and configured to move or force the gel into corners or areas (e.g., triple points) surrounding the telecommunications cable 26 to help reduce the "eye effect". As such, a rebound effect for combating the "eye effect" can be provided.

The reinforcing structure 38E can also rebound to its pre-deformed shape providing an up and down spring elastic load to the gel. In certain examples, the reinforcing structure 38E can also have anisotropic deformation characteristics that allow extension in one direction while limiting or restricting deformation in other directions.

Figure 17:
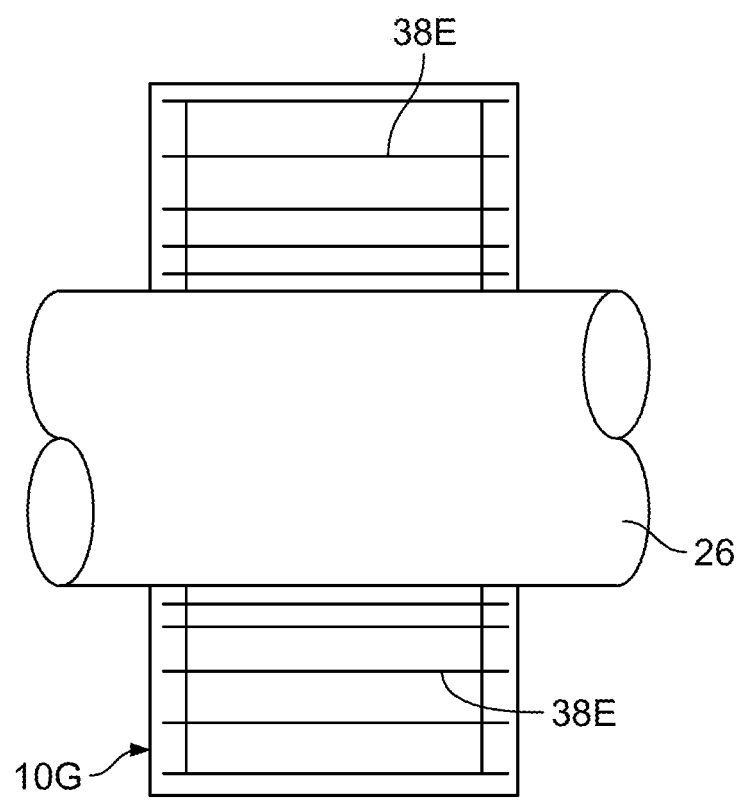
FIG. 17 is a schematic diagram of the cable sealing structure shown in FIG. 15 showing a reduction in bulging of gel while under pressure of the telecommunications cable 26 in accordance with the principles of the present disclosure.

FIG. 17 shows a reduction in bulging of the gel while under pressure of the telecommunications cable 26. In certain examples, the fibers or non-deformable projecting rib members, etc. of the reinforcing structure 38E can help to keep the gel in place such that less bulging of the gel occurs under pressure. As such, the "tent effect" can be reduced.

Figure 18:
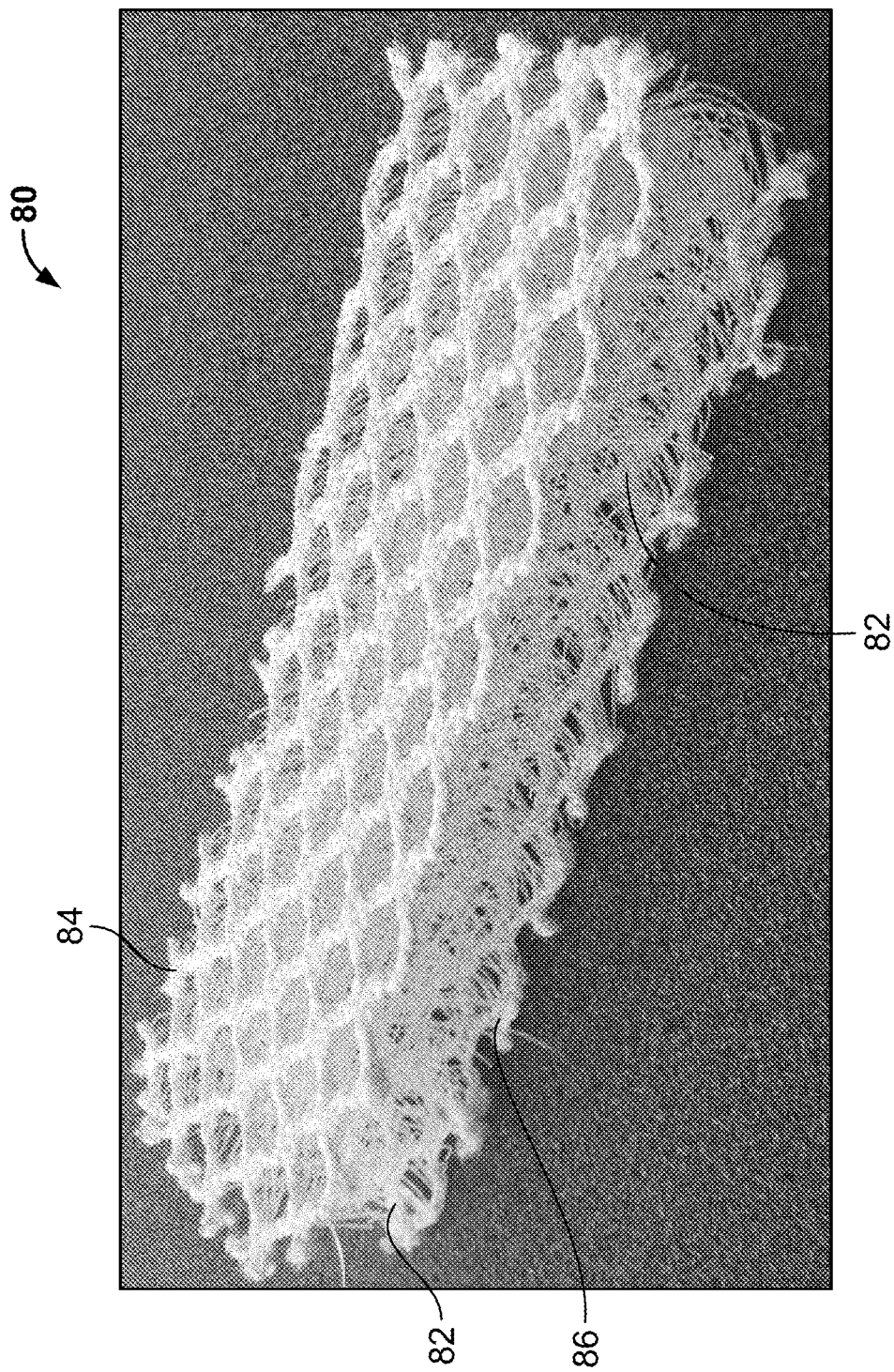
FIGS. 18-20 are schematic diagrams of example spacer fabrics in accordance with the principles of the present disclosure.
Figure 19:
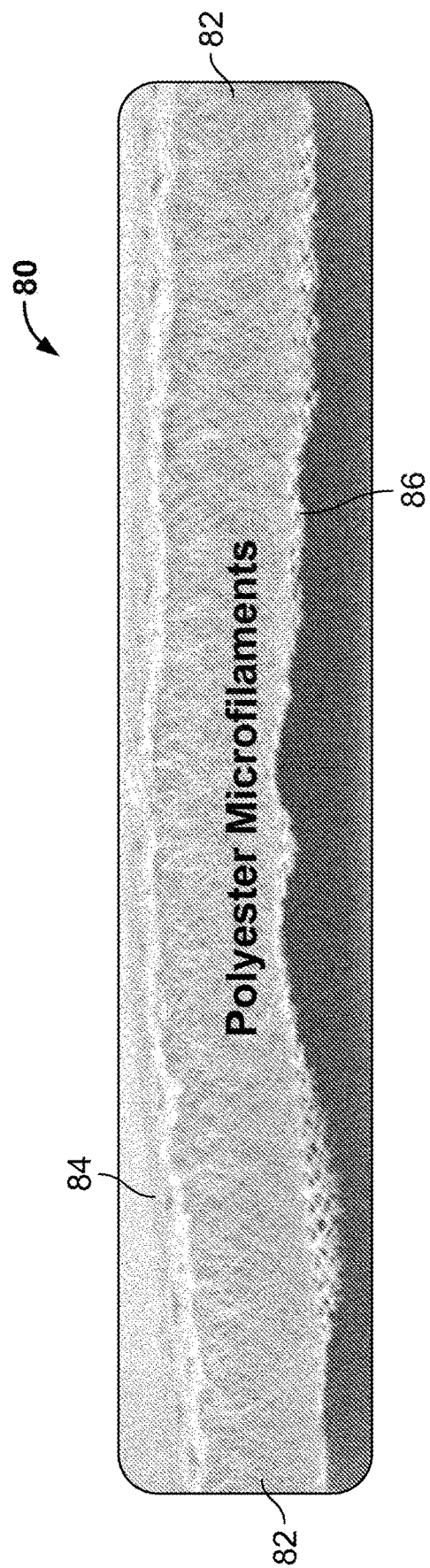

Turning to FIGS. 18-19, an example spacer fabric 80 is depicted. Spacer Fabrics can include two or more separate fabric faces that are knitted independently and then connected together by a separate filler spacer fiber.

The example spacer fabric 80 can be used as another type of reinforcing material in accordance with the principles of the present disclosure. The spacer fabric 80 can include microfilaments 82 (e.g., fibers, yarns, plastics, threads, strands, etc.) that are held in position between first and second fabric surfaces 84, 86 (e.g., front and rear fabric surfaces; top and bottom surfaces). The microfilaments 82 can be made with a polymeric material, such as, but not limited to, polyester, although alternatives are possible. One example of fabricating a cable sealing structure can be by overmolding the spacer fabric 80 with the gel 36 using, for example, an overmolding process, injection molding process, extrusion process, printing process, etc., although alternatives are possible. The spacer fabric 80 can be arranged and configured with the gel 36 to provide a cable sealing structure that characterizes the desired anisotropic properties described herein. Details of an example method for fabricating a composite sealing structure in accordance with the principles of the present disclosure will be described below.

Figure 20:
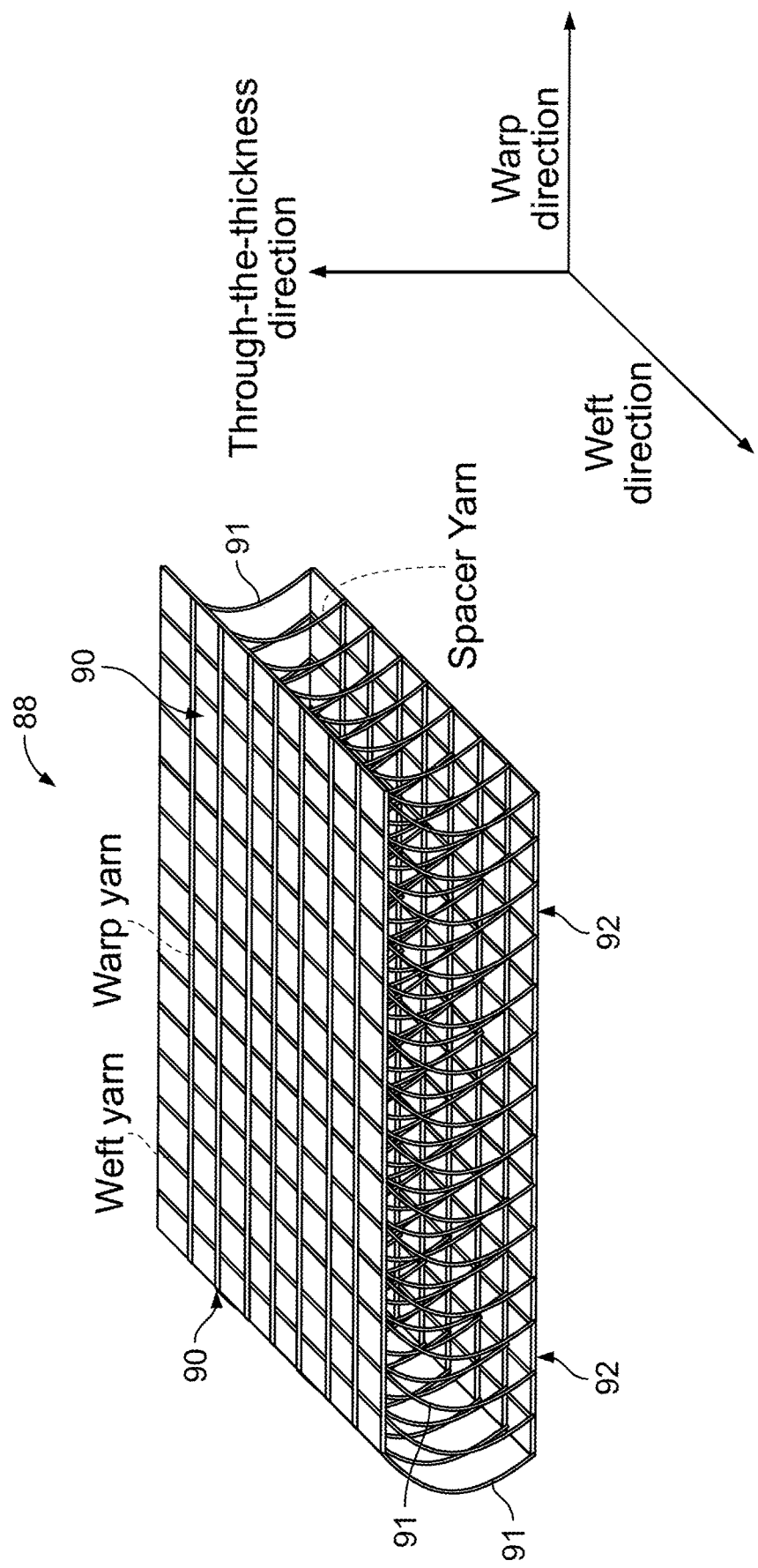

Referring to FIG. 20, another example spacer fabric 88 is schematically depicted. The example spacer fabric 88 can be used as a reinforcing material in accordance with the principles of the present disclosure. The spacer fabric 88 can include interconnecting filaments 91 (e.g., yarns, fibers, threads, microfilaments, plastics, strands, etc.) positioned between a first textile substrate 90 (e.g., front fabric substrate, top fabric layer) and a second textile substrate 92 (e.g., back fabric substrate, bottom fabric layer). The first and second textile substrates 90, 92 can each include warp and weft yarns. As depicted, a plurality of interconnecting filaments 91 can extend between the first and second textile substrates 90, 92.

The first and second textile substrates 42, 44 contains a warp direction (machine direction or direction along the length of the roll) and a weft direction (cross-machine direction, across the width of the roll, and perpendicular to the warp direction). The first and second textile substrates 42, 44 can contain unidirectional strengthening fibers in the warp direction and weft fibers that run the weft direction. The weft yarns are used to stabilize the fabric and keep the warp yarns parallel to each other.

In one example, the first and second textile substrates 90, 92 are a woven textiles with the reinforcing fibers in the warp direction and the weft fibers in the weft direction. Woven fabrics can be used as the warp fibers and are well aligned in the warp direction and held in place. Some woven textiles include plain, satin, twill, basket-weave, poplin, jacquard, and crepe weave textiles. In one example, the woven textile is a plain weave textile. In another example, the woven textile is a leno weave. In one example, the woven textile contains two or more weave pattern across a width of the first and second textile substrates 90, 92, such as a plain weave and a leno weave.

In another embodiment, the first and second textile substrates 90, 92 are knit textiles, for example a circular knit, reverse plaited circular knit, double knit, single jersey knit, two-end fleece knit, three-end fleece knit, terry knit or double loop knit, weft inserted warp knit, warp knit, and warp knit with or without a micro-denier face.

In another embodiment, the first and second textile substrates 90, 92 are multi-axial textiles, such as a tri-axial fabric (knit, woven, or non-woven). In another example, the textile is a bias fabric. In another embodiment, the textile is a non-woven. The term non-woven refers to structures incorporating a mass of yarns that are entangled and/or heat fused so as to provide a coordinated structure with a degree of internal coherency. Non-woven fabrics for use as the textile may be formed from many processes such as for example, meltspun processes, hydroentangling processes, mechanically entangled processes, stitch-bonded and the like.

The weave pattern used for the first and second textile substrates 90, 92 can be any weave pattern known in the art, (e.g., a twill weave pattern, etc.). A twill weave pattern has the advantage of an improved flatness of the fabric layers. In one example, the 3D woven textile substrate can have a symmetric structure, meaning that the weave pattern and the number of threads are identical in both the first and second textile substrates 90, 92. In certain examples, highly symmetric 3D textile substrates can be used where not only the number and the weave patterns of the threads are symmetric, but also the chemical composition, type, thickness, and strength of the threads are identical at both sides of the spacer fabric 88.

The thickness of the 3D spacer fabric 88, defined by the distance between the outer surfaces of the first and second textile substrates 90, 92, may range from 3 mm to 40 mm, more preferably from 8 mm to 25 mm, although alternatives are possible.

In one example, a distance of the warp and weft directions may range from 1.0 mm to 5.0 mm, preferably from 2.0 mm to 4.0 mm, and more preferably from 3.0 mm to 3.5 mm. Each of the weft and warp and spacer threads can be monofilament threads. These monofilament threads may be composed of only one thread, although alternatives are possible. For example, more than one monofilament thread can be used, e.g. the warp and the spacer thread may be composed of a pair of two monofilament threads to be used in the weaving process. Each thread of the pair of threads may have of the same type, thickness and composition but these two threads of the pair may be different such as another thickness, chemical composition, mechanical strength. In certain examples, each of the threads of the spacer fabric 88 may include one or more polymers selected from a polyester, a polyamide, a polyurethane, a poly(meth)acrylate, a polyolefine, a phenolic resin, a polysulfone, a polyether sulfone, a polyether ether ketone, polyether ketone polystyrene, poly para-phenylene sulfide, polytetrafluoroethylene, polyvinylchloride or copolymers thereof; more preferably a polyester, a polyamide, poly para-phenylene sulfide or polytetrafluoroethylene; most preferably a polyester or a polyamide. The polymer may be a homo-polymer, a co-polymer of at least 2 of these polymers or a mixture or blend of these homo- or co-polymers, although alternatives are possible.

In other examples, each of the threads of the spacer fabric 88 may be a fiber selected from the list of a polyester fiber, a polyamide fiber, a polyacrylic fiber, an oxidized polyacrylic fiber, a polyurethane fiber, a polyolefine fiber, a high molecular weight polyethylene fiber, a para-aramid fiber, a meta-aramid fiber, a polybenzobisthiazole fiber, a polyetheretherketone fiber, a polyether ketone fiber, a poly para-phenylene sulfide fiber, a polytetrafluoroethylene fiber, a carbon fiber, a ceramic fiber, or a high modulus silicon carbide or silicon nitride fiber; a polyester fiber, a polyamide fiber, a polyolefine fiber, a high molecular weight polyethylene fiber, a para-aramid fiber, a meta-aramid fiber or a poly para-phenylene sulfide fiber; a polyester fiber or a polyamide fiber, although alternatives are possible.

It will be appreciated that the degree of anisotropy may vary by blending various components of either fibers, yarns, plastics, polymers, etc. in a spacer fabric to produce a desired anisotropic characteristic of a composite sealing structure. The desired degree of anisotropy may be adjusted in this manner in order to provide the preferred properties for a particular application.

Thus, a composite sealing structure can be stronger or stiffer or less-deformable in one direction versus another. In some examples this can be accomplished by changing fibers (such as but not limited to providing fibers of different materials) in warp versus weft directions, and in the Z direction, for example. Thus, strength can be provided in any direction needed.

The reinforcing structures 38, 38A, 38B, 38C, 38D, 38E can form a bond with the gel of the respective cable sealing bodies 12, 34, 36, 60, 62, 68, 72, 78 to help limit movement of the gel in a specific direction. In one example, the gel can be molded over the reinforcing structures 38, 38A, 38B, 38C, 38D, 38E although alternatives are possible. For example, the gel can be injection molded and cured over the reinforcing structures 38, 38A, 38B, 38C, 38D, 38E. In other examples, the gel can be extruded around any of the reinforcing structures described herein. In certain examples, the gel can be printed (e.g., three-dimensional printing, two-dimensional printing) around any of the reinforcing structures described herein.

The present disclosure also relates to a method of making the cable sealing bodies 12, 34, 36, 60, 62, 68, 72, 78. The method includes a step of forming a gel that has a spring like characteristics and/or have anisotropic deformation characteristics. The method can further include a step of respectively embedding the reinforcing structures 38, 38A, 38B, 38C, 38D, 38E into the gel of the cable sealing bodies 12, 34, 36, 60, 62, 68, 72, 78. In one example, the step of embedding the reinforcing structures 38, 38A, 38B, 38C, 38D, 38E is by an overmold process. In other examples, the step of embedding the reinforcing structures 38, 38A, 38B, 38C, 38D, 38E is by an extrusion process. In some examples, the step of embedding the reinforcing structures 38, 38A, 38B, 38C, 38D, 38E is by an injection molding process. In certain examples, the gel can be printed (e.g., three-dimensional printing, two-dimensional printing) around any of the reinforcing structures/materials described herein.

The present disclosure also generally relates to a method of fabricating a composite sealing structure 10 that includes a reinforcing structure 38 embedded in a gel material (e.g., sealant). In certain examples, the reinforcing structure 38 may include a spring mesh, screen, a member or members, rods, threads, filaments, fibers, wires, springs, elastic elements, mesh, fabric, textile, a strand or strands, netting, foam or cellular structure, although alternatives are possible.

In other examples, the reinforcing structure 38 may include a metal, a polymer, an extrusion, extensible fabric, a 3D textile, a spacer fabric, an anisotropic 3D textile or knitted fabric, a spring, strength members, elastics, a preform three-dimensional structure, although alternatives are possible. The reinforcing structure 38 can include a variety of materials, such as, but not limited to, a braided textiles, woven, or non-woven textiles, fibers, chopped fibers, yarns, fine metal wires, plastics, glass fibers, foils, foams, mesh, continuous reinforcing elements, discontinuous reinforcing elements, etc. The term "mesh" includes fabrics, cloths, webs, mats, screens, meshes and the like, which may be open, such as in the case of a screen, or closed, such as in the case of a fabric. It will be appreciated that such variety of materials or structures described may be arranged and/or configured as layered and/or folded stacks.

The reinforcing structure 38 can also be arranged and configured such that the composite sealing structure 10 can have any geometry. A suitable shape may be any desired shape, such as a geometric shape, e.g., a circle, square, rectangle, triangle, or combinations thereof. In certain examples, the reinforcing structure 38 may be a preform three-dimensional structure.

In some examples, the terms "anisotropic", "anisotropy" and grammatical variations thereof, can also include more fibers in a desired direction. This can thus include a change of diameter in a fiber over a length of the fiber, and/or a change in diameter at any point or section of the fiber; includes change in cross-sectional shape of the fiber; includes change in density or number of fibers in a volumetric section of the spacer fabric; includes the use of monofilament fibers and or multifilament fibers in a volumetric section of the spacer fabric; and can include variations in material and along individual fibers in a volumetric section of the spacer fabric.

Figure 21:
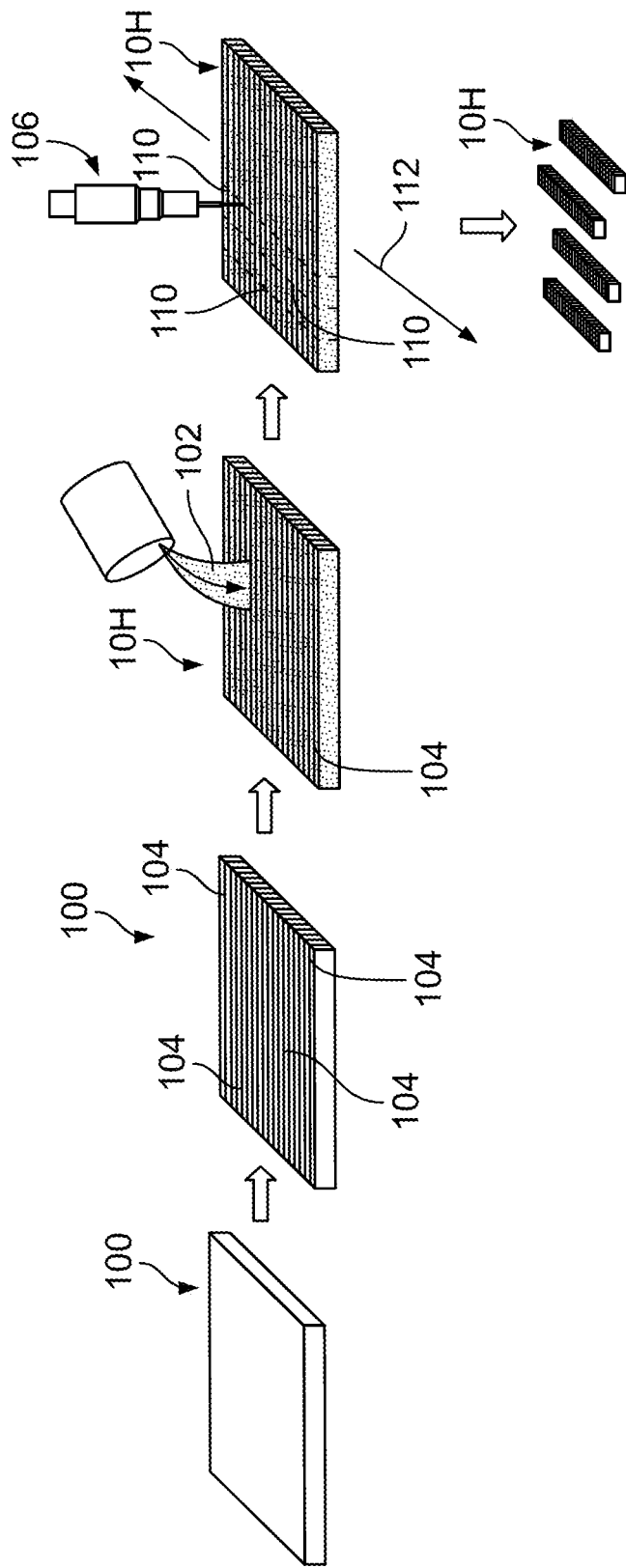
FIG. 21 is a schematic diagram of an example method of fabricating a cable sealing structure that includes an open cell filter foam sheet and a gel material in accordance with the principles of the present disclosure.

One property of a spacer fabric can include an open porous structure. The open porous structure can be filled and/or covered with a gel material described in detail hereinafter, as indicated in FIG. 21. The gel material used to fill and/or cover the open porous structure, which has good adhesion thereto, may be composed of a dry silicone gel. Generally speaking the disclosure composite structures of the present disclosure may be achieved by using spacer fabrics of any desired shape and any desired porous construction. In certain examples, a composite sealing structure may have an open-cell porous structure (e.g., a sponge with an open-cell construction etc.).

In certain examples, a spacer fabric (3D array or scaffold) can be constructed of any suitable material. For example, various open cell foam structures may be used as a spacer fabric. In other examples, the spacer fabric can be made of a material that can be formed by three-dimensional modelling systems such as three-dimensional printing techniques. This means that for example computer models are easily used to produce the spacer fabric. It is a convenient method of implementing a method of the present disclosure therefore, to take a model of a desired porous structure, and to create a spacer fabric representing the porous structure using three-dimensional modelling such as printing techniques. It will be appreciated then that the spacer fabric can be created to provide a (resultant) substrate structure which will have the desired porosity (and thus loading) profile. An alternative method is to use cutting techniques, or selective sintering for example selective laser sintering (using lasers to selectively sinter target areas), to create a three-dimensional scaffold.

In some examples, the spacer fabric may include reinforcing fibers. By the term "reinforcing fiber" herein used is meant a substantially continuous or discontinuous fiber used for a fibrous reinforcing material. For example, there can be mentioned a carbon fiber, a glass fiber, an aramid fiber, a basalt fiber, a silicon carbide fiber, a boron fiber, a metal fiber, a polybenzothiazole fiber, a polybenzoxazole fiber and an alumina fiber. The reinforcing filament includes not only a multifilament but also a fiber yarn which is substantially continuous, although constituent single fibers per se are not continuous, such as a spun yarn. An untwisted continuous filament can be used because the strength and elastic modulus are increased when the fiber is formed into a composite material. "Fiber", in this application, can be defined to include a monofilament elongated body, a multifilament elongated body, ribbon, strip, fiber, tape, and the like.

In one example, the reinforcing fibers are formed from the list including but are not limited to synthetic polymers (e.g., polyolefins), carbon, nylon, aramid, and glass. Synthetic polymers include polyethylene (including high density polyethylene, low density polyethylene, and ultra-high molecular weight polyethylene), polypropylene, polyoxymethylene, poly(vinylidine fluoride), poly(methyl pentene), poly(ethylene-chlorotrifluoroethylene), poly(vinyl fluoride), poly(ethylene oxide), poly(ethylene terephthalate), poly(butylene terephthalate), polyamide, polybutene, and thermotropic liquid crystal polymers.

An advantage of the disclosed technology is the ability to produce composite sealing structures with reinforcing members that have precisely defined mechanical properties that can be anisotropic (vary with direction). By combining a reinforcing member with a gel material, an advantage of the composite sealing material is that desired mechanical properties can be achieved for various application needs. Achieving these characteristics can be facilitated using a spacer fabric impregnated in combination with a gel material. The composite sealing material of the present disclosure is intended for insertion and compression between adjacent surfaces where sealing may be required. The composite sealing material includes a reinforcing member impregnated with a gel material, for example, a dry silicone gel.

In certain examples, the reinforcing member can be made of an anisotropic open cell foam material prepared from a thermoplastic or thermoset matrix. The anisotropic foam can be fabricated into any desired shape. Such shapes can generally have a square or rectangular shape and can have multiple flat surfaces or faces. In one example, the open cell anisotropic foam can be a plank, sheet or block of foam as most processes for preparing open cell anisotropic foam may form the foam in a plank, sheet or block, although alternatives are possible. The open cell anisotropic foam may be a 3-D textile and/or braided textile, although alternatives are possible. The open cell anisotropic foam may be impregnated with a gel material to form a composite sealing structure. The composite sealing structure can be free formed. That is, the composite sealing structure can be formed without having any support container. In certain examples, the foam can be a thermoplastic polymer based foam, although alternatives are possible.

Referring to FIG. 21, an example method of fabricating a cable sealing structure 10H that includes an open cell filter foam sheet 100 and gel material 102 is depicted. It will be appreciated that any open structure may be used. The open cell filter foam sheet 100 may have a honey comb configuration (e.g., a circular shaped primary cell structure). The arrangement and configuration of the open cell filter foam sheet 100 can be such that it does not retain or hold a gaseous substance. The open cell filter foam sheet 100 can include different cell sizes. In one example, the cell sizes may range from about 1 mm to about 5 mm, although alternatives are possible.

The open cell filter foam sheet 100 can have a thickness T (see FIG. 22) that may range from about 10 mm to about 35 mm, although alternatives are possible. For example, the thickness T of the open cell filter foam sheet 100 may range from about 10 mm to about 20 mm, more preferably from 15 mm to 25 mm, and most preferably from 20 mm to 25 mm, although alternatives are possible.

The method can include a step of slitting the open cell filter foam sheet 100 in any suitable manner to form slitting zones 104 (e.g., slits). The slitting zones 104 can be configured partially through the open cell filter foam sheet 100. The slitting zones 104 can be arranged and configured to provide preferential stretching in a desired direction.

Figure 22:
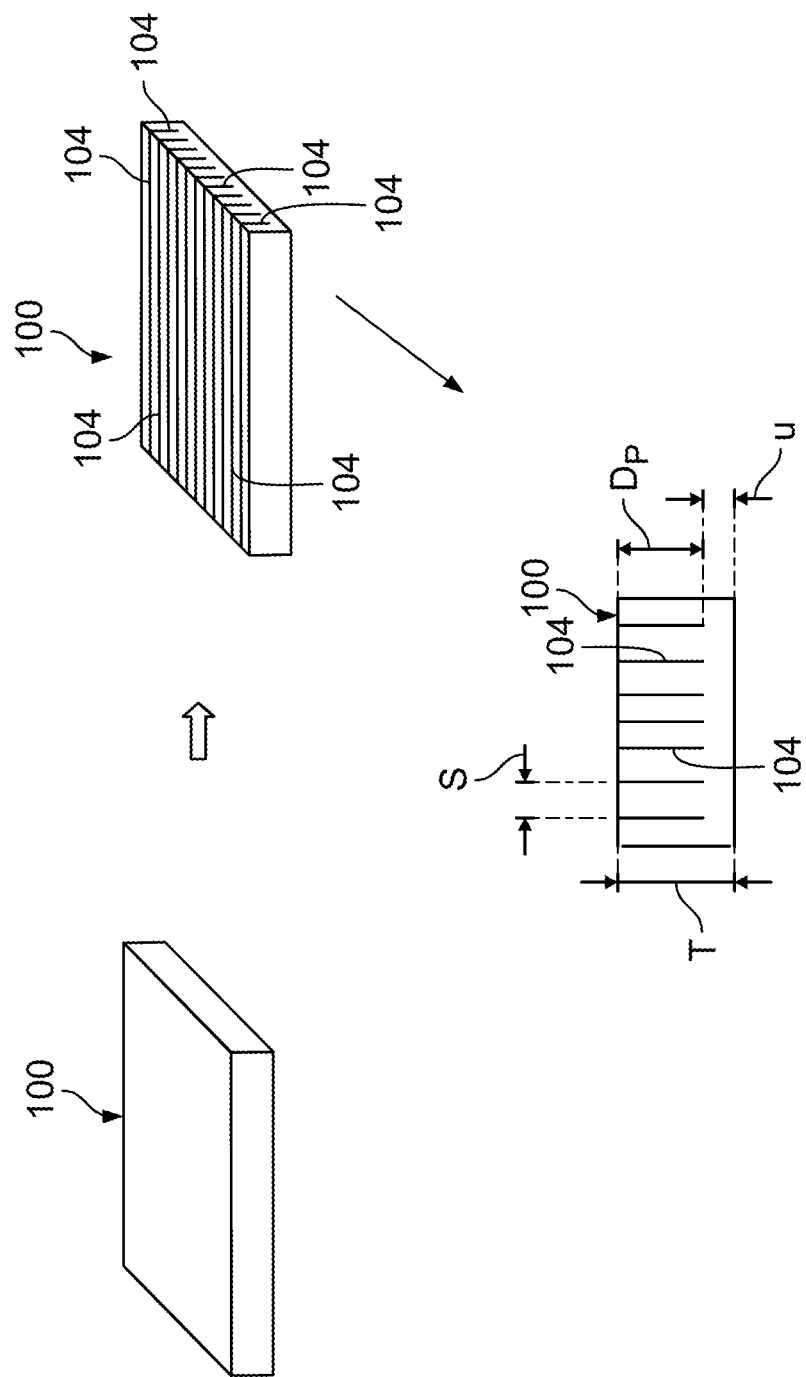
FIG. 22 is a schematic diagram of an example method of fabricating a cable sealing structure that depicts details of cutting the open cell filter foam sheet of FIG. 21 in accordance with the principles of the present disclosure.

Turning to FIG. 22, a depth Dp of which the slitting zones 104 are formed can affect the degree of flexibility of the open cell filter foam sheet 100. As depicted, the depth Dp of the slitting zones 104 is not extend entirely through the thickness T of the open cell filter foam sheet 100. In one example, the depth Dp of the slitting zones 104 may range from about 5 mm to about 25 mm, although alternatives are possible. For example, the depth Dp of the slitting zones 104 may range from about 5 mm to about 15 mm, more preferably from about 5 mm to about 20 mm, and most preferably from about 10 mm to about 20 mm.

The amount of uncut material U in the open cell filter foam sheet 100 may range from about 5 mm to about 30 mm, although alternatives are possible. For example, the uncut material U may range from about 5 mm to about 20 mm, more preferably from about 5 mm to about 15 mm, and most preferably from about 5 mm to about 10 mm.

The open cell filter foam sheet 100 has a spacing S between the slitting zones 104. The spacing S may range from about 3 mm to about 10 mm, although alternatives are possible. For example, the spacing S between the slitting zones 104 may range from about 3 mm to about 5 mm, more preferably from about 3 mm to 7 mm, and most preferably from about 5 mm to about 7 mm.

The process of slitting the open cell filter foam sheet 100 may include, but is not limited to, slitting or cutting with mechanically using a scissor, a knife, a blade, ultrasonic slitting, a digital cutter, and a hot knife. In other examples, the open cell filter foam sheet 100 may be slit using a conventional water jet cutter 106, also known as a water jet or waterjet. Movements of the water jet cutter 106 can be carried out in order to be able to cut along any desired slitting zones. A conventional water jet cutter is known as an industrial tool capable of cutting a wide variety of materials using a very high-pressure jet of water, or a mixture of water and an abrasive substance. The terms pure waterjet and water-only cutting refer to waterjet cutting without the use of added abrasives, often used for softer materials such as rubber.

Figure 23:
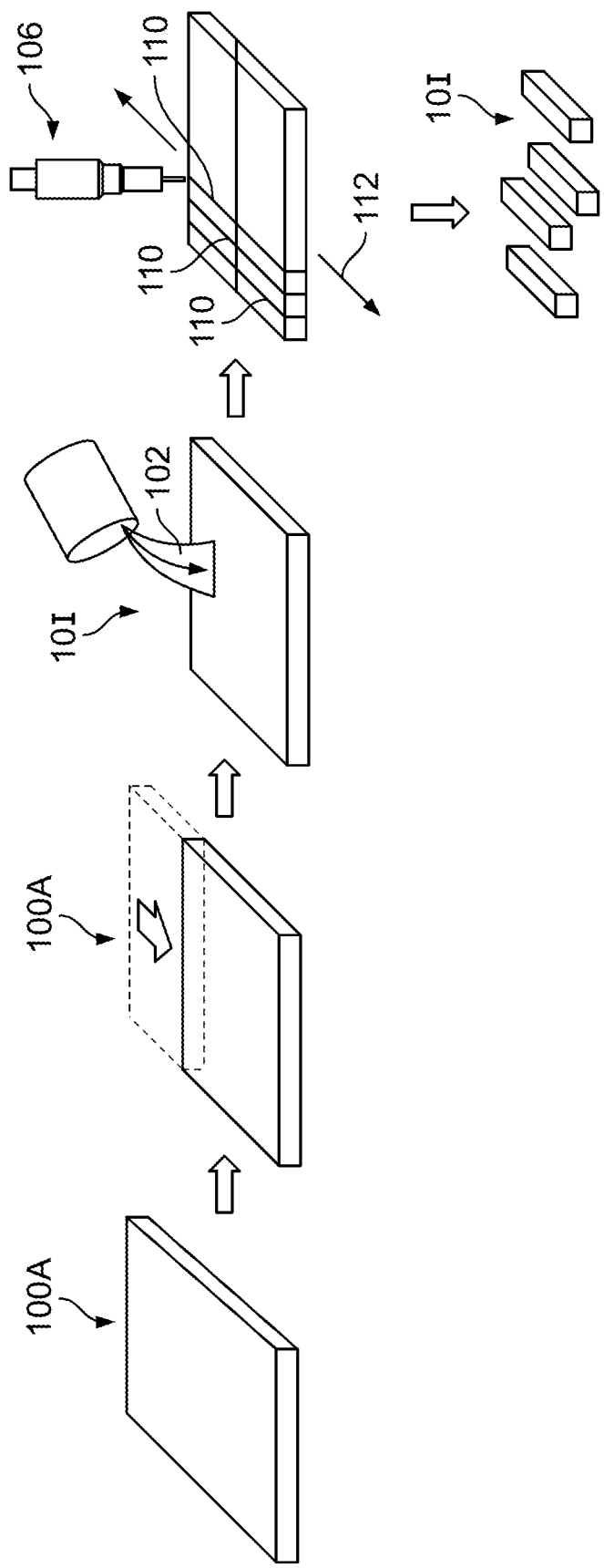
FIG. 23 is a schematic diagram of an example method of fabricating a cable sealing structure that includes a pre-compressed open cell filter foam sheet and a gel material in accordance with the principles of the present disclosure.

In certain examples, an open cell filter foam sheet 100A can be pre-compressed as shown in FIG. 23. In this example, the open cell filter foam sheet 100A is pre-compressed prior to being impregnating with a gel. In the depicted example, the open cell filter foam sheet 100A is pre-compressed to obtain more flexibility in one direction and provide anisotropic characteristics in accord with the present disclosure. The pre-compressed open cell filter foam sheet 100A is compressed in one direction, although alternatives are possible. For example, the pre-compressed open cell filter foam sheet 100A can be compressed in two directions. The open cell filter foam sheet 100A would be stretchable in the direction of compression.

Although the example pre-compressed open cell filter foam sheet 100A is depicted without the slitting zones 104, it will be appreciated that the pre-compressed open cell filter foam sheet 100A may include the slitting zones 104.

In one example, the pre-compressed open cell filter foam sheet 100A can be compressed at least 20%, 30%, or 40% by length. In other examples, the pre-compressed open cell filter foam sheet 100A can be compressed at least 33% (e.g., from about 150 units in length to about 100 units in length), at least 50% (e.g., from about 200 units in length to about 100 units in length), or at least 200% of its original length, although alternatives are possible. In certain examples, the pre-compressed open cell filter foam sheet 100A can be compressed from about 150 units in length to about 100 units in length. In still other examples, the pre-compressed open cell filter foam sheet 100A can be compressed from about 200 units in length to about 100 units in length. In certain examples, the pre-compressed open cell filter foam sheet 100A can be compressed at least 20%, at least 25%, at least 30%, at least 35%, at least 40%, at least 45%, or at least 50%.

The example open cell filter foam sheet 100 or the example pre-compressed open cell filter foam sheet 100A can be embedded with a gel 102 that has a low hardness. The gel 102 can be a dry silicone gel that is applied over the open cell filter foam sheet 100 and the pre-compressed open cell filter foam sheet 100A to substantially completely and uniformly impregnate the open cell filter foam sheet 100 and the pre-compressed open cell filter foam sheet 100A with the gel 102 to produce the composite sealing structures 10H, 10I. Once the gel 102 is cured, it can hold the pre-compressed open cell filter foam sheet 100A in the compressed state to provide the anisotropic properties in accordance with the principles of the present disclosure.

The gel 102 may be applied to the open cell filter foam sheet 100 and the pre-compressed open cell filter foam sheet 100A by hand using brushes, rollers, or similar tools or applied by impregnating using a machine, for example, where the open cell filter foam sheet 100 and the pre-compressed open cell filter foam sheet 100A are submerged in a bath. The tasks of embedding the open cell filter foam sheet 100 and the open cell filter foam sheet 100A with a gel material can be accomplished in a number of ways. For example, by molding, extrusion, spinning, calendaring, and coating, although alternatives are possible. In some examples, the gel material can be poured over the open cell filter foam sheet 100 and the pre-compressed open cell filter foam sheet 100A at room temperature to fill in the open cell filter foam sheet 100 and the pre-compressed open cell filter foam sheet 100A.

The dry silicone gel will not melt the structures of the open cell filter foam sheet 100 and the pre-compressed open cell filter foam sheet 100A. The pre-compressed open cell filter foam sheet 100A maintains its same original shape that was formed prior to being impregnated with the dry silicone gel. The dry silicone gel can be four times softer than other gels. Silicone or polyurethane gels can provide an advantage of having a very low viscosity prior to curing, which can help to make it easier to fill openings in the reinforcement structure while not melting the reinforcement structure. The anisotropic properties of the open cell filter foam sheet 100 and the pre-compressed open cell filter foam sheet 100A allow softer gels to be used. Once the gel is cured, the pre-compressed open cell filter foam sheet 100A can be held in the pre-compressed state.

Various other methods of applying a dry silicone gel to impregnate the open cell filter foam sheet 100 or the pre-compressed open cell filter foam sheet 100A may be employed. In some examples, the pre-compressed open cell filter foam sheet 100A may be pre-compressed and placed in a mold (not shown) to be filled with a dry silicone gel while in the mold to produce a composite sealing structure. The mold can be arranged and configured to hold the pre-compressed open cell filter foam sheet 100A in the pre-compressed state. The composite sealing structure can be used as a seal. In some examples, the composite sealing structure may be heated to make the composite softer and stretchable prior to being used as a seal. In some examples, a vacuum may be used on the mold to degas the mold contents and burst any gas or air bubbles remaining in the mold contents.

In certain examples, a template or mold (not shown) can be positioned on a substrate (faceplate or baseplate, plastic, peelable protective layer, for example). The open cell filter foam sheet 100 or the pre-compressed open cell filter foam sheet 100A therein can be covered with a dry silicone gel as previously described to produce a composite sealing structure. Once the dry silicone gel is cured, the gel can hold the open cell filter foam sheet 100A in the pre-compressed state. Whereafter, the mold can be removed leaving the composite sealing structure secured to the substrate. The mold can be easily removed from around the composite sealing structure without adversely effecting the adhesion between the composite sealing structure and the substrate.

Figure 24:
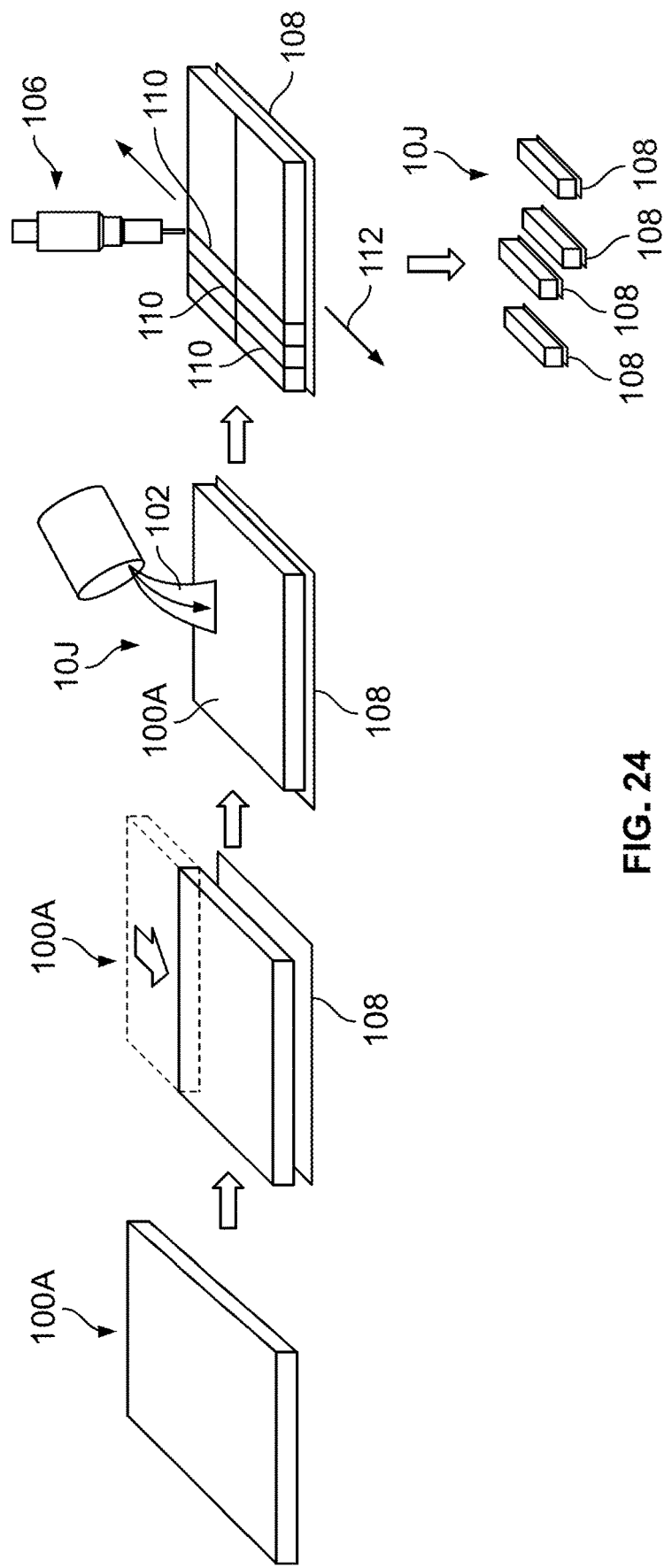
FIG. 24 is a schematic diagram of an example method of fabricating a cable sealing structure that includes the pre-compressed open cell filter foam sheet of FIG. 23 with a substrate provided at one side of the pre-compressed open cell filter foam sheet and a gel material in accordance with the principles of the present disclosure.

In some examples, additional substrates or carriers can be provided in the mold along with the open cell filter foam sheet 100 or the pre-compressed open cell filter foam sheet 100A. FIG. 24 depicts an example substrate 108 (e.g., a hard or compressible substrate) that can be combined with the pre-compressed open cell filter foam sheet 100A, or even with the open cell filter foam sheet 100, to obtain gel inserts that each have an integral substrate (e.g., formed in one seamless piece). A dry silicone gel may be used to bond the substrates to the open cell filter foam sheet 100 or the pre-compressed open cell filter foam sheet 100A by adding (e.g., casting, printing, pouring, dipping, molding, etc.) the gel into the open cell filter foam sheet 100 or the pre-compressed open cell filter foam sheet 100A, although alternatives are possible. In other words, the open cell filter foam sheet 100 and the substrate 108 or the pre-compressed open cell filter foam sheet 100A and the substrate 108 are a single, integrally molded piece, although alternatives are possible. As a result, a two layer structure of reinforced gel on top of a substrate can be formed.

The substrate or substrates could function as an exterior containment layer, sheet, or carrier, which can be made of plastic, rubber foam, metal, or other material. In other examples, the substrate or substrates may include a connection interface for connecting (e.g., snap-fitting) to another interface (e.g., an interface in a housing).

In certain examples, the substrate can also be a pealable protective layer. The pealable protective layer can be provided to facilitate handling of the composite sealing structure (e.g., combined product of the dry silicone gel and the open cell filter foam sheet) or to protect the composite sealing structure from contamination.

Referring to FIG. 24, the substrate 108 is provided at one side of the pre-compressed open cell filter foam sheet 100A to form a composite sealing structure 10J with gel or the pre-compressed open cell filter foam sheet 100A can be sandwiched between two substrates 108. In other examples, the substrate 108 may also have elastic characteristics (e.g., rubber foam, spring steel) so as to be capable of storing potential energy that is applied to the composite sealing structure as spring force when the composite sealing structure 10J is used as a seal such as a cable seal. The substrate 108 can be cut to shape along with the pre-compressed open cell filter foam sheet 100A such that the two can be cut at the same time by mechanical, waterjet, or any other suitable cutting method.

Following impregnation, after about 1 hour or less; preferably, after about 45 minutes or less, the cable sealing structures 10H, 10I, 10J may be divided along cut lines 110 to form a plurality cable sealing structures 10H, 10I, 10J (e.g., sealing inserts) that each have a stretch dimension or a preferential stretch orientation 112 that is transverse or perpendicular to the slitting zones 104 of the composite sealing structure 10H. In one example, the water jet cutter 106 may be used to divide the composite sealing structure, although alternatives are possible.

In one example, the method can include a step of dividing the open cell filter foam sheet 100 of the composite sealing structure 10H into 5 millimeters (mm) wide strips perpendicular to the slitting zones 104, although alternatives are possible. For example, the open cell filter foam sheet 100 can be divided into widths of at least 1 mm, 2 mm, 3 mm, 4 mm, 5 mm, 6 mm, 7 mm, 8 mm, 9 mm, 10 mm, or other widths that correlate to a desired application need. The widths of the open cell filter foam sheet 100 or the pre-compressed open cell filter foam sheet 100A may be custom made and determined per the structure to be sealed or may vary in widths for a given structure to seal different zones in a given structure. The open cell filter foam sheet 100 or the pre-compressed open cell filter foam sheet 100A can have a width of between about 2 and 20 millimeters, more preferably between about 4 and 8 millimeters.

As depicted, the open cell filter foam sheet 100 and the pre-compressed open cell filter foam sheet 100A are cut along one direction. As such, the open cell filter foam sheet 100 no longer has any strength in the direction opposite to the slitting zones 104. Also, the pre-compressed open cell filter foam sheet 100A no longer has any stretch in the direction opposite to the direction of compression. The anisotropic cable sealing structures 10H, 10I, 10J can be fabricated into any desired shape or size. Such shapes generally have a square or rectangular shape and have multiple surfaces. In one example, the anisotropic composite sealing structures can be arranged as block inserts for sealing. It will be appreciated that the method of fabricating cable sealing structures can be applied to any of the previous cable sealing structures 10A-J described herein.

Another aspect of the present disclosure relates to a method of making a composite sealing structure with anisotropic behavior. The method can include the steps of 1) constructing a spacer member that is adapted to define an open porous structure of the anisotropic composite seal; 2) slitting the spacer member to provide multiple slits; 3) impregnating the spacer member with a gel material; and 4) dividing the gel impregnated spacer along cut lines transverse to the slits to form a plurality of cable sealing inserts with an open porous structure defined by the spacer member. The method may also include the steps of pre-compressing the open porous structure prior to being impregnated with gel. The method may also include the steps of providing a substrate at one side of the composite seal or sandwiching the composite seal can between two substrates. The substrates can be bonded to the composite seal by the gel material. Thus, the composite seal can be supported between a pair of supporting substrates without applying pressure. The method may further include a vacuum step to remove gas or air bubbles from the impregnated structure. It will be appreciated that this method can also apply to any of the previous cable sealing structures 10A-J described herein.

Figure 25:
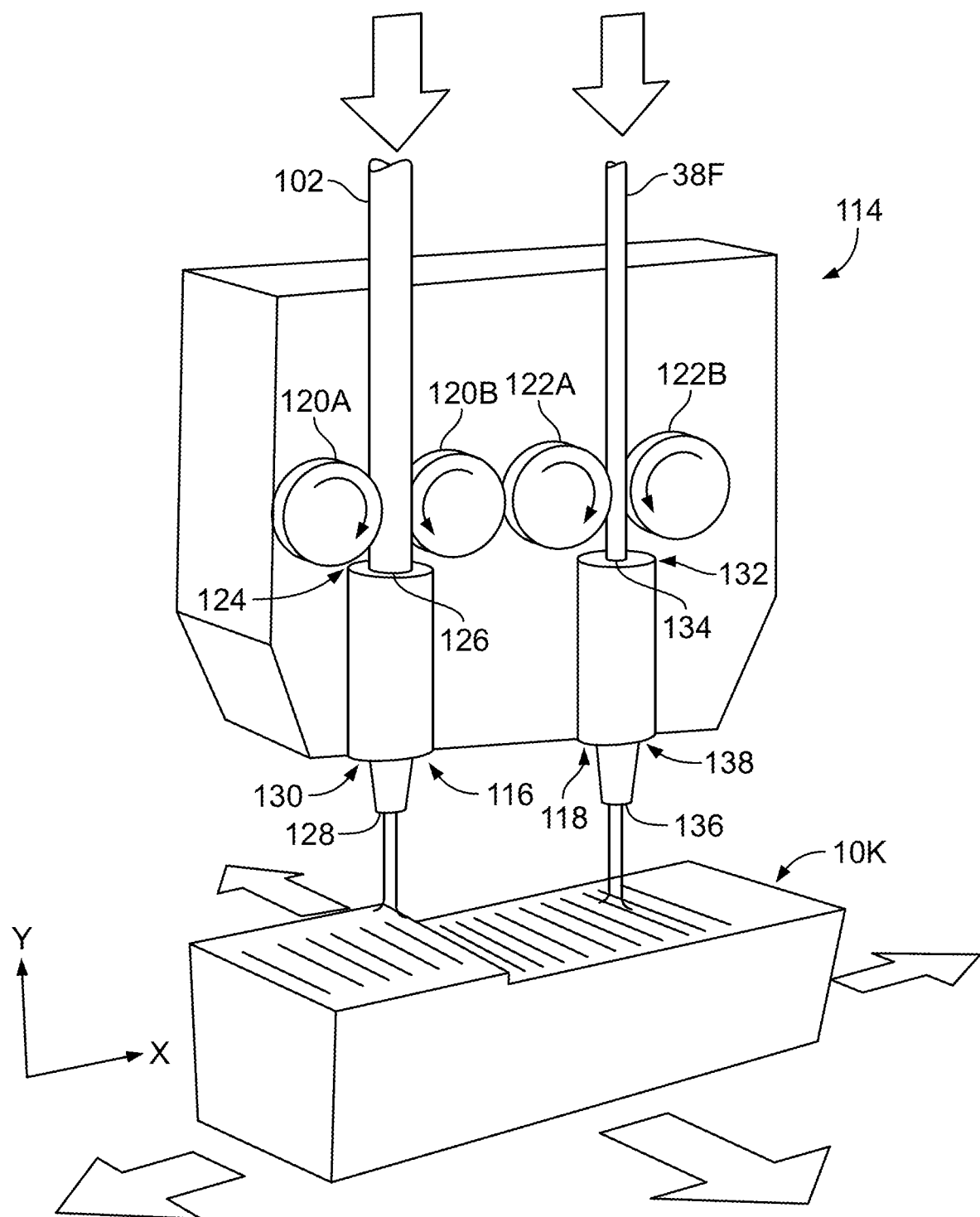
FIG. 25 is a schematic diagram of an example three-dimensional printer including a dual print head nozzle for fabricating a cable sealing structure in accordance with principles of the present disclosure.

The present disclosure also relates to methods for printing any of the cable sealing structures described herein by using a three dimensional (3-D) printer 114. Turning to FIG. 25, a schematic perspective view of the printer 114 is shown. The printer 114 may be, for example, a drop-on-demand (DOD) printer where a material is ejected as a plurality of droplets through a nozzle and the droplets can coalesce together to create a continuous layer. The printer 114 may be a printer other than a DOD printer, such as an extrusion printer or a printer which uses other printing technology. The printer 114 can include first and second print head nozzles 116, 118 (e.g., first and second dispensing nozzles, extrusion heads) through which material is printed (e.g., extruded) under pressure to fabricate a 3D cable sealing structure 10K, which is depicted as a gel block.

In one example, the cable sealing structure 10K can be printed in a layer-by-layer manner from the first and second print head nozzles 116, 118 where the layers of the cable sealing structure 10K grow along the vertical y-axis. In certain examples, the first and second print head nozzles 116, 118 are each arranged and configured to dispense material separately.

In certain examples, the layers of the cable sealing structure 10K can be printed to form a "free-standing" structure. As used herein, the term "free-standing," is defined as being self-supporting such that layers of the cable sealing structure 10K remain intact when dispensed without the need for a container or other lateral support member.

The extruded material can be the gel material 102 that can be printed to form a first printed gel layer of the cable sealing structure 10K. After the first printed gel layer of the cable sealing structure 10K is printed, a reinforcing material 38F (e.g., a reinforcing material of the type previously described) can be printed such that a first printed reinforcing material layer can be disposed over the first printed gel layer. Subsequently, a second printed gel layer can be printed with a printer over the first printed reinforcing material layer to form a second printed gel layer. Thereafter, a second printed reinforcing material layer can be disposed over the second printed gel layer. This process can be repeated layer by layer until the desired architecture is achieved. In one example, the first printed reinforcing material layer can be parallel, perpendicular, or oriented crosswise in relation to the first printed gel layer. That is, the first printed reinforcing material layer can be disposed parallel, perpendicularly, diagonally or transversely over the first printed gel layer to create a lattice structure layer by layer.

In one example, the gel 102 can be dispensed independently from the reinforcing material 38F, although alternatives are possible. The first print head nozzle 116 is shown dispensing the gel 102 and the second print head nozzle 118 is shown dispensing the reinforcing material 38F, although alternatives are possible. The first and second print head nozzles 116, 118 each include a respective pair of rollers 120A, 120B, 122A, 122B that are arranged and configured to feed a component, the gel 102 or the reinforcing material 38F, through the first and second print head nozzles 116, 118, respectively. In certain examples, the rollers 120A and 122A rotate in a clockwise direction and rollers 120B and 122B rotate in a counterclockwise direction, although alternatives are possible.

Printing the gel 102 can include feeding the gel 102 to enter one end 124 of a first flow passage 126 of the first print head nozzle 116 that has a first discharge orifice 128 on another end 130. The gel 102 can exit through the first discharge orifice 128. Printing the reinforcing structure 38F can include feeding the reinforcing structure 38F to enter one end 132 of a second flow passage 134 of the second print head nozzle 118 that has a second discharge orifice 136 on another end 138. The reinforcing structure 38F can exit through the second discharge orifice 136. In certain examples, the gel 102 and the reinforcing structure 38F can be fed together or separately through a single flow passage of a single print head nozzle. In certain examples, the gel 102 and the reinforcing structure 38F can exit together or separately through a single discharge orifice of the single print head nozzle.

A pump (not shown) can responsively feed the gel 102 and the reinforcing structure 38F from respective supplies to inlets 140A, 140B of a print head nozzle (for example see FIGS. 27C-27E), and controls the rate of extrusion of the gel 102 and the reinforcing material 38F from the print head nozzle. By controlling the rate of extrusion while moving the print head nozzle in a pattern determined by desired CAD (computer-aided design) data, a cable sealing structure (e.g., a three-dimensional object, which resembles a CAD model) can be created.

In certain examples, the reinforcing structure 38F may include a thermoplastic, braided textiles, woven, or non-woven textiles, fibers, yarns, strings, rubbery filament, fine metal wires, plastics, glass fibers, foils, foams, a biasing member, such as a spring, strength members, fabrics, anisotropic 3D textiles or knitted fabrics, a preform three-dimensional structure, elastics, extensible fabrics, etc., although alternatives are possible.

The reinforcing structure 38F can be organized in a desired direction such that the reinforcing structure 38F becomes embedded within the gel 102 and forms a bond with the gel 102. Placement and organization of the reinforcing structure 38F embedded in the gel 102 can help to limit movement of the gel 102 in a specific direction in order to provide the cable sealing structure 10F with a desired anisotropic behavior. As such, the reinforcing structure 38F helps to internally constrain the gel 102 to assist in gel containment and in certain cases limit tent effect.

Still referring to FIG. 25, the anisotropic behavior of the cable sealing structure 10K can be controlled by controlling the motion and/or direction of the first and second print head nozzles 116, 116 of the printer 114, although alternatives are possible. For example, the printer 114 can be moved left and right such that the first and second print head nozzles 116, 118 can lay down respective layers of the gel 102 and the reinforcing structure 38F as desired. As such, the first print head nozzle 116 can be used to determine where the gel 102 is applied and the second print head nozzle 118 can be used to determine where the reinforcing structure 38F is applied. It will be appreciated that the printer 114 may also include a third print head nozzle (not shown) to print a different type of filament than the reinforcing structure 38F used.

In certain examples, the reinforcing structure 38F can be dispensed within a range of 2 mm to 6 mm apart, although alternatives are possible. The gel 102 can be dispensed within a range of 1 mm to 3 mm to fill between the reinforcing structure 38F, although alternatives are possible. The first and second print head nozzles 116, 118 of the printer 114 can oscillate (e.g., back and forth, to and from, etc.) until a length of the cable sealing structure 10K is equal to a height of the cable sealing structure 10K, although alternatives are possible.

In certain examples, the first and second print head nozzles 116, 118 of the printer 114 can be moved up and down generally along the Y-axis and/or left and right generally along an X-axis to steer anisotropic behavior when forming the cable sealing structure 10K as desired. The gel 102 and the reinforcing structure 38F can be dispensed from the first and second print head nozzles 116, 118, respectively in a front-to-back or left-to-right orientation as determined by the movement of the first and second print head nozzles 116, 118. In other examples, the cable sealing structure 10K may be formed by printing layers of the reinforcing structure 38F in both a left-to-right orientation and a front-to-back orientation to provide reinforcement in both X and Y directions. As such, the strength of the cable sealing structure 10K would coincide with the direction of the reinforcing structure 38F.

When the reinforcing structure 38F is printed in a left-to-right orientation, the resulting cable sealing structure 10K would be harder to stretch or deform (e.g., more rigid) in the left-to-right orientation. When the reinforcing structure 38F is printed in a front-to-back orientation, the resulting cable sealing structure 10K would be harder to stretch or deform (e.g., more rigid) in the front-to-back orientation. Thus, 3D printing the cable sealing structure 10K can achieve the desired anisotropic behavior. Also, a variety of geometries and designs can be achieved by 3D printing the cable sealing structure 10K. For example, the cable sealing structure 10K may be formed of any shape, (e.g., circular, rectangular, oval, square, triangular, sphere, cube, octahedron, and any other shape or combination thereof).

In certain examples, a rubbery filament (e.g., rubbery wire, elastic filament) may be used in combination with the gel 102 for added elasticity. The rubbery filament may have a hardness in the range of 30 to 80 Shore 000 to provide flexibility or extra elasticity, although alternatives are possible. In certain examples, the rubbery filament can be stiffer than the gel 102. In some examples, a harder material (e.g., hard rubber or plastic) may be used in combination with the gel, although alternatives are possible. The harder material may also be 3D printed through a separate print nozzle and can be melted or undergo a chemical curing reaction. The harder material may be combined with a gel material dispensed through a separate gel printing nozzle to form a cable sealing structure, although alternatives are possible. The temperature of the first print head nozzle 116 can be controlled accurately in order to dispense the gel 102 in a molten or liquid state. For example, the gel 102 may be dispensed at a temperature within 180° C. to 200° C., although alternatives are possible.

In certain examples, the cable sealing structure 10K can be printed within a container (not shown), for example when the viscosity of the gel 102 is too low (e.g., a liquid) such that the cable sealing structure 10K would be non-self-supporting and would collapse absent the containment. In such an example, the container may be placed on a flat surface or table to dispense the gel 102 and the reinforcing structure 38F therein. In order to control the anisotropic behavior of the cable sealing structure 10K, the container or the table may be moved in all directions (e.g., up, down, front, back, left, and/or right) while keeping the first and second print head nozzles 116, 118 stationary or fixed.

In certain examples, the cable sealing structure 10K may be formed on a polymer sheet (not shown), such as, but not limited to, polypropylene. The polymer sheet can stick to the gel 102 at a temperature within 180° C. to 200° C., although alternatives are possible, in order to build the cable sealing structure 10K layer by layer. Once the cable sealing structure 10K is built, the polymer sheet is no longer needed and can be removed. In certain examples, the cable sealing structure 10K may be free formed without any support.

In one example, the thickness of the layers of the cable sealing structure 10K can be within 2 mm to 8 mm, although alternatives are possible. The thickness of the layers can depend on the viscosity of the gel 102 and how quickly it may dry. For example, the cable sealing structure 10K may include 21 layers (e.g., folds) with a total thickness of about 125 mm or 5 inches. As such, each layer or fold would have a thickness of about 6 mm. It will be appreciated that the thickness layer may vary with other embodiments. For example, the total thickness of the cable sealing structure 10K can be about 130 mm. The layers of the cable sealing structure 10K can have a width within 2 mm to 7 mm. Certain seals of the type disclosed herein can include at least 5, 10, 15 or 20 layers each applied one on top of the other.

Figure 26:
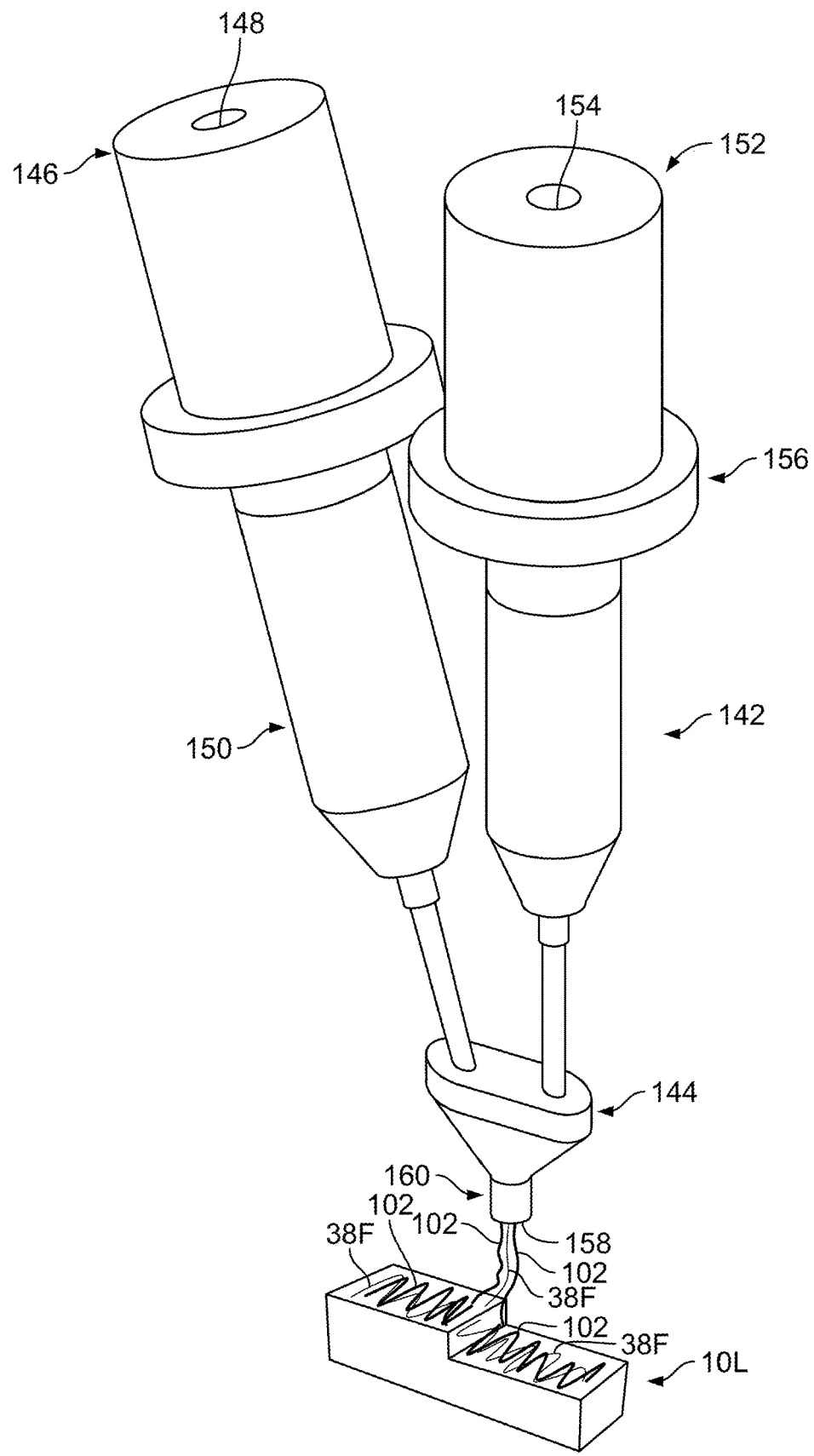
FIG. 26 is a schematic diagram an example single print head nozzle for fabricating another cable sealing structure.

Referring to FIG. 26, a schematic perspective view of a different print head system 142 usable with a printer is shown. In the example depicted, the print head system 142 has a single print head nozzle 144 that can be used to form a cable sealing structure 10L. Similar to the printer 114 described with reference to FIG. 25, the print head system 142 can simultaneously extrude gel 102 and the reinforcing structure 38F to control deformation behavior by controlling the motion or direction of movement of the print head nozzle 144. Similar to the printer 114 described above, the print head nozzle 144 of the print head system 142 can be moved in all directions (e.g., along the x-axis, y-axis, and z-axis) front-to-back, up and down, left-to-right etc. to form the cable sealing structure 10L with a desired geometric shape having anisotropic behavior. As such, the gel 102 and reinforcing structure 38F can be dispensed in a direction or orientation of the print head nozzle 144. In other examples, a support structure or table can be moved to obtain a cable sealing structure that has anisotropic behavior and is capable of having multiple geometries.

In the example depicted, printing the gel 102 includes feeding the gel 102 to enter one end 146 of a first flow passage 148 of a first feeder 150 and printing the reinforcing structure 38F includes feeding the reinforcing structure 38F to enter one end 152 of a second flow passage 154 of a second feeder 156.

Figure 27:
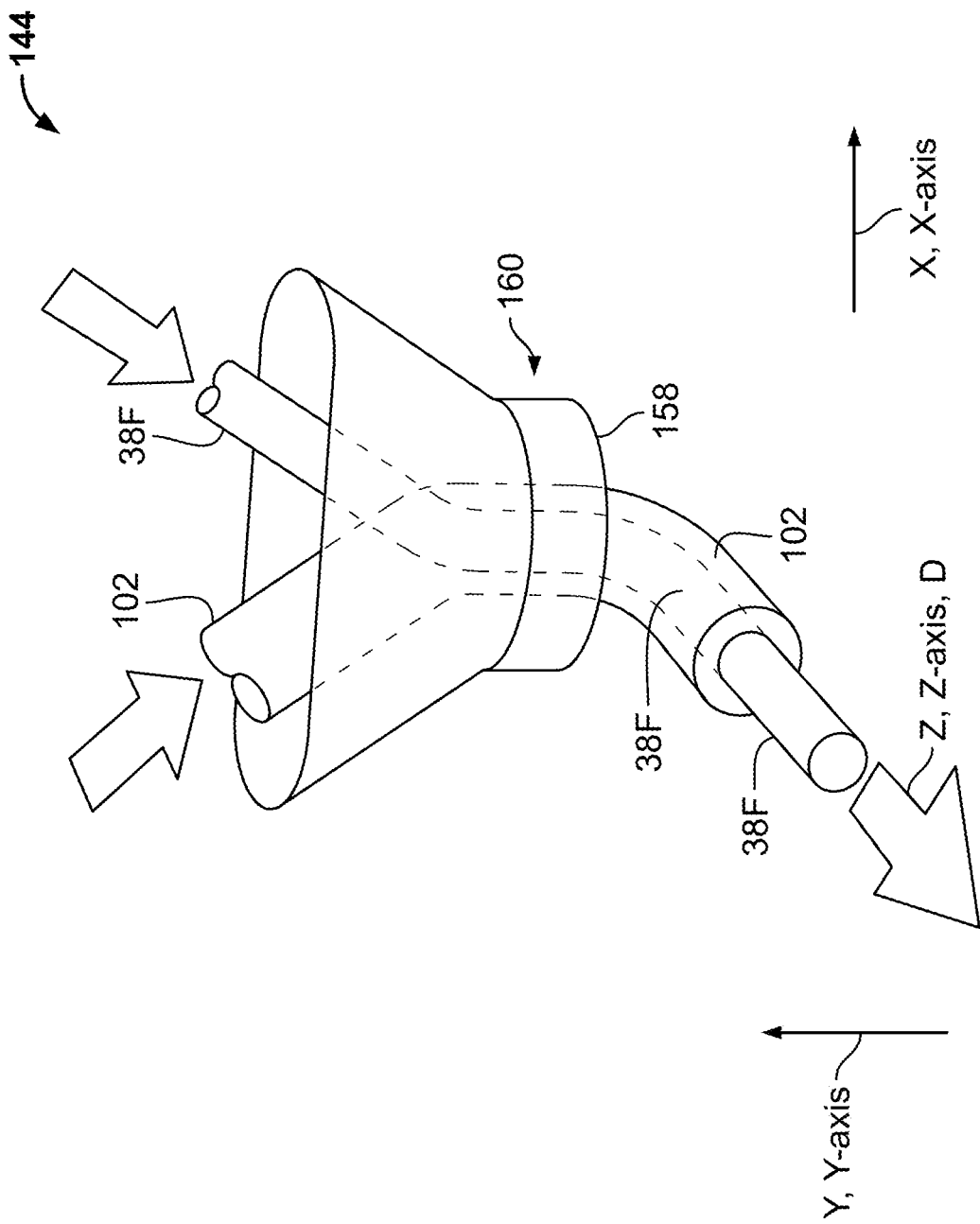
FIG. 27 is a schematic diagram of the single print head nozzle shown in FIG. 26.
Figure 27B:
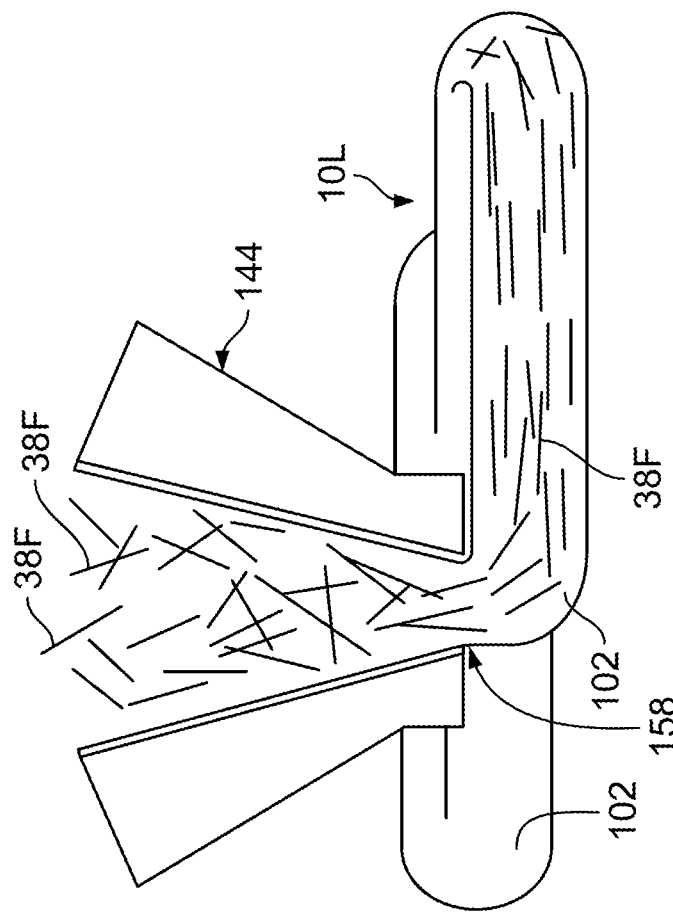
FIG. 27B is a schematic cross-sectional diagram of the single print head nozzle shown in FIG. 27.

Referring to FIG. 27, a schematic perspective view of the print head nozzle 144 is depicted. The first and second flow passages 148, 154 can both enter the print head nozzle 144 to feed the gel 102 and the reinforcing structure 38F, respectively. The print head nozzle 144 can have a single discharge orifice 158 on another end 160. The gel 102 and the reinforcing structure 38F can both exit together through the single discharge orifice 158.

In the example depicted, the reinforcing structure 38F can be a discrete or single fiber that can be pulled through the gel 102 when both the gel 102 and the reinforcing structure 38F are dispensed through the single discharge orifice 158. The reinforcing material can include a continuous bead, thread, or other shape of uninterrupted, interconnected material or can be formed of a plurality of separate non-continuous pieces (e.g., a fiberglass chop or other materials).

As the gel 102 and the reinforcing structure 38F are combined in the print head nozzle 144, the gel 102 can take the form of the reinforcing structure 38F. The gel 102 can be a soft conformable material arranged and configured to be flexible around the reinforcing structure 38F as the reinforcing structure 38F is pulled through the gel 102. The print head nozzle 144 is generally vertical and can be moved in all directions (e.g., along x, y, and z axis). As described herein, the movement of the print head nozzle 144 can dictate where the reinforcing structure 38F is applied. The reinforcing structure 38F can be placed individually along the z-axis that corresponds to the cable pass-through direction D to prevent deformation along the cable axis (e.g., z-axis). As such, the reinforcing structure 38F can be placed parallel with the cable axis. Similarly, if the reinforcing structure 38F is printed along the x-axis, reinforcement will be in the x direction. If the reinforcing structure 38F is printed along the y-axis, reinforcement will be in the y direction. It will be appreciated that printing layers of reinforcing structure 38F can be fabricated in both x and y directions.

The gel 102 and reinforcing structure 38F can flow onto a printing table as one combined flow of material to form the cable sealing structure 10L. In one example, the combined flow of material can flow into a support container to form the cable sealing structure 10L, although alternatives are possible. For example, the combined flow of material can be free formed. That is, the cable sealing structure 10L can be formed without having any support container, as described herein.

Figure 27A:
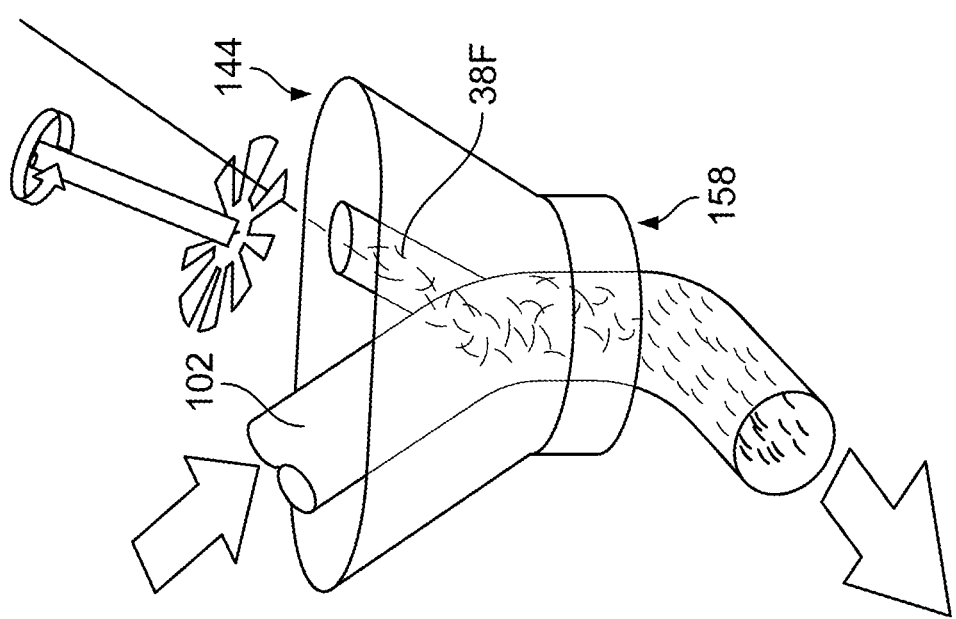
FIG. 27A is a schematic diagram of the single print head nozzle shown in FIG. 27.
Figure 27C:
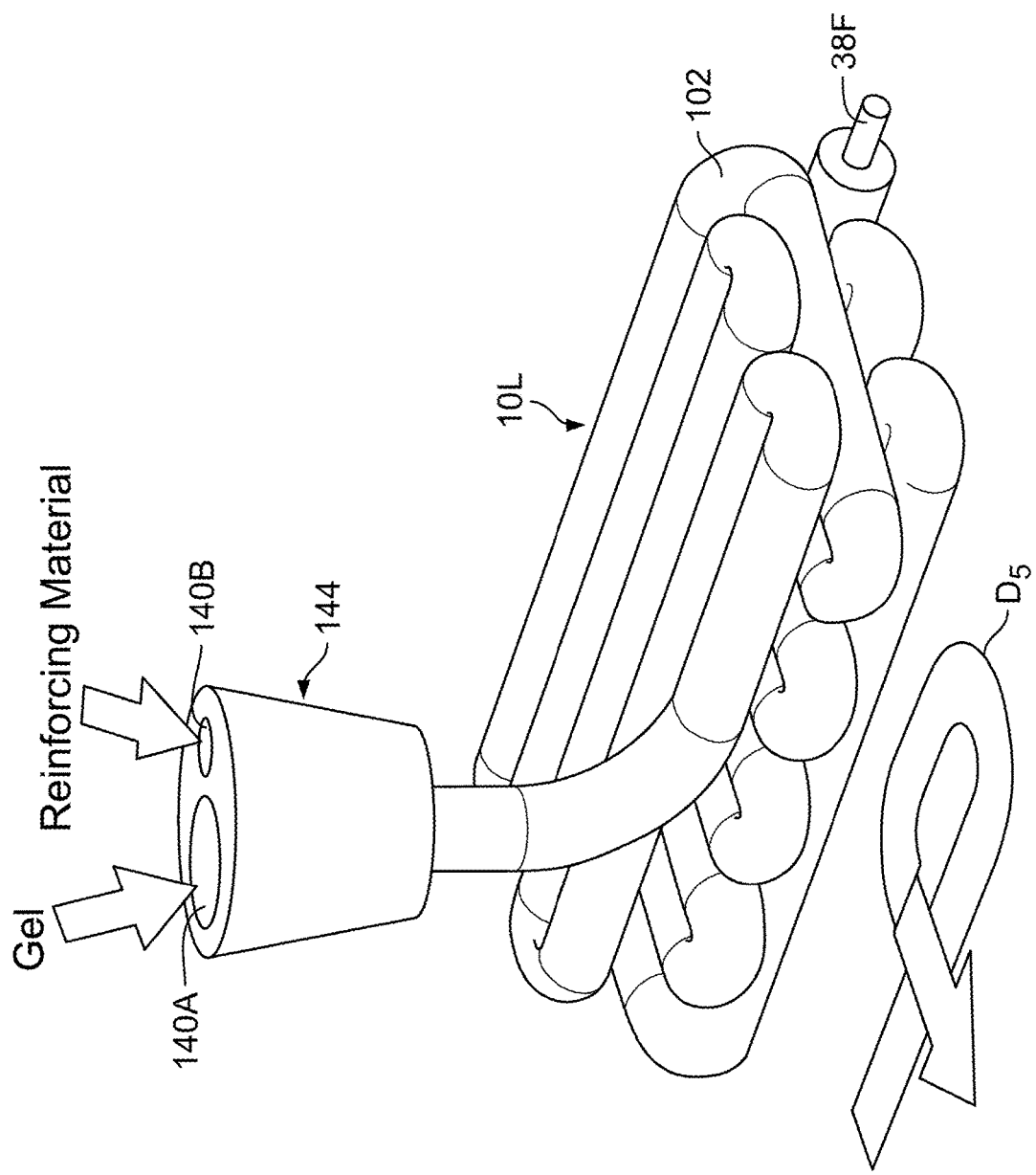
FIG. 27C is a schematic diagram of the single print head nozzle shown in FIG. 27 dispensing a cable sealing structure in accordance with the principles of the present disclosure.
Figure 27D:
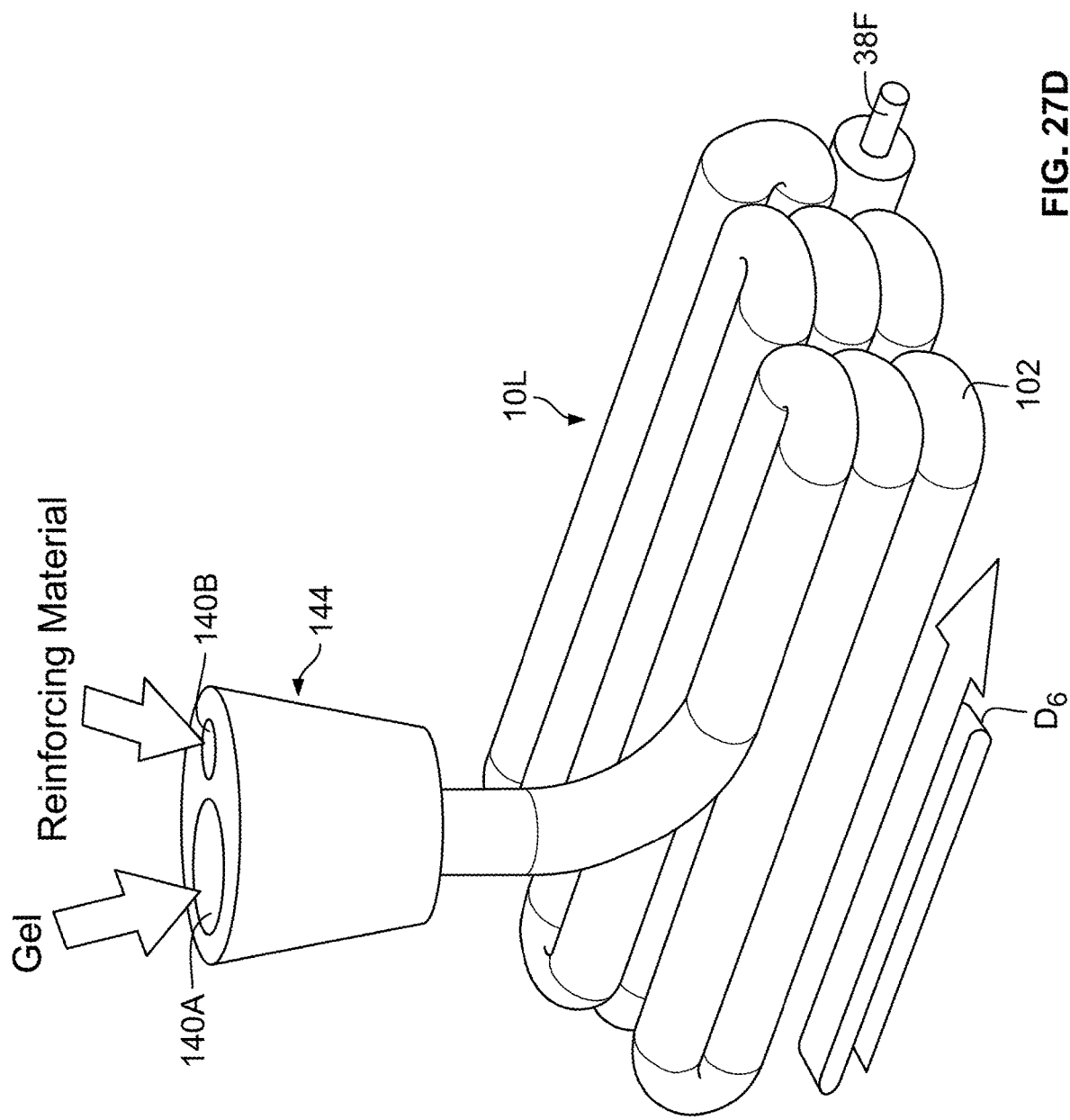
FIG. 27D is a schematic diagram of the single print head nozzle shown in FIG. 27 dispensing a cable sealing structure in accordance with the principles of the present disclosure.

FIG. 27A shows the reinforcing structure 38F chopped and co-dispensed with the gel 102. In this example, the chopped reinforcing structure 38F may include fibers, knitted structures, yarns, filaments, strength members, elastics, and/or threads, although alternatives are possible. In certain examples, the reinforcing material may compose of a combination of different filaments.

The chopped reinforcing structure 38F mixes with the gel 102 as shown in FIG. 27B and flows through the print head nozzle 144 and out the single discharge orifice 158 to form the cable sealing structure 10L. The gel 102 can be heated in a controlled manner to cause the gel 102 to melt which may allow the reinforcing structure 38F to mix and sink (e.g., embed) into the gel 102. The combined mixture of the gel 102 and the reinforcing material 38F can be dispensed in whatever orientation the print head nozzle 144 is directed. The layers of reinforcing structure 38F and gel 102 aligning in a manner that forms the desired anisotropic properties of the cable sealing structure 10L.

The cable sealing structure 10L can be built layer-by-layer as the print head nozzle 144 oscillates back-and-forth, left-to-right, up-and-down, etc., as desired. Various geometric shapes of the cable sealing structure 10L can be fabricated using a 3D printer. The various layers that make up the cable sealing structure 10L can be printed parallel, perpendicular, or oriented crosswise with respect to one another (best shown in FIGS. 27C-27D). That is, the layers can be disposed parallel, perpendicularly, diagonally, or transversely over another layer to create a lattice structure layer-by-layer. The oscillation directions $D_5$, $D_6$ or orientation of the print head nozzle 144 respectively shown in FIGS. 27C-27D can dictate the direction and orientation of the layers forming the cable sealing structure 10L. It will be appreciated that other print orientations may be used to fabricate the cable sealing structure 10L.

Figure 27E:
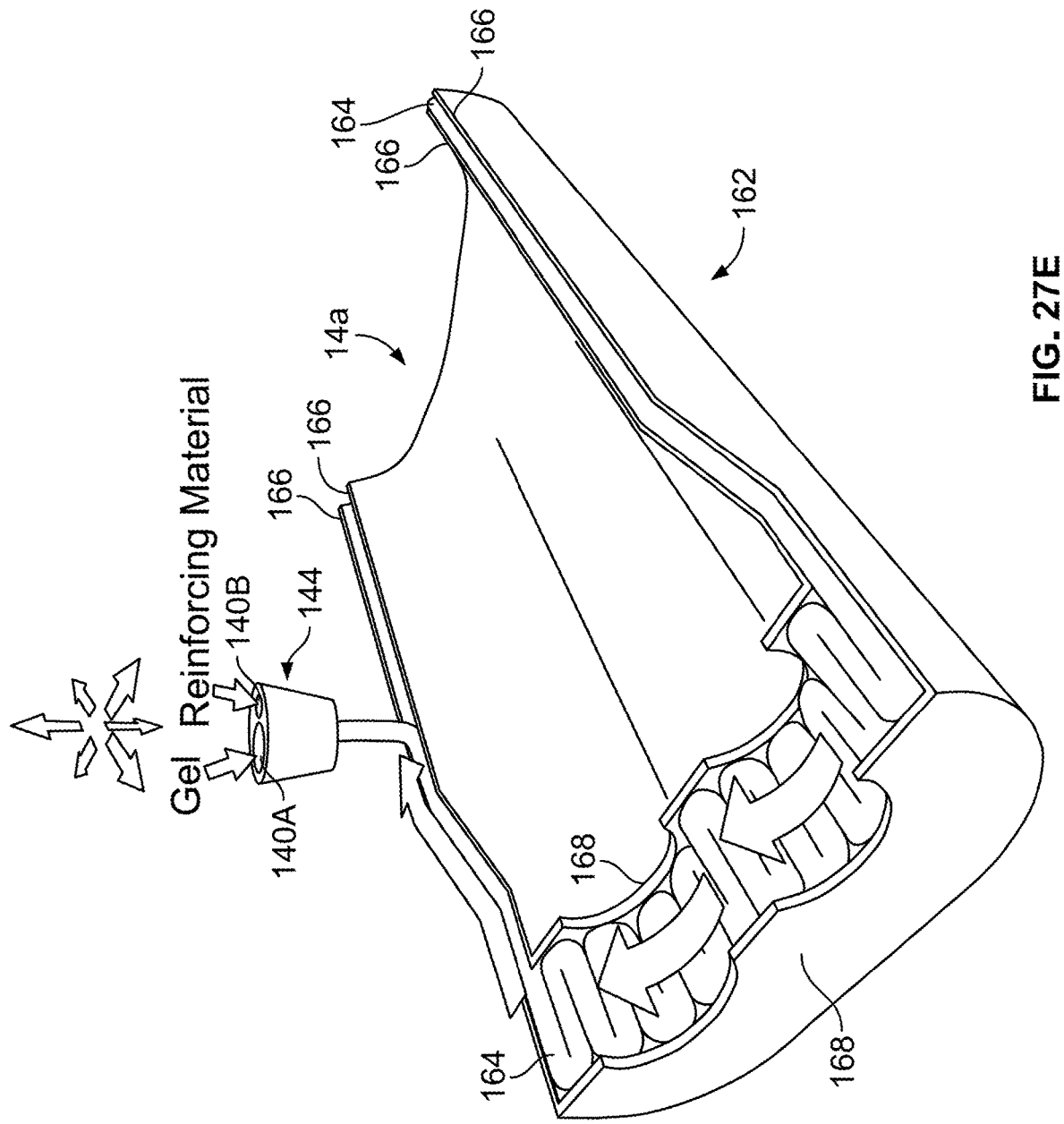
FIG. 27E is a schematic diagram of the single print head nozzle shown in FIG. 27 dispensing a seal member inside of an enclosure in accordance with the principles of the present disclosure.

Referring to FIG. 27E, the combined mixture of the gel 102 and the reinforcing structure 38F can be extruded or dispensed directly inside of a first housing 162 piece (e.g., bottom piece) of another enclosure 14a to form a seal member 164. It will be appreciated that the seal member 164 can be dispensed in a second housing piece (not shown) (e.g., top piece) that can be arranged and configured to mate (e.g., connect, attach) with the first housing piece 162 to form the enclosure 14a. The seal member 164 can be applied in containment spaces (e.g., cavities) of the enclosure 14a defined by sidewalls 166 and end walls 168 thereof. In other examples, the seal member 164 having a composition of both the gel 102 and the reinforcing structure 38F can be in the form of pre-shaped pieces, which can be located in the containment spaces of the enclosure 14a, although alternatives are possible. For example, a seal structure may be printed to form a perimeter sealing region of an enclosure in a perimeter channel and another seal structure may be printed to form a cable sealing region in a larger cable sealing cavity. The cable sealing cavity and the perimeter channel can be in fluid communication with each other such that both of the seal structures printed therein are in fluid communication.

The structures of the seal structures (e.g., sealant blocks) can be different in the cable sealing region and the perimeter sealing region of the enclosure. For example, the cable sealing region may include sealant and reinforcement and the perimeter seal may or may not include reinforcement. The gel in the cable sealing region may have a higher or lower durometer as compared to the perimeter sealing region. Conformal printing techniques can be used for either or both regions.

In the cable sealing region, pre-defined notches or openings or other contoured shapes can be printed into the printed seal structures to correspond to sealed cable pass through locations at a cable sealing interface of the seal structures. In other examples, pre-defined notches or openings may be omitted and a flat, non-contoured sealing surface may be used at the cable sealing interface of the sealing interface of the seal structures.

In certain examples, a cable sealing structure 10 can be pre-shaped with an opening or surface where no material is to be printed or placed. As such, a pre-defined location can be formed in the cable sealing structure 10 that may be arranged and configured to receive the telecommunications cable 26 and form a complete seal thereabout.

Similarly, a 3D printer can be used to dispense the reinforcing structure 38F in any specific orientation, in any discrete location, in any geometric shape, within the gel 102 to achieve the desired anisotropic behavior and geometry of the cable sealing structure 10L.

Figure 28:
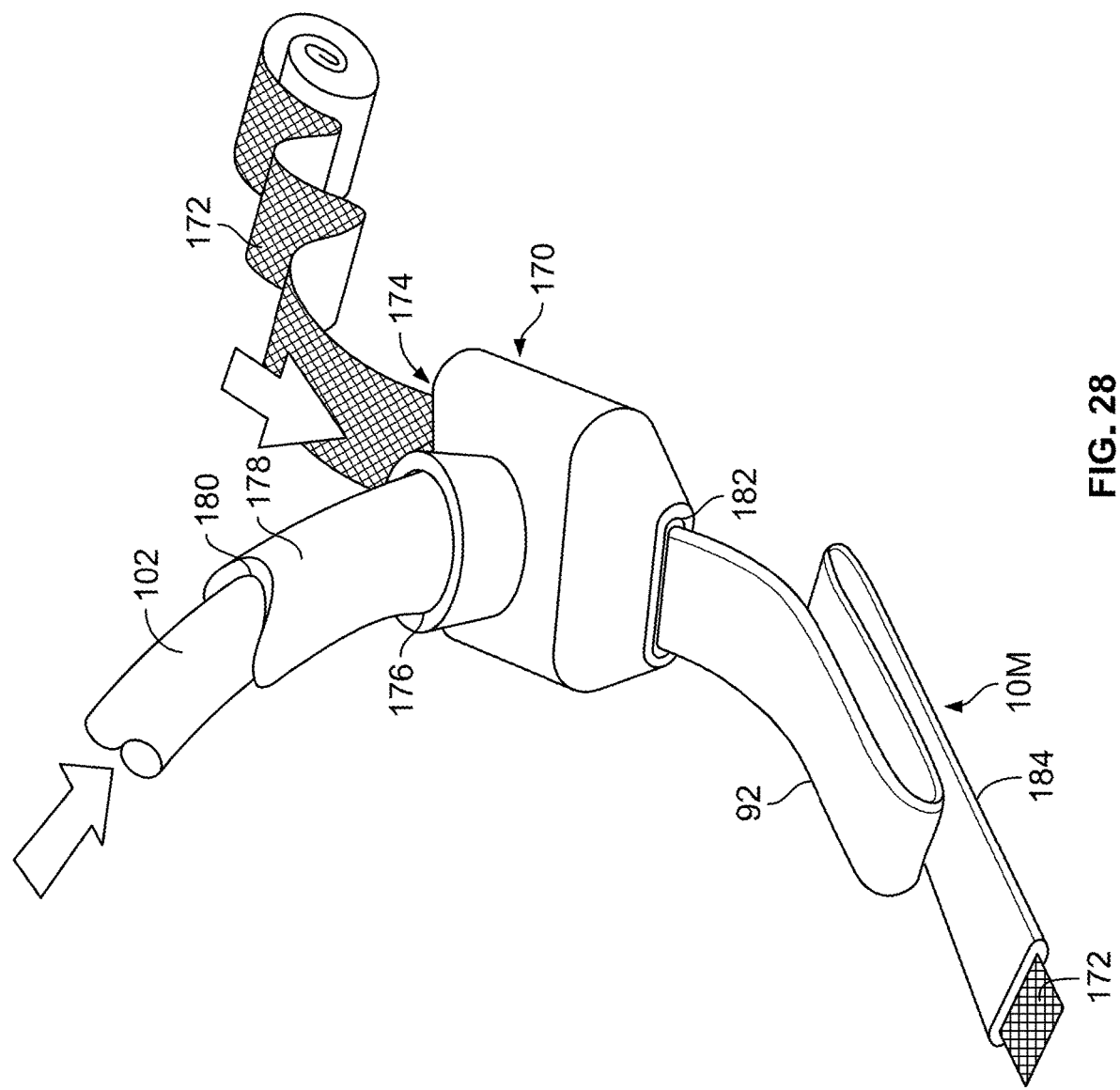
FIG. 28 is a schematic diagram of another example single print head nozzle for fabricating a cable sealing structure in accordance with the principles of the present disclosure.

Turning now to FIG. 28, another example cable sealing structure 10M is formed using 3D printing. In the depicted example, a schematic perspective view of a print head nozzle 170 is shown with gel 102 and a textile strip 172 (e.g., iso filaments, woven, non-woven, braided textile, tape, etc.) being respectively feed through separate first and second entry ports 174, 176. The gel 102 can be fed through a feeder 178 that can define a flow passage 180. The textile strip 172 can be arranged and configured such that a desired orientation of reinforcing materials is already formed therein. As such, the cable sealing structure 10M can be formed layer-by-layer by co-dispensing the gel 102 and textile strip 172 to achieve a desired geometric shape with anisotropic behavior.

In one example, the gel 102 can be extruded (e.g., extrusion printed) onto the textile strip 172 when the gel 102 and the textile strip 172 are combined inside the print head nozzle 170. It will be appreciated that other printing techniques may be used, such as, but not limited to, printing single fibers in an orientation similar to the nozzle. In the example depicted, the combined gel 102 and textile strip 172 can be dispensed through a single exit port 182 of the print head nozzle 170 as a gel covered textile strip 184. As a layer of the gel covered textile strip 184 exits the print head nozzle 170, the layers can melt (e.g., fuse) together to form one solid block of the cable sealing structure 10M. As such, the cable sealing structure 10M can be built by stacking the gel covered textile strip 184 layer-by-layer until, for example, a length of the cable sealing structure 10M equals a height of the cable sealing structure 10M, although alternatives are possible. The textile strip 172 can be arranged and configured to not stretch in the long direction, while the gel 102 can be arranged and configured to stretch in the long direction, although alternatives are possible.

The thickness of the gel 102 can be within 1 mm to 2 mm on each side of the textile strip 172, although alternatives are possible. For example, the gel 102 can be within 3 mm to 4 mm thick on each side of the textile strip 172. The overall thickness of the gel 102 covering the textile strip 172 can be within 2 mm to 4 mm, although alternatives are possible.

In certain examples, the gel 102 can be in liquid form when it is extruded. That is, the gel 102 can be extruded at a temperature similar to thermoplastics. As such, the gel 102 can be heated to a process temperature of 200° C. to 250° C. where the gel 102 melts and later be allowed to cool to solidify. In certain examples, the gel 102 can be a reactive type gel that has a chemical mixture including reactants that crosslink, which can allow for more time options on when the gel 102 can be processed before it starts to solidify. Certain silicon and polyurethane gels can be processed at room temperature. The reaction can be accelerated by heating the gel 102 to 90° C. In certain examples, the temperature can be increased up to 200° ° C. to speed up curing. As such, modifying speed of process can be achieved by varying the chemistry of the gel and varying the processing temperature, although alternatives are possible. In other examples, the gel 102 can be cured using ultraviolet (UV) light source.

In certain examples, the print head nozzle 170 can be moved to create a zigzag structure of the textile strip 172. As described herein, the cable sealing structure 10M can be made by dispensing the gel covered textile strip 172 into a support structure or container, although alternatives are possible. For example, the cable sealing structure 10M can be made by free-forming the gel covered textile trip 172 without using any containers as support.

In one example, gel sealing can be used in conformal 3D printing. In such examples, gel can be applied onto a curved surface or other surface having three dimensional shapes. The gel can be printed to conform to a surface that may be a 3D object. For example, the gel can be printed onto a 3-dimensionally shaped surface that may include curved lines. In certain examples, the gel can be printed onto a molded part or onto a substrate directly in a closure housing.

The cable sealing structures 10A-M described herein can be fabricated layer-by-layer (e.g., one at a time) in flat, parallel planes or curved conformal layers.

The present disclosure also relates to a method of making a seal that includes the steps of: 1) feeding a gel material to enter one of a first flow passage of a first dispensing nozzle having a first discharge orifice on another end; 2) feeding at least one filament material to enter one end of a second flow passage of a second dispensing nozzle having a second discharge orifice on another end; 3) printing alternate layers of the gel material and the at least one filament material; and 4) during the dispensing step, moving the first and second dispensing nozzles in a plane defined by first and second directions to form a cable sealing structure. In other examples, the gel material and the at last one filament material may be combined inside a single dispensing nozzle.

The present disclosure also relates to a method of making the cable sealing structures $10_{A-M}$. The method includes a step of forming a gel that has a construction with anisotropic deformation characteristics. The method can further include a step of respectively embedding the reinforcing structures $38_{A-F}$ into the gel of respective cable sealing structures $10_{A-M}$. In one example, the step of embedding the reinforcing structures $38_{A-F}$ is by 3D printing. In other examples, the step of embedding the reinforcing structures $38_{A-F}$ is by an overmold process. In certain examples, the step of embedding the reinforcing structures $38_{A-F}$ is by an extrusion process. In some examples, the step of embedding the reinforcing structures $38_{A-F}$ is by an injection molding process.

Some Selected Characterizations

The following characterizations are indicative of features and techniques according to the present disclosure that relate to: a cable sealing structure, and a method of making a cable sealing body for use in telecommunications enclosure. In this summary, some selected, summary characterizations of the teachings herein are provided. The list of characterizations is not meant to be exhaustive. 1. A cable sealing structure characterized by: a cable sealing body including a gel; and at least one reinforcing structure embedded in the gel; wherein as the cable sealing structure is deformed to form a seal, the at least one reinforcing structure elastically deforms to apply an elastic load to the cable sealing body. 2. The cable sealing structure of characterization 1 wherein: the at least one reinforcing structure is configured to rebound to its pre-deformed shape. 3. The cable sealing structure of characterization 1 wherein: the cable sealing body has anisotropic deformation characteristics. 4. The cable sealing structure of characterization 1 wherein: the cable sealing body includes an x-dimension that extends along an x-axis, a y-dimension that extends along a y-axis and a z-dimension that extends along a z-axis, wherein the z-axis corresponds to a cable pass-through direction, and wherein the cable sealing body is less deformable along the z-axis as compared to at least one of the x and y axes. 5. The cable sealing structure of characterization 4 wherein: the cable sealing body is less deformable along the z-axis as compared to both the x and y axes. 6. The cable sealing structure of characterization 4 wherein: the at least one reinforcing structure is oriented and positioned in the cable sealing body such that the cable sealing body is more deformable along the x-axis as compared to at least one of the y and z axes. 7. The cable sealing structure of characterization 1 wherein: the cable sealing body includes a plurality of separately discrete reinforcing structures. 8. The cable sealing structure of characterization 7 wherein: the plurality of separately discrete reinforcing structures are generally aligned along the z-axis. 9. The cable sealing structure of characterization 8 wherein: the cable sealing body is less deformable along the z-axis as compared to both the x and y axes. 10. The cable sealing structure of characterization 1 wherein: the at least one reinforcing structure is embedded into the cable sealing body such that the at least one reinforcing structure has a shape that is generally zig-zag. 11. The cable sealing structure of characterization 1 wherein: the at least one reinforcing structure is a preform three-dimensional structure that is embedded into the cable sealing body, the preform three-dimensional structure providing a self-supporting shape of the at least one reinforcing structure. 12. The cable sealing structure of characterization 1 wherein: the at least one reinforcing structure has a width no greater than a width of the cable sealing body. 13. The cable sealing structure of characterization 4 wherein: the x-axis defines a length axis of the cable sealing body, the y-axis defines a height axis of the cable sealing body, and the z-axis defines a depth axis of the cable sealing body. 14. The cable sealing structure of characterization 1 wherein: the at least one reinforcing structure is a textile. 15. The cable sealing structure of characterization 14 wherein: the textile is a woven substrate. 16. The cable sealing structure of characterization 1 wherein: the at least one reinforcing structure is a metal. 17. The cable sealing structure of characterization 1 wherein: the at least one reinforcing structure is a polymer. 18. The cable sealing structure of characterization 1 wherein: the at least one reinforcing structure is a spring. 19. The cable sealing structure of characterization 1 wherein: the at least one reinforcing structure includes strength members. 20. The cable sealing structure of characterization 1 wherein: the at least one reinforcing structure forms a bond with the gel of the cable sealing body. 21. A method of making a cable sealing body, the method characterized by a step of: forming a gel having a construction with elastic characteristics. 22. The method of characterization 21 further comprising: a step of embedding a reinforcing structure into the gel of the cable sealing body. 23. The method of characterization 22 wherein: the step of embedding the reinforcing structure is by an overmold process. 24. The method of characterization 22 wherein: the step of embedding the reinforcing structure is by an extrusion process. 25. A cable sealing structure characterized by a cable sealing body including a gel, the cable sealing body having a construction with anisotropic deformation characteristics. 26. The cable sealing structure of characterization 25 wherein: the cable sealing body includes an x-dimension that extends along an x-axis, a y-dimension that extends along a y-axis and a z-dimension that extends along a z-axis, wherein the z-axis corresponds to a cable pass-through direction, and wherein the cable sealing body is less deformable along the z-axis as compared to at least one of the x and y axes. 27. The cable sealing structure of characterization 26 wherein: the cable sealing body is less deformable along the z-axis as compared to both the x and y axes. 28. The cable sealing structure of characterization 26 wherein: the cable sealing body includes at least one reinforcing member. 29. The cable sealing structure of characterization 28 wherein: the at least one reinforcing member is oriented and positioned in the cable sealing body such that the cable sealing body is more deformable along the x-axis as compared to at least one of the y and z axes. 30. The cable sealing structure of characterization 28 wherein: the at least one reinforcing member is oriented and positioned in the gel of the cable sealing body such that the cable sealing body is more deformable along the x-axis as compared to both the y and z axes. 31. The cable sealing structure of characterization 26 wherein: the cable sealing body includes a plurality of separately discrete reinforcing structures. 32. The cable sealing structure of characterization 31 wherein: the plurality of separately discrete reinforcing structures are generally aligned along the z-axis. 33. The cable sealing structure of characterization 32 wherein: the cable sealing body is less deformable along the z-axis as compared to both the x and y axes. 34. The cable sealing structure of characterization 28 wherein: the at least one reinforcing member is embedded into the cable sealing body such that the at least one reinforcing member has a shape that is generally zig-zag. 35. The cable sealing structure of characterization 28 wherein: the at least one reinforcing member is a preform three-dimensional structure that is embedded into the cable sealing body, the preform three-dimensional structure providing a self-supporting shape of the at least one reinforcing member. 36. The cable sealing structure of characterization 28 wherein: the at least one reinforcing member has a width no greater than a width of the cable sealing body. 37. The cable sealing structure of characterization 26 wherein: the x-axis defines a length axis of the cable sealing body, the y-axis defines a height axis of the cable sealing body, and the z-axis defines a depth axis of the cable sealing body. 38. The cable sealing structure of characterization 28 wherein: the at least one reinforcing member is a textile. 39. The cable sealing structure of characterization 38 wherein: the textile is a woven substrate. 40. The cable sealing structure of characterization 28 wherein: the at least one reinforcing member is a metal. 41. The cable sealing structure of characterization 28 wherein: the at least one reinforcing member is a polymer. 42. The cable sealing structure of characterization 28 wherein: the at least one reinforcing member is a spring. 43. The cable sealing structure of characterization 28 wherein: the at least one reinforcing member has elastic characteristics. 44. The cable sealing structure of characterization 28 wherein: the at least one reinforcing member includes strength members. 45. The cable sealing structure of characterization 28 wherein: the at least one reinforcing member forms a bond with the gel of the cable sealing body. 46. A method of making a cable sealing body, the method characterized by a step of: forming a gel having a construction with anisotropic deformation characteristics. 47. The method of characterization 46 further comprising a step of embedding a reinforcing member into the gel of the cable sealing body. 48. The method of characterization 47 wherein: the step of embedding the reinforcing member is by an overmold process. 49. The method of characterization 47 wherein: the step of embedding the reinforcing member is by an extrusion process. 50. A method of fabricating an anisotropic composite seal for telecommunications enclosures, the method characterized by steps of: constructing a spacer member that is adapted to define an open porous structure of the anisotropic composite seal; impregnating the spacer member with a gel material to form a composite sealing structure; and dividing the gel impregnated spacer along cut lines transverse to the slits to form a plurality of sealing inserts each with an open porous structure, each one of the sealing inserts having a construction with anisotropic deformation characteristics. 51. The method of characterization 50 wherein: the step of dividing the gel impregnated spacer member is by non-mechanical, cutting-energy to provide the sealing inserts in precisely sized portions. 52. The method of characterization 51 wherein: the non-mechanical, cutting-energy providing medium is a high-pressure water jet. 53. The method of characterization 50 further comprising: a step of slitting the spacer member to provide multiple slits therein prior to the step of impregnating the spacer member. 54. The method of characterization 50 further comprising: a step of pre-compressing the spacer member prior to the step of impregnating the spacer member. 55. The method of characterization 50 wherein: the step of pre-compressing the spacer member is performed within a mold. 56. The method of characterization 55 wherein: the step of impregnating the spacer member is performed while in the mold. 57. The method of characterization 56 further comprising: a step of bonding a substrate to the spacer member while inside the mold, the substrate being bonded to the spacer member using the gel material. 58. The method of characterization 57 wherein: the composite sealing structure is sandwiched between two substrates provided in the mold. 59. The method of characterization 57 wherein: the substrate is a containment layer that includes a connection interface for connecting to another interface in a housing. 60. The method of characterization 57 wherein: the substrate is a peelable protective layer to help facilitate handling of the composite sealing structure or for protecting the composite sealing structure from contamination. 61. The method of characterization 57 wherein: the substrate has elastic characteristics for storing potential energy that is applied to the composite sealing structure as spring force when the composite sealing structure is used as a seal. 62. The method of characterization 50 further comprising: a step of vacuumizing to remove air bubbles. 63. The method of characterization 50 wherein: the sealing inserts each include an x-dimension that extends along an x-axis, a y-dimension that extends along a y-axis and a z-dimension that extends along a z-axis, wherein the z-axis corresponds to a cable pass-through direction, and wherein the sealing inserts are less deformable along the z-axis as compared to at least one of the x and y axes. 64. The method of characterization 50 further comprising: the steps of orienting and positioning the spacer member prior to the step of impregnating the spacer member with the gel material such that the composite sealing structure is more deformable along the x-axis as compared to at least one of the y and z axes. 65. The method of characterization 50 further comprising: steps of orienting and positioning the spacer member prior to the step of impregnating the spacer member with the gel material such that the composite sealing structure is more deformable along the x-axis as compared to both the y and z axes. 66. The method of characterization 50 wherein: the spacer member is a preform three-dimensional structure that is impregnated with the gel material, the preform three-dimensional structure providing a self-supporting shape of the spacer member. 67. The method of characterization 50 wherein: the spacer member is a braided spacer fabric. 68. The method of characterization 67 wherein: the spacer fabric has a thickness of up to 25 mm. 69. The method of characterization 50 wherein: the spacer member is a textile. 70. The method of characterization 69 wherein: the textile is a woven substrate. 71. The method of characterization 50 wherein: the strips generated have a width of at least 5 mm. 72. The method of characterization 50 wherein: the step of impregnating the spacer member is by an overmold process. 73. The method of characterization 50 wherein: the step of impregnating the spacer member is by a coating process. 74. The method of characterization 50 wherein: the spacer member includes an open-cell porous structure. 75. The method of characterization 50 wherein: the spacer member is a folded, layered, or stacked structure. 76. A method for making a seal for use in sealing a telecommunications component, the method characterized by a step of: printing a gel material in a layer-by-layer manner to form a three dimensional cable seal formed by multiple layers printed one on top of the other, the gel material having a durometer less than 30 on the Shore-000 scale. 77. The method of characterization 76 wherein: the gel material is one or more of silicone gel, hydro carbon gel, urethane gel, thermoplastic gel, and geloid sealing material. 78. The method of characterization 76 wherein: the gel material has a durometer within 5 to 50 on the Shore-A scale. 79. The method of characterization 76 wherein: the component is an enclosure. 80. The method of characterization 76 wherein: the component is a telecommunications cable. 81. The method of characterization 76 further comprising: a step of printing at least one reinforcing structure in a layer-by-layer manner along a printing axis along with the printing of the gel material such that the at least one reinforcing material is embedded in the gel material. 82. The method of characterization 76 wherein: the step of printing the gel material includes feeding the gel material to enter one end of a flow passage of a dispensing nozzle having a discharge orifice on another end. 83. The method of characterization 81 wherein: the step of printing the at least one reinforcing structure includes feeding the at least one reinforcing structure to enter one end of a flow passage of a dispensing nozzle having a discharge orifice on another end. 84. The method of characterization 81 wherein: the step of printing the gel material and the at least one reinforcing structure includes feeding both the gel material and the at least one reinforcing structure together to enter one end of a single flow passage of a dispensing nozzle having a single discharge orifice on another end. 85. The method of characterization 81 wherein: the step of printing the three-dimensional gel material includes feeding the gel material to enter one end of a first flow passage of a first dispensing nozzle having a first discharge orifice on another end, and the step of printing the at least one reinforcing structure includes feeding the at least one reinforcing structure to enter one end of a second flow passage of a second dispensing nozzle having a second discharge orifice on another end. 86. The method of characterization 81 wherein: the step of printing the three-dimensional gel material includes feeding the gel material to enter one end of a first flow passage of a dispensing nozzle, and the step of printing the at least one reinforcing structure includes feeding the at least one reinforcing structure to enter one end of a second flow passage of the dispensing nozzle, the dispensing nozzle having a single discharge orifice on another end, the gel material and the at least one reinforcing structure both exiting the single discharge orifice. 87. The method of characterization 81 wherein: the step of making the seal includes: feeding the gel material to enter one of a first flow passage of a first dispensing nozzle having a first discharge orifice on another end; feeding the at least one filament material to enter one end of a second flow passage of a second dispensing nozzle having a second discharge orifice on another end; printing alternate layers of the gel material and the at least one filament material; and during the dispensing step, moving the first and second dispensing nozzles in a plane defined by first and second directions to form the seal. 88. The method of characterization 87 wherein: a third dispensing nozzle is used to print a second filament different from the at least one filament material. 89. The method of characterization 76 wherein: the seal is formed by three-dimensional printing the gel material such that the gel material is conformal to a finished and curved surface. 90. The method of characterization 76 further comprising: a step of embedding at least one reinforcing structure into the gel material of the seal. 91. The method of characterization 90 wherein: the step of embedding the at least one reinforcing structure is by an overmold process. 92. The method of characterization 90 wherein: the step of embedding the at least one reinforcing structure is by an extrusion process. 93. The method of characterization 90 wherein: the step of embedding the at least one reinforcing structure is by a three-dimensional process. 94. The method of characterization 90 wherein: the at least one reinforcing structure is a textile. 95. The method of characterization 90 wherein: the at least one reinforcing structure is a preform three-dimensional structure providing a self-supporting shape. 96. The method of characterization 76 wherein: the step of printing includes printing a reinforcing structure that provides the gel material with anisotropic deformation characteristics. 97. A method of conformal printing within a telecommunications enclosure, the telecommunications enclosure defining a perimeter sealing region in a perimeter channel, and a cable sealing region in a cable sealing cavity, the method characterized by a step of: printing a gel material directly into the perimeter channel in a layer-by-layer manner to form a three dimensional cable seal formed by multiple layers printed one on top of the other, the gel material having a durometer less than 30 on the Shore-000 scale. 98. The method of characterization 97 further comprising a step of printing a reinforcing structure directly into the cable sealing cavity of the telecommunications enclosure. 99. The method of characterization 97 wherein: the step of printing includes printing a reinforcing structure that provides the gel material with anisotropic deformation characteristics.

The principles, techniques, and features described herein can be applied in a variety of systems, and there is no requirement that all of the advantageous features identified be incorporated in an assembly, system or component to obtain some benefit according to the present disclosure.

From the forgoing detailed description, it will be evident that modifications and variations can be made without departing from the spirit and scope of the disclosure.

What is claimed is:

1. A cable sealing structure comprising:
    a cable sealing body including a gel, the cable sealing body having a construction with anisotropic deformation characteristics such that the cable sealing body has different properties in different orientations, wherein the cable sealing body includes an x-dimension that extends along an x-axis, a y-dimension that extends along a y-axis and a z-dimension that extends along a z-axis, wherein the z-axis corresponds to a cable pass-through direction, and wherein, for a given volumetric unit of the cable sealing body, a force exerted on the cable sealing body is absorbed by deformation along the x and y axes such that deformation along the z-axis is restricted.

2. The cable sealing structure of claim 1, wherein the cable sealing body is less deformable along the z-axis as compared to both the x and y axes.

3. The cable sealing structure of claim 1, wherein the cable sealing body includes at least one reinforcing member.

4. The cable sealing structure of claim 3, wherein the at least one reinforcing member is oriented and positioned in the cable sealing body such that the cable sealing body is more deformable along the x-axis as compared to at least one of the y and z axes.

5. The cable sealing structure of claim 3, wherein the at least one reinforcing member is oriented and positioned in the gel of the cable sealing body such that the cable sealing body is more deformable along the x-axis as compared to both the y and z axes.

6. The cable sealing structure of claim 3, wherein the at least one reinforcing member is embedded into the cable sealing body such that the at least one reinforcing member has a shape that is generally zig-zag.

7. The cable sealing structure of claim 6, wherein the at least one reinforcing member is a single reinforcing member.

8. The cable sealing structure of claim 6, wherein the at least one reinforcing member extends along the z-axis and the generally zig-zag shape has vertical elements along the y-axis and diagonal elements between the vertical elements and in a plane defined by the x and y axes.

9. The cable sealing structure of claim 3, wherein the at least one reinforcing member is a preform three-dimensional structure that is embedded into the cable sealing body, the preform three-dimensional structure providing a self-supporting shape of the at least one reinforcing member.

10. The cable sealing structure of claim 1, wherein the cable sealing body includes a plurality of separately discrete reinforcing structures.

11. The cable sealing structure of claim 10, wherein the cable sealing body is less deformable along the z-axis as compared to both the x and y axes.

12. The cable sealing structure of claim 1, wherein structural elements of the gel provide the anisotropic deformation characteristics such that an eye effect is reduced when a cable is sealed with the cable sealing structure.

13. A cable sealing structure comprising:
    a first gel member and a second gel member;
    a x-axis, a y-axis, and a z-axis, each of the x-, y-, and z-axes being perpendicular to each of the other axes;
    an interface between the first and second gel members extending parallel to the x-axis;
    a cable pass-through direction parallel to the z-axis, wherein the cable sealing structure has an anisotropic property, such that the cable sealing body has different properties in different orientations, to reduce eye effect at the interface when a cable is sealed within the cable sealing structure; and
    a plurality of separately discrete reinforcing structures parallel to one another and extending parallel to the z-axis such that deformation of the cable sealing body is limited along the z-axis, the plurality of separately discrete reinforcing structures distributed along at least one of the x and y axes such that the cable sealing body deforms freely along each of the x and y axes.

14. The cable sealing structure of claim 13, wherein the cable sealing structure is more compressible in a direction parallel to the interface as compared with each of the y- and z-axes.

15. The cable sealing structure of claim 13, wherein the cable sealing structure is less compressible in a direction parallel to the cable pass through direction as compared with each of the x- and y-axes.

16. The cable sealing structure of claim 13, wherein the x-axis is less deformable than the y-axis.

17. The cable sealing structure of claim 13, wherein the plurality of separately discrete reinforcing structures parallel to one another and extending parallel to the z-axis are the only reinforcing structures in the cable sealing body.

18. The cable sealing structure of claim 17, wherein the plurality of separately discrete reinforcing structures are distributed along x-axis such that spaces between each of plurality of separately discrete reinforcing structures are variable permitting compression along the x-axis.

19. The cable sealing structure of claim 18, wherein the plurality of separately discrete reinforcing structures are oriented along the y-axis and are deformable along the y-axis.

* * * * *